United States Patent [19]
Gerlach, Jr.

[11] Patent Number: 5,574,843
[45] Date of Patent: Nov. 12, 1996

[54] METHODS AND APPARATUS PROVIDING FOR A PRESENTATION SYSTEM FOR MULTIMEDIA APPLICATIONS

[75] Inventor: John D. Gerlach, Jr., Falls Church, Va.

[73] Assignee: Escom AG, Heppenheim, Germany

[21] Appl. No.: 384,735

[22] Filed: Jan. 17, 1995

Related U.S. Application Data

[63] Continuation of Ser. No. 691,984, Apr. 26, 1991, abandoned.

[51] Int. Cl.$^6$ .................................................. G06F 17/00
[52] U.S. Cl. ........................ 395/118; 395/348; 395/521
[58] Field of Search ................................... 395/140, 141, 395/154, 155, 159, 161

[56] References Cited

U.S. PATENT DOCUMENTS

| | | | |
|---|---|---|---|
| 4,315,315 | 2/1982 | Kossiakoff | 395/140 |
| 4,449,180 | 5/1984 | Ohshima et al. | 364/147 |
| 4,455,619 | 6/1984 | Masui et al. | 395/160 |
| 4,536,840 | 8/1985 | Borta | 395/700 |
| 4,546,453 | 10/1985 | Herbert et al. | 395/700 |
| 4,569,019 | 2/1986 | DiOrio et al. | 364/410 |
| 4,644,423 | 2/1987 | Buntsis et al. | 360/61 |

(List continued on next page.)

FOREIGN PATENT DOCUMENTS

WO88/07719  10/1988  WIPO .

OTHER PUBLICATIONS

H. G. Okuno et al., "Firmware Approach To Fast Lisp Interpreter," ACM Journal, 1987, pp. 1–11.
H. G. Okuno et al., "TAO: A Fast Interpreter–Centered System on Lisp Machine ELIS," ACM Journal, 1984, pp. 140–149.
R. P. Ten Dyke et al., "Object–Oriented Programming," IBM Systems Journal, vol. 28, No. 3, 1989, pp. 465–478.
Dr. Dobbs Journal, Dec. 1989 (4 Advertisments).
IBM 'Using Disk Operating System Version 4.00', First Edition (Jul. 1988) pp. 29–31; Backup.
Miastkowski, S., "Windows Shopping, Pricey and Elegant Multimedia Development", BYTE, vol. 15, No. 8, Aug. 1990, pp. 114–115.
Hirakawa, M. et al., IEEE Transactions On Software Engineering, "An Iconic Programming System," vol. 16, No. 10, Oct. 1990, New York, NY, pp. 1178–1184.
Tsuda et al., "IconicBrowser: An Iconic Retrieval System for Object–Oriented Databases," IEEE, pp. 130–137, Apr. 1989.
Marcus, B., "Joyce: An Object–Oriented Decision Tree Builder.".
Karjalainen et al., "Block Diagram Compilation and Graphical Editing of DSP Algorithms in the QuickSig System," IEEE, pp. 1057–1060, Aug. 1988.
Coote et al., "Graphical and Iconic Programming Languages for Distributed Process Control: An Object Oriented Approach," IEEE, pp. 183–190, May 1988.
Sugimura et al., "TAO/ELIS: An AI Software Development Environment Based on a Multiple Programming Paradigm Language," Review of the Electrical Communications Laboratories, vol. 37, No. 1, pp. 77–84, 1989.
Bentz, B., "An Automatic Programming System for Signal Processing Applications," Pattern Recognition, vol. 18, No. 6, pp. 491–495, 1985.
Shu, Nan C., "Visual Programming," Van Nostrand Reinhold, New York, 1988.

Primary Examiner—Mark K. Zimmerman
Attorney, Agent, or Firm—Ratner & Prestia

[57] ABSTRACT

A data processing system has a central processing unit, a memory for storing a plurality of data structures corresponding to a presentantion, and a display device. The display device has a display screen including a presentation area for displaying a presentation. Each one of the data structures includes an action identifier and a plurality of attributes. The process provides for receiving a one of the plurality of data structures of the presentation, analyzing the received data structure to determine an action to be performed in response to the action identifier of the data structure, and performing the action corresponding to the action identifier in accordance with a plurality of the attributes of the received data structure.

8 Claims, 48 Drawing Sheets

U.S. PATENT DOCUMENTS

| | | | |
|---|---|---|---|
| 4,656,603 | 4/1987 | Dunn | 395/2 |
| 4,681,548 | 7/1987 | Lemelson | 434/311 |
| 4,689,022 | 8/1987 | Peers et al. | 434/307 |
| 4,723,210 | 2/1988 | Barker et al. | 395/147 |
| 4,734,764 | 3/1988 | Pocock et al. | 358/86 |
| 4,736,320 | 4/1988 | Bristol | 395/700 |
| 4,739,477 | 4/1988 | Barker et al. | 395/600 |
| 4,779,080 | 10/1988 | Coughlin et al. | 340/712 |
| 4,813,013 | 3/1989 | Dunn | 395/159 |
| 4,821,211 | 4/1989 | Torres | 395/156 |
| 4,821,220 | 4/1989 | Duisberg | 364/578 |
| 4,827,404 | 5/1989 | Barstow et al. | 395/500 |
| 4,860,204 | 8/1989 | Gendron et al. | 395/140 |
| 4,872,167 | 10/1989 | Maezawa et al. | 371/19 |
| 4,885,717 | 12/1989 | Beck et al. | 395/775 |
| 4,893,256 | 1/1990 | Rutherfoord et al. | 395/154 |
| 4,899,136 | 2/1990 | Beard et al. | 345/156 |
| 4,905,163 | 2/1990 | Garber et al. | 395/96 |
| 4,931,950 | 6/1990 | Isle et al. | 395/11 |
| 4,953,080 | 8/1990 | Dysart et al. | 395/600 |
| 5,010,500 | 4/1991 | Makkuni et al. | 395/155 |
| 5,072,412 | 12/1991 | Henderson, Jr. et al. | 395/159 |
| 5,084,813 | 1/1992 | Ono | 395/700 |
| 5,204,947 | 4/1993 | Bernstein et al. | 395/157 |
| 5,208,665 | 5/1993 | McCalley et al. | 358/86 |
| 5,208,745 | 5/1993 | Quentin et al. | 364/188 |
| 5,214,756 | 5/1993 | Franklin et al. | 395/159 |
| 5,220,657 | 6/1993 | Bly et al. | 395/425 |
| 5,317,732 | 5/1994 | Gerlach, Jr. et al. | 395/154 X |

PARENT

PARENT (ITERATIVE)

SIBLING

PARTNER

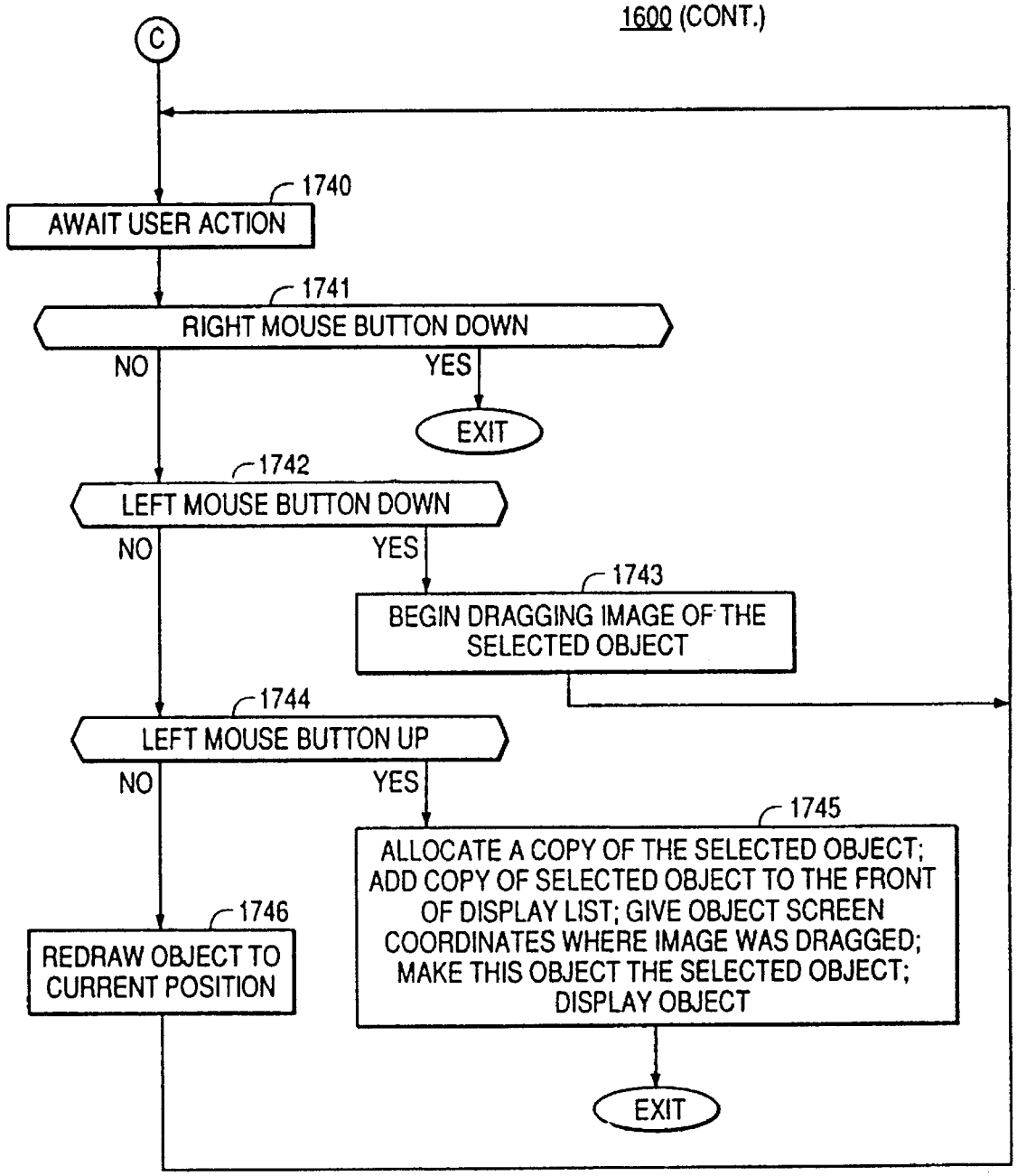

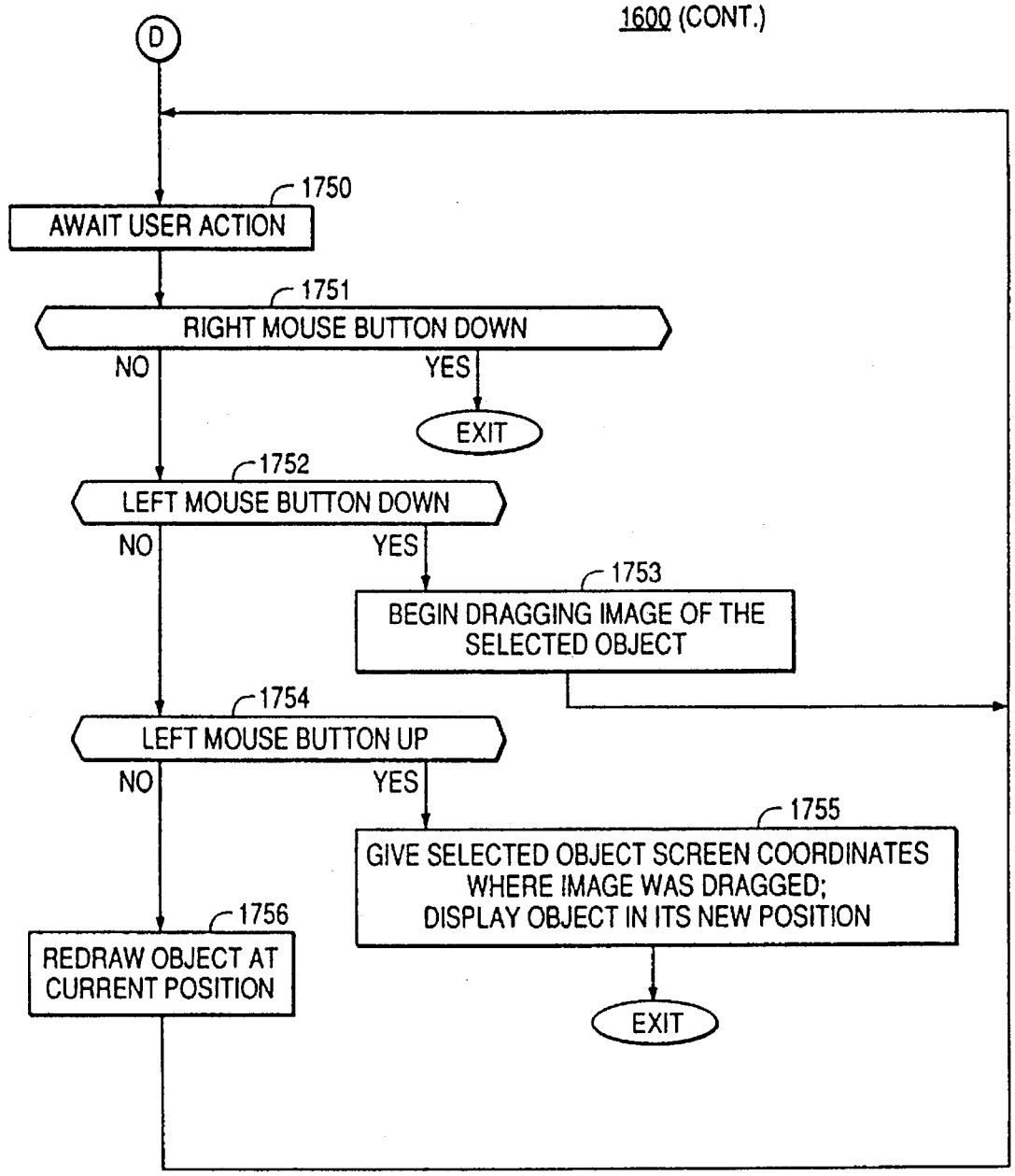

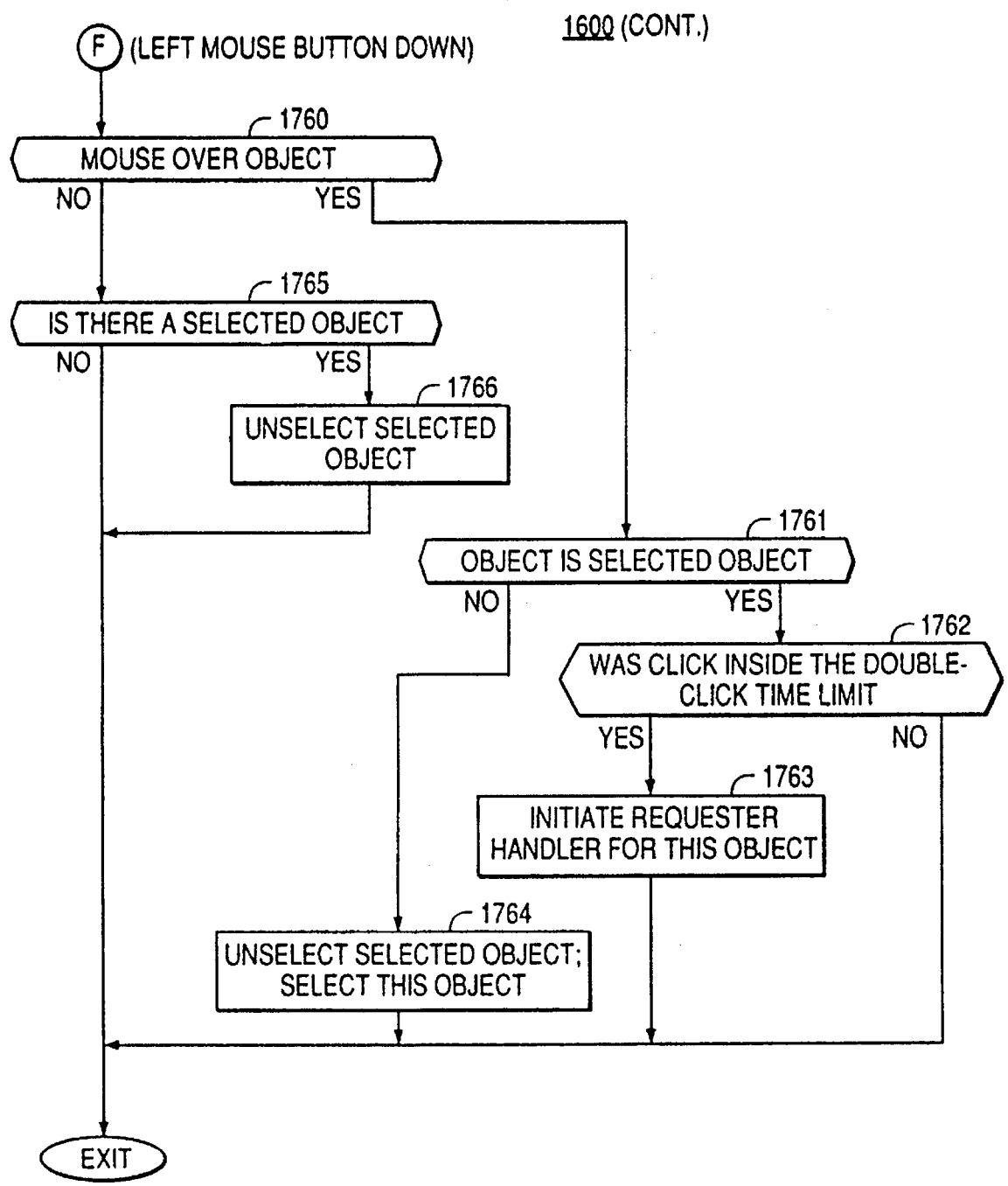

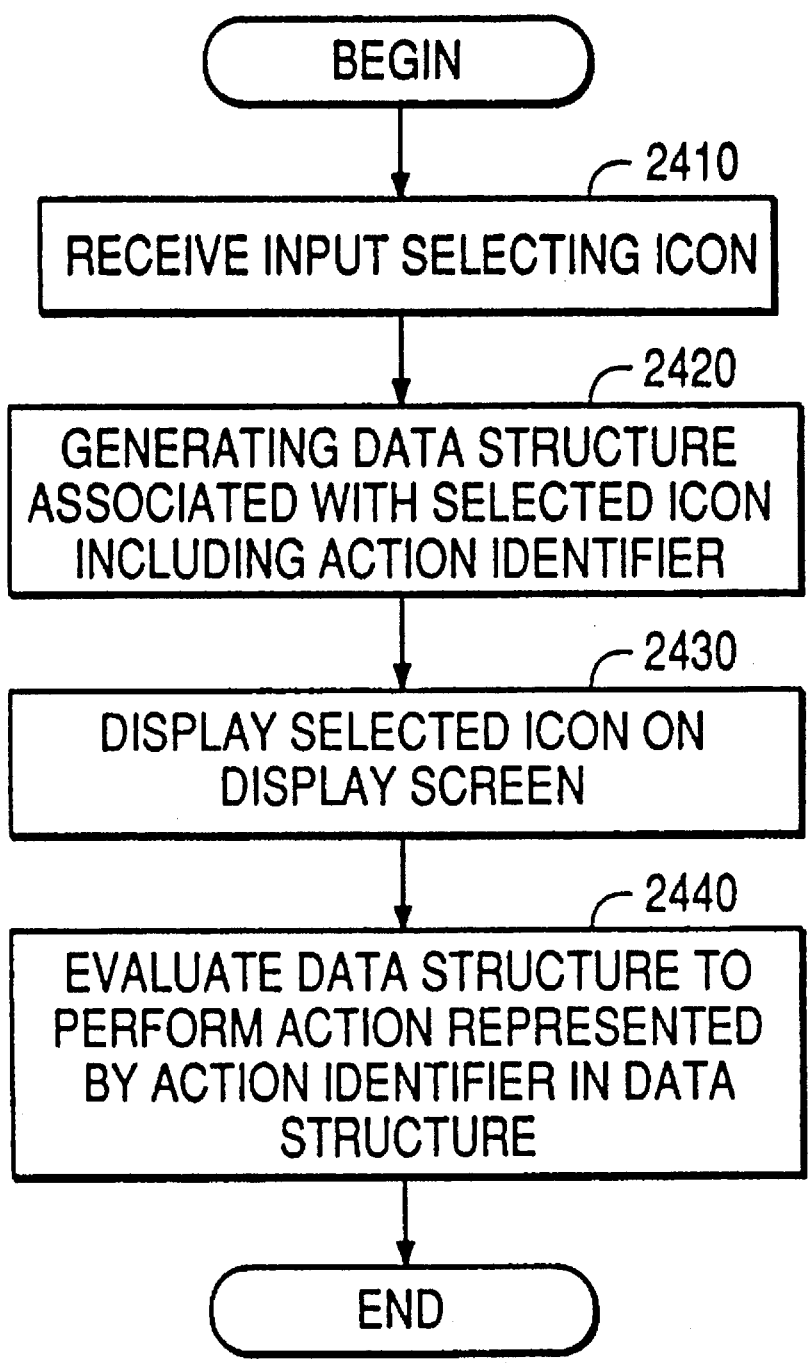

METHODS AND APPARATUS PROVIDING FOR A PRESENTATION SYSTEM FOR MULTIMEDIA APPLICATIONS

This application is a continuation of application Ser. No. 07/691,984 filed Apr. 26, 1991, now abandoned.

RELATED APPLICATIONS

This application is related to U.S. Ser. No. 07/691,865 entitled "METHODS AND APPARATUS PROVIDING FOR A MULTIMEDIA AUTHORING AND PRESENTATION SYSTEM," U.S. Ser. No. 07/691,965 entitled "METHODS AND APPARATUS PROVIDING FOR AN ICONIC PROGRAMMING AND DATABASE SYSTEM FOR MULTIMEDIA APPLICATIONS," and U.S. Ser. No. 07/692,230 entitled "METHODS AND APPARATUS PROVIDING FOR A PRESENTATION AND RESOURCE RELOCATION SYSTEM," all filed the same day as this application.

FIELD OF THE INVENTION

This invention relates to computer authoring systems and, more particularly, to a computer system for creating and presenting interactive multimedia presentations and coursework. The invention facilitates the creation and presentation of interactive multimedia presentations and coursework using a graphic interface display. This invention also relates to visual (or iconic) programming systems and, more particularly, to a visual programming system for creating software applications.

BACKGROUND OF THE INVENTION

Interactive multimedia presentations and coursework have become an important and effective method of presenting information and teaching. Additionally, the ability to program computers has also become an important skill which can take years to develop and master. Therefore, conventional computer systems have been developed which address each of these items. However, no known conventional computer system addresses both of these items.

A. Creation of Interactive Multimedia Presentations

When people communicate with each other, they use many different methods to creatively convey information. Among these methods of communication are: sound/music, pictures, words, numbers, animated sequences, and full motion video. The use of these methods in a presentation is typically referred to as the multimedia approach to communication.

Historically, multimedia presentations have been encumbered by the use of multiple technologies, such as slide projectors, videotapes, and computer graphics. But today, powerful computers offer a single delivery system or platform for integrated multimedia presentations. Thus, the speaker or teacher only needs to handle a single piece of equipment. The difficulty then remains in how the speaker or instructor is going to create and present multimedia presentations using these powerful computers.

In addition to creating an environment for multimedia presentations, the computer has also made it possible to create interactive presentations which means that the viewer can actually participate in a presentation by communicating with the computer. This has given rise to a class of computer software applications called courseware which is a powerful teaching and training tool. Again, the difficulty remains as to how the instructor is to create and present these interactive multimedia presentations.

One conventional computer system provides a method for specifying and executing independent, multimedia tasks along a synchronized time-line in the form of a matrix with the event elements making up the rows and the time periods making up the columns. Although this conventional system addresses the issue concerning the time consuming task of creating the presentation, this system fails to provide important interactive capabilities. Furthermore, this conventional system employs a time-line for the control of events in a presentation. Using a time-line requires the operator using such a conventional system to duplicate events so that the events can be executed in more than a single time period. This requires additional computer resources which is not desirable.

B. Visual Programming Systems and the Method of Visually Programming an Interactive Multimedia Presentation In general, programming may be defined as specifying a method for doing something the computer can do in terms the computer can interpret or understand. There are many aspects of programming: the languages and environment used for the specifications; the specifications themselves; the determination of whether the computer has executed a specification as expected; the display of data involved in the execution of the specification; etc.

In the past, traditional programming systems in well-known or standard programming languages, e.g., FORTRAN or PL/1 have been used to program computers. However, the problem with traditional programming systems is that they require programmers to learn the cryptic statements and rigid structure or syntax used by standard programming languages. It is for this reason that icons have been used to replace the cryptic statements of standard programming languages with visual programming languages to develop visual programming systems.

Visual programming can be applied to all aspects of programming. The important issue is creating meaningful graphic objects involved in an aspect of programming. This is addressed in the creation of visual programming systems.

One example of a visual programming system is Pict which is designed to aid program implementation using computer graphics. With Pict, users sit in front of a color graphics display and communicate with the system throughout all phases of their work by pointing to icons in a menu tree. Pict permits the user to select images that visually represent the data structures and variables needed; to draw the desired algorithm as a logically structured, multi-dimensional picture; to watch the program run; to see the results being generated; and if the program isn't doing what is expected, to see where and when the error occurs. Although Pict is a visual programming system having control structures for writing computer applications, Pict requires arrows or series of arrows to show the flow of an application. Using arrows to show the flow of an application is somewhat archaic, requires additional computer resources, and is not necessary to depict a program flow.

Although visual programming systems have been developed, these systems fail to appreciate the need to create a visual flowchart that symbolizes the logical flow of the application (or presentation) being developed. These visual programming systems also fail to concentrate on the flowchart metaphor to remove the tedium from program creation. These conventional visual programming systems fail to permit the programmer to assemble pictures, brushes, sounds, speech, animations, music, video, text, and datafiles and control them interactively via a mouse, keyboard, touchscreen, or joystick. Therefore, a single visual programming system which addresses all of these shortcomings of conventional visual programming systems is desirous.

IV. OBJECTS AND SUMMARY OF THE INVENTION

It is therefore an object of the present invention to provide for a computer system in which users can create multimedia presentations and coursework.

It is a further object of the present invention to provide for a visual programming system in which users can create applications.

It is still a further object of this invention to enable computer users to program interactive multimedia presentations using a visual programming system.

It is yet another object of the present invention to provide a method for designing presentations using integrated computer technologies on a single platform that enables the user to input, create, manipulate, and output text, graphics, audio, and video utilizing a single-user interface.

To achieve the objects of this invention and attain its advantages, this invention uses a graphic interface display which is implemented as a part of a flow editor and is used to create and to program interactive multimedia presentations and coursework. The present invention also includes other editors (e.g., a database editor, an expression editor, and an object editor) used to perform other editing functions required to create presentations. Furthermore, this invention includes control systems (e.g., an applications mover, a videodisc controller, and a help system) which also enable the user to create, program and execute interactive multimedia presentations. Finally, this invention includes an evaluator which evaluates a programmed presentation (or application) and implements the presentation.

More particularly, the process of this invention is in data processing system including a central processing unit, a memory for storing a plurality of data structures corresponding to a presentantion, and a display device. The display device has a display screen including a presentation area for displaying a presentation. Each one of the data structures includes an action identifier and a plurality of attributes. The process includes receiving a one of the plurality of data structures of the presentation, analyzing the received data structure to determine an action to be performed in response to the action identifier of the data structure, and performing the action corresponding to the action identifier in accordance with a plurality of the attributes of the received data structure.

The accompanying drawings which are incorporated in and which constitute part of this specification, illustrate an implementation of the invention and, together with the description, explain the principles of the invention.

BRIEF DESCRIPTION OF DRAWINGS

FIGS. 16A–16M illustrate flow diagrams of the object editor of FIG. 15.

FIG. 24 illustrates a flow diagram of the authoring system of the preferred implementation.

DETAILED DESCRIPTION OF THE PREFERRED IMPLEMENTATION

Reference will now be made in detail to the preferred implementation of the invention as illustrated in the accompanying drawings.

This invention is preferably implemented by a microcomputer or other data processing system. Such a data processing system may be conventional, however, the present invention is implemented in an Amiga microcomputer manufactured by Commodore Electronics Ltd. The architecture for and procedures to implement the present invention in the Amiga microcomputer, however, are also not conventional, as they provide for an unique approach to the creation and execution of interactive multimedia presentations and coursework as well as to the programming of applications software. The preferred implementation, which is disclosed hereinafter in functional schematic form, is written primarily in the C programming language.

Figure 1:
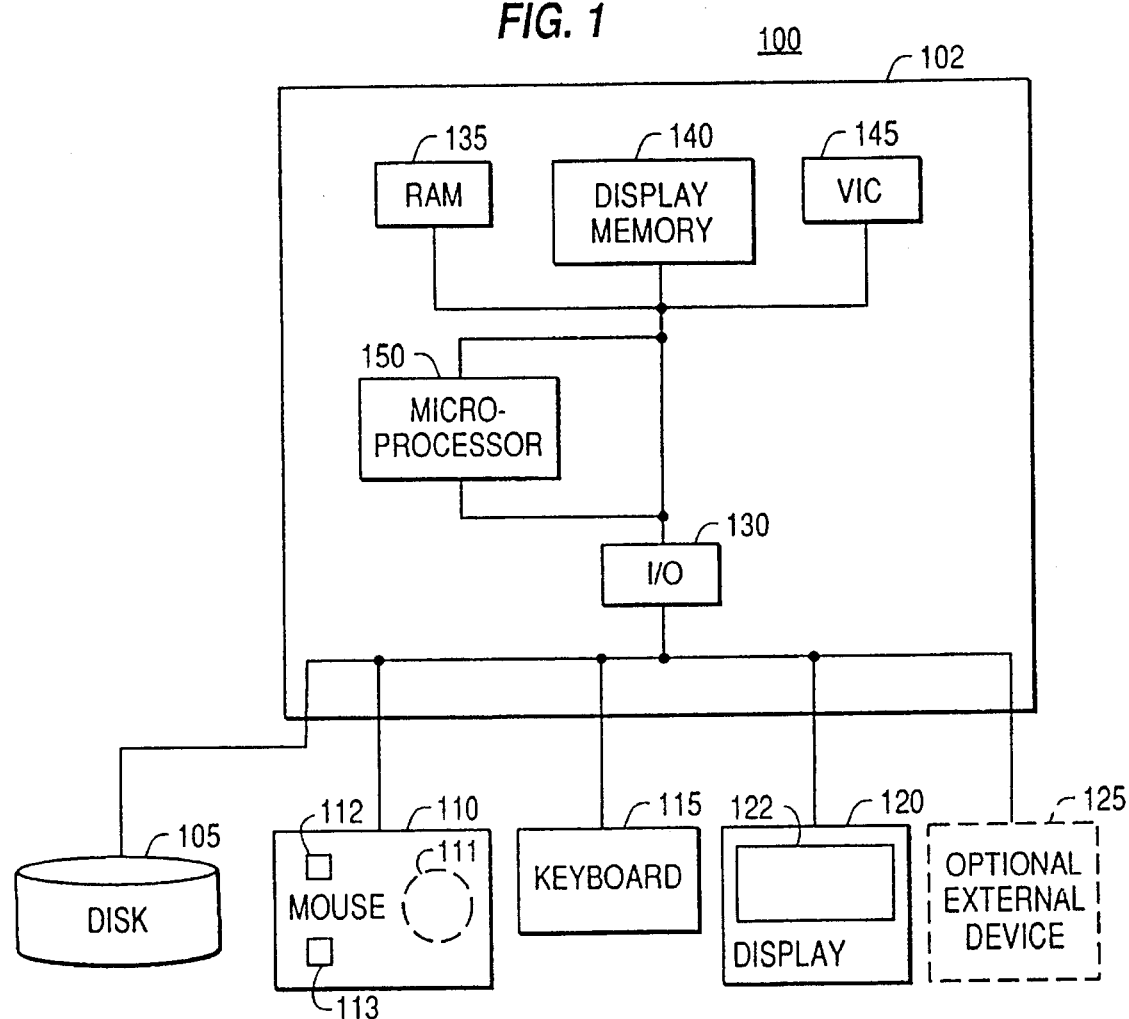
FIG. 1 is a block diagram illustrating the components of an exemplary computer system or platform in which the present invention may be implemented.

Referring to FIG. 1, the computer system or platform 100 is comprised of a central processing unit (or CPU) 102, a disk drive 105, a mouse 110, a keyboard 115, and a display 120. The platform 100 may also optionally include other external devices 125, such as a videodisc system or an electronic instrument system.

The CPU 100 is comprised of an input/output unit 130, a random access memory unit (or RAM) 135, a display memory unit 140, a video interface circuit (or VIC) 145, and a microprocessor 150. These units are all well known and operate under control of the system software to process various inputs and provide the outputs necessary to generate desired textual and graphic display information on the display screen 122 of the display 120 or other output unit such as the optional external device 125.

Display memory 140 is a specialized section of RAM which is used to store bit patterns (pixel data) which are read out by the video interface circuit 145 in an appropriate synchronization with the display beam of the display 120 in order to provide the desired display graphics and text.

The disk drive 105 is also conventional and is provided to permit the ready interchange of control and application software and to provide a source of mass storage for the computer system.

The mouse 110 of the computer system 100 includes a roller ball 111 and control buttons 112 and 113. The buttons actuate momentary contact switches to generate selection signals and other commands. These switches and signals are well known and, as is also well known, the user moves the mouse 110 along a planar surface, such as a table top, to generate cursor position input commands which are supplied to the CPU 102. The roller ball 111 cooperates with a mechanism which converts the movement of the mouse 110 into X-Y signals which are used by the CPU 102 to control positioning of the cursor symbol on the display screen 122 of the display 120. The conversion of the motion of the roller ball into x-y commands is also conventional.

The keyboard 115 may replace the activities of the mouse 110 by presetting a number of keys on the keyboard to emulate the positioning function of the mouse. Additionally, other keys on the keyboard 115 may replace the functions of the buttons 112 and 113 of the mouse 110. However, in the preferred implementation of the present invention, a mouse 110 is used for positioning the cursor on the display screen 122 and for performing other functions described below. As is generally the case with conventional data processing systems, the keyboard 115 of the computer system 100 of the preferred implementation of the present invention acts as a means of inputting textual or alphanumeric information into the CPU 102. As stated above, the display 120 is comprised of a display screen 122 for displaying the graphic and alphanumeric information output from the CPU 102. In the platform 100 of the preferred implementation the display 120 may be a touchscreen display in which commands may be entered into the CPU 102 via the display 120. Such touchscreen displays are also conventional.

Finally, in the preferred implementation of the present invention other external devices 125 may be connected to the platform 100 to participate in the execution of a presentation created by the user. Examples of these external devices are videodisc systems or electronic instrument systems. These systems are also conventional and when connected to the platform 100 may be used to create and present multimedia presentations and coursework.

A. The Major Components of the Preferred Implementation

The preferred implementation of the present invention is comprised of several software components 200 (FIG. 2) which would reside in the disk drive 105 (FIG. 1). When the user employs the preferred implementation of the present invention, all or part of the software components 200 of the preferred implementation may be input to the CPU 102 to service the needs of the user.

Figure 2:
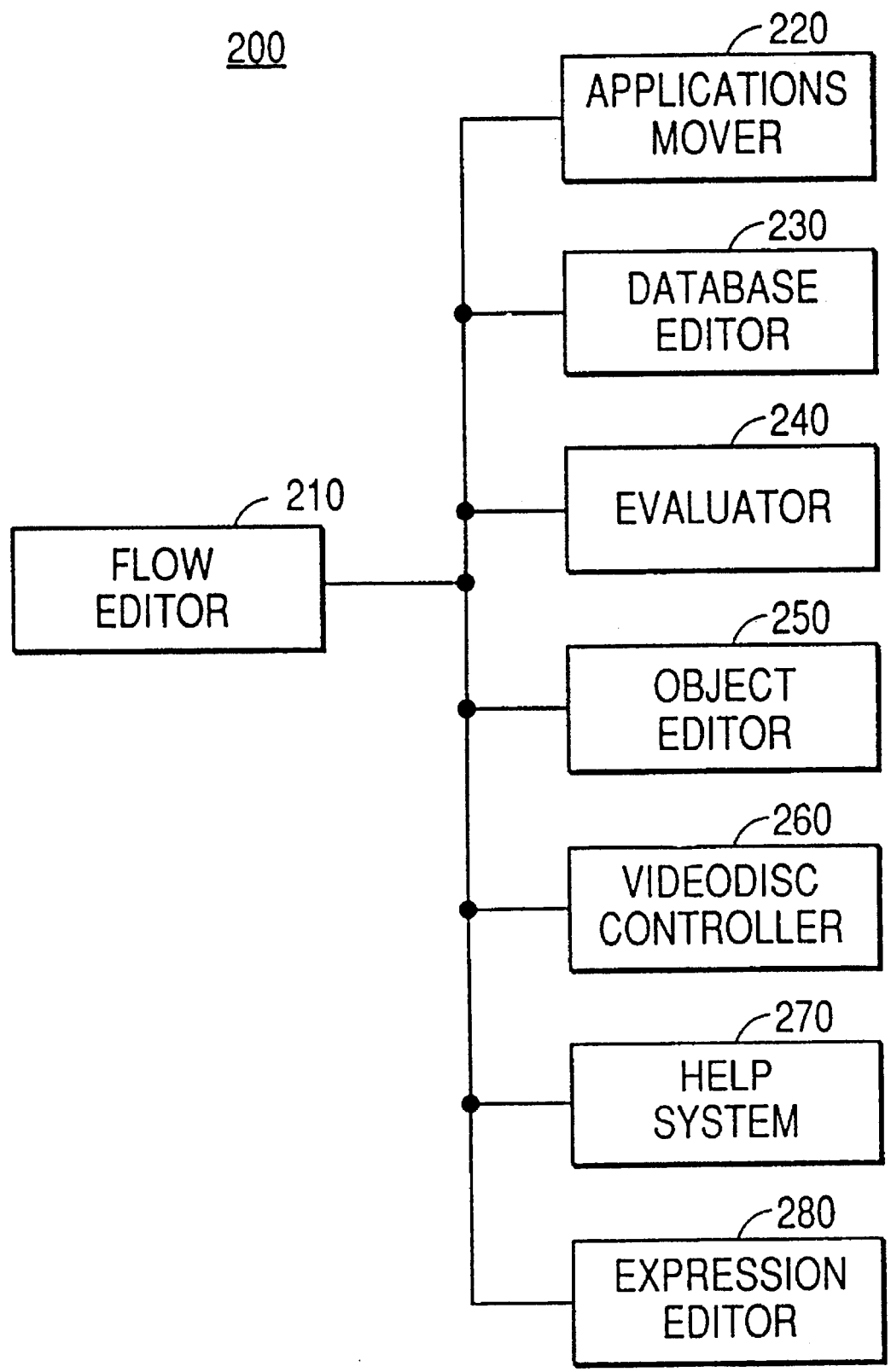
FIG. 2 is a block diagram which illustrates the software components of the preferred implementation of the present invention.

FIG. 2 is a block diagram which illustrates the software components 200 of the preferred implementation of the present invention. The preferred implementation is comprised of a flow editor 210, an applications mover 220, a database editor 230, an evaluator 240, an object editor 250, a videodisc controller 260, a help system 270, and an expression editor 280.

When the preferred implementation is invoked or begins execution in the platform 100, the flow editor 210 is the initializing component which provides for an editing environment which is supported of one or more flow windows generated on the display screen 122 of the display 120. The flow window is the canvas on which the user creates presentations. In this environment, the user can create and edit one or more presentations simultaneously by selecting icons, placing the icons in a particular location of a flow window, and defining the selected icons. The icons represent operations or activities to be performed during the execution of an presentation.

From the flow editor 210, the user can invoke the applications mover 220, the database editor 230, the evaluator 240, the object editor 250, the videodisc controller 260, and the expression editor 280, each of which will be described below. Additionally, the user can invoke the help system 270 from the flow editor 210.

In the preferred implementation menus, which are collections of system options, may be displayed on the current display screen 122 when and while the user presses the right mouse button 112. The user may then move the cursor, using the mouse 110, through the options of the displayed menus. As the cursor passes over a menu option, the option is highlighted on the display screen. The user may make a selection of one of the menu options by releasing the right mouse button 112 while the preferred implementation highlights the selected option. The preferred implementation supports menus in the flow editor 210 and the object editor 250 to allow the user to move throughout the editors and other support systems of the preferred implementation, as well as to add objects to the current display screen and select other editor-mode selections, e.g., alter color of current display screen of the flow editor.

Figure 3:
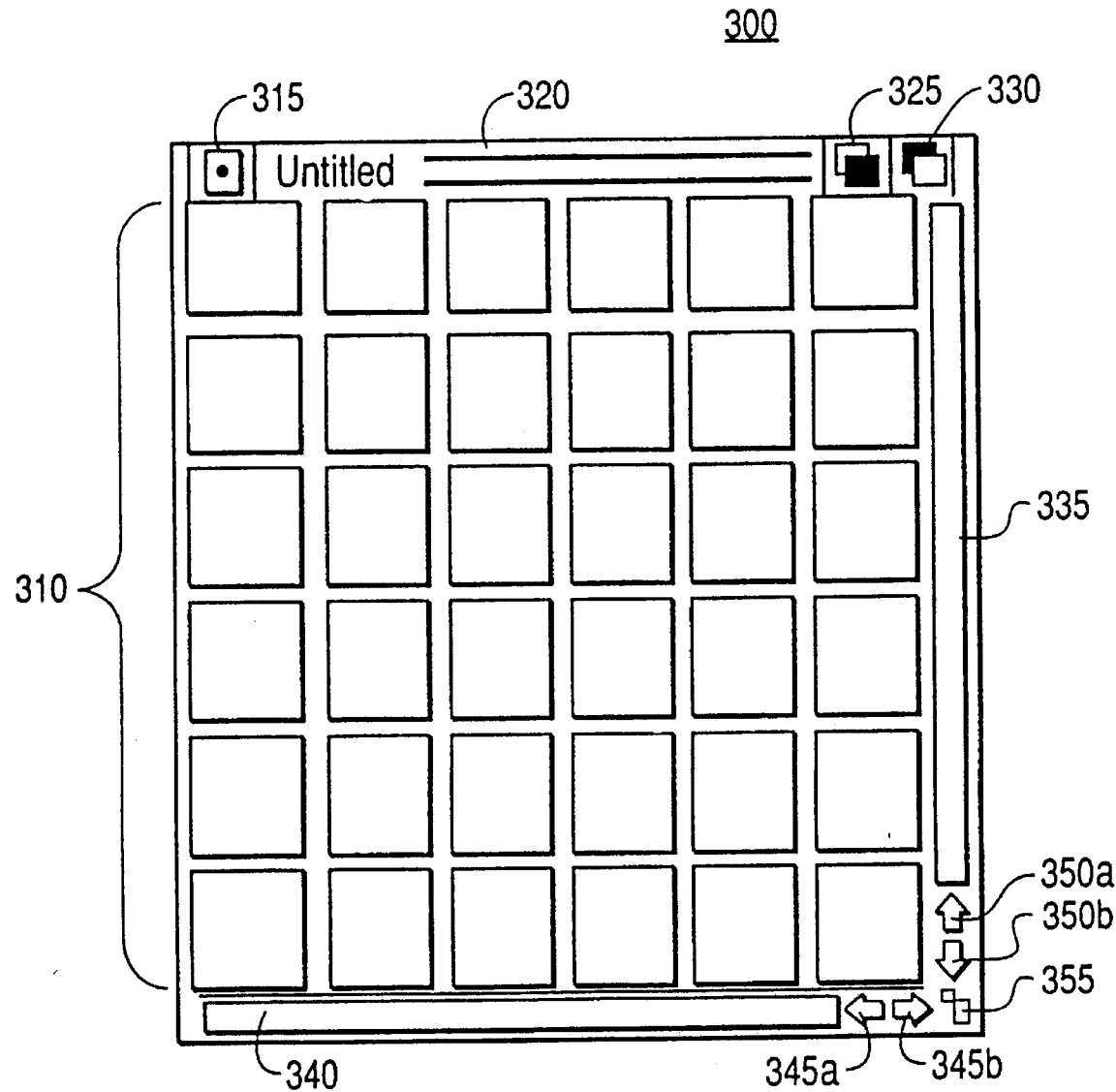
FIG. 3 is an illustration of a flow window generated by the flow editor of the preferred implementation of the present invention.

FIG. 3 illustrates an example of a flow window 300. The flow window 300 is the interface used to create and edit presentations in the preferred implementation of the present invention. The flow window 300 is comprised primarily of the Graphic Interface Display (or GRID) 310 upon which a user can place selected icons (discussed below). One or more icons on the GRID 310 can form a presentation.

The flow window 300 also consists of a number of gadgets. A gadget is an area in the flow window 300 which allows the user to change what is being displayed by communicating a command to the CPU 102 (FIG. 1). The flow window 300 includes a close window gadget 315, a drag bar gadget 320, window-to-front gadget 325, a window-to-back gadget 330, a vertical positioning gadget 335, a horizontal positioning gadget 340, scrolling gadgets 345a and 345b, and 350a and 350b, and a flow window resizing gadget 355.

When the user manipulates the mouse 110 so as to position the cursor on the close window gadget 315 and clicks the left mouse button 113, the flow editor 210 of the preferred implementation receives a command to close the flow window 300. A click of the left mouse button 113 is a quick press and release of that button 113.

The drag bar gadget 310 serves two purposes. First, the drag bar gadget 320 serves as an area of the flow window 300 in which the name or title of the presentation may be displayed. When the user has not yet titled the presentation presently displayed on the GRID 310, the area of the drag bar gadget 320 in which the title would be displayed contains the title: Untitled, as illustrated in FIG. 3. A presentation name would appear in place of the untitled area of the drag bar gadget 320 if the user names the current presentation in the GRID 310 or loads from the disk drive 105 a previously saved presentation (discussed below). Second, the drag bar gadget 320 may be used to reposition the flow window 300 horizontally or vertically within the display screen 122 of the display 120 (FIG. 1). Again, to reposition the flow window 300, the user positions the cursor on the drag bar gadget 320 using the mouse 110 and depresses the left mouse button 113. Using the mouse 110, the user can then drag or move the flow window 300 within the display screen 122 until the left mouse button 115 is released.

The window-to-front gadget 325 and the window-to-back gadget 330 serve opposite purposes. The window-to-back gadget 325 permits the user to move a currently displayed flow window 300 to the back of all currently displayed flow windows. The window-to-front gadget 330 permits the user to move a currently displayed flow window 300 to the front of all currently displayed flow windows. Again, these gadgets are activated by positioning the cursor on the selected gadget in the display screen 122 using the mouse 110 and clicking the left mouse button 113 thereby instructing the flow editor 200 to reposition the currently displayed flow window 300 in accordance with the selected gadget.

The vertical positioning gadget 335 and horizontal positioning gadget 340 permit the user to instruct the flow editor 210 to view a viewable portion or region of the presentation presently displayed on the GRID 310. The viewable portion of the presentation is determined by the selected size of the flow window 300. The scrolling gadgets 345a and 345b, and 350a and 350b permit the user to scroll vertically or horizontally within a presentation and the flow window resizing gadget 355 permits the user to resize the flow window 300. These gadgets and all other gadgets and buttons on the display screen 122 during execution of the preferred implementation are initiated in the same manner as the gadgets discussed above.

Returning to FIG. 2, the preferred implementation of the present invention also includes an applications mover 220 which is used by the preferred implementation to move presentations from one location, e.g. the disk drive 105 (FIG. 1), to another location, for example a second disk drive (not shown in FIG. 1). The details of the applications mover 220 will be discussed below with reference to FIG. 22.

The preferred implementation includes a database editor 230 which permits the user to create and manipulate databases for use with presentations. The database editor 230 allows the user to create a database in a standard database format; add, update and delete data records; as well as delete full databases. These operations of the database editor are conventional, however, the method by which the preferred implementation interfaces with the database editor 230 is not conventional and will be described below with reference to FIGS. 17–20.

The preferred implementation also includes an evaluator 240. The evaluator 240 of the preferred implementation of the present invention controls the execution of presentations created with the editors 210, 250, and 280, and the videodisc controller 260. The details of the evaluator 240 of the preferred implementation will be described below with reference to FIGS. 23A–23G.

The object editor 250 of the preferred implementation is used to create display objects for use in a presentation. Display objects are independent visual objects which the user can place on the display screen 122 (FIG. 1). The preferred display objects are: (1) rectangles, (2) polygons, (3) lines, (4) circles, (5) ellipses, (6) text, (7) brushes, and (8) data entry fields. With the object editor 250, the user can create these objects and turn these objects into user input areas that add interactivity to presentations. These input areas are referred to as hit boxes. The functions of the object editor 250 will be discussed below with reference to FIGS. 16A–16M.

The preferred implementation also contains a videodisc controller 260. This controller 260 is used to define video sequences or display selected frames of a videodisc. The videodisc controller 260 permits the user to view video, save frame numbers of a videodisc, and perform other browsing functions of a videodisc. The frame numbers are saved so that they may be used with the video icon (discussed below) to include video in a presentation.

The preferred implementation also includes an expression editor 280. The expression editor 280 is used to define variables and expressions used in a presentation. Variables are useful for storing values in either numerical or in alphabetical (string) form. Variables can then be used in expressions which may be assignment expressions or conditional expressions.

An assignment expression is an expression in which the presentation requests that the preferred implementation assign a value to a variable, for example SCORE=100. In this example of an assignment expression, the variable SCORE is assigned the value 100. In this manner, a presentation can refer to the variable SCORE for the number 100. The conditional expression is generally used to control flow of a presentation. For example, a conditional expression may be SCORE>=100. In this expression, SCORE is greater than or equal to 100 and the preferred implementation understands this conditional expression as meaning "if score is greater than or equal to 100." Further details of the expression editor will be described below with reference to FIGS. 13 and 14.

Finally, the preferred implementation includes a help system 270. The help system 270 provides the user with helpful information which the user requires in order to properly perform selected functions within the preferred implementation. The functions used by the help system 270 of the preferred implementation are conventional and will therefore not be described.

B. Icons (Menus and Submenus) and Relationships

At the center of the preferred implementation is the icon menu which stretches across the bottom of the display screen 122 (FIG. 1) when the preferred implementation is first invoked by the user. The user inputs to the CPU 102 an appropriate command to invoke or begin the processing of the preferred implementation. When the preferred implementation is invoked by the user, the processing of the flow editor 210 begins.

To select an icon from the icon menu, the user positions the cursor, using the mouse 110 (FIG. 1), on the selected icon and clicks the left mouse button 113. The preferred implementation then either displays an icon submenu (FIGS. 5A–5F) or permits the user to drag the selected icon into the flow window 300 for placement in the GRID 310.

Figure 4:
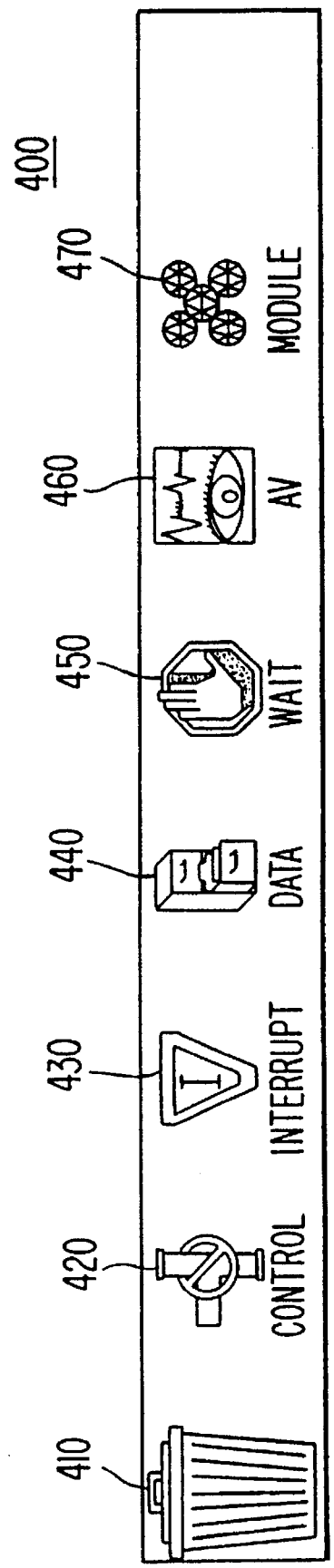
FIG. 4 illustrates the main icon menu 400 of the preferred implementation of the present invention.

FIG. 4 illustrates the main icon menu 400 of the preferred implementation of the present invention. When entering the flow editor 210 (FIG. 2), the main icon menu 400 appears on the bottom of the display screen 122. In addition to a trashcan icon 410, the main icon menu 400 offers access to six submenus of icon commands.

The trashcan icon 410 displayed in the main icon menu 400 is used during an editing session in the flow editor 210 (FIG. 2) of the preferred implementation to throw away or discard unwanted icons.

Figure 5A:
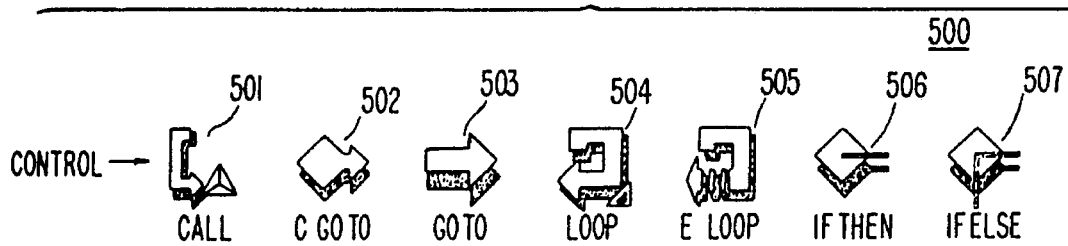
FIG. 5A illustrates the control icon submenu of the preferred implementation of the present invention.
Figure 5B:
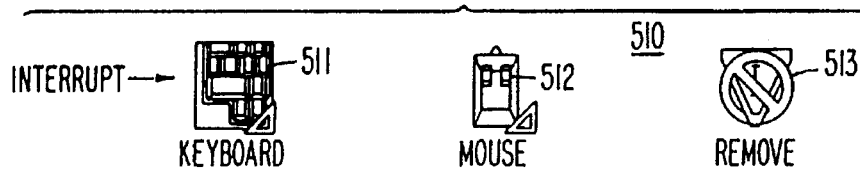
FIG. 5B illustrates the interrupt icon submenu of the preferred implementation of the present invention.
Figure 5C:
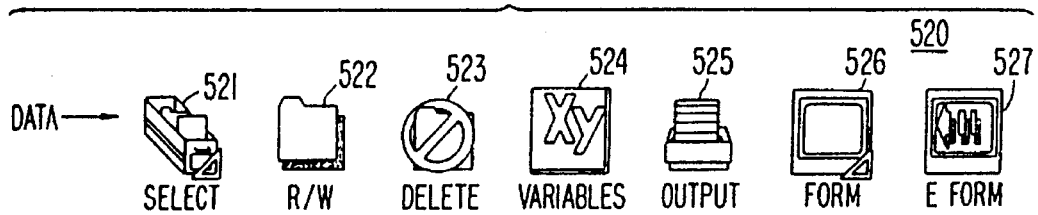
FIG. 5C illustrates the data icon submenu of the preferred implementation of the present invention.
Figure 5D:
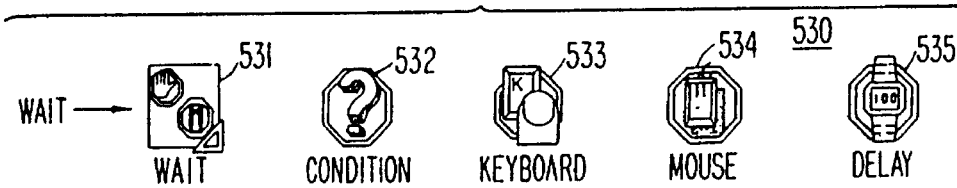
FIG. 5D illustrates the wait icon submenu of the preferred implementation of the present invention.
Figure 5E:
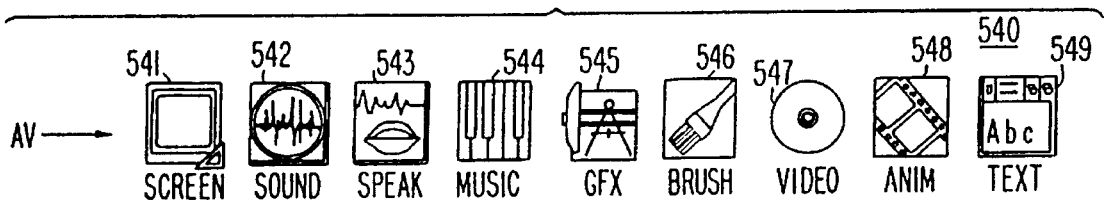
FIG. 5E illustrates the AV icon submenu of the preferred implementation of the present invention.
Figure 5F:
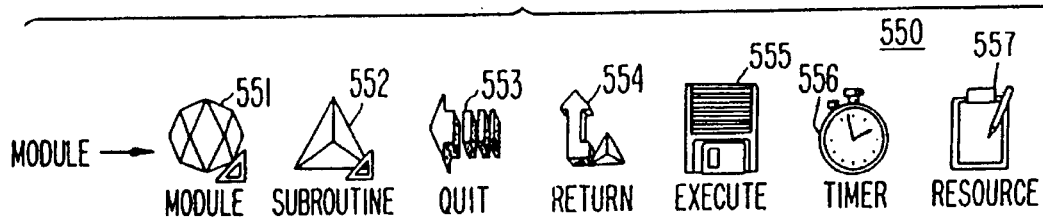
FIG. 5F illustrates the module icon submenu of the preferred implementation of the present invention.

The control icon 420 offers the submenu of icons illustrated in FIG. 5A, the interrupt icon 430 offers the submenu of icons illustrated in FIG. 5B, the data icon 440 offers the submenu of icons illustrated in FIG. 5C, the wait icon 450 offers the submenu of icons illustrated in FIG. 5D, the AV icon 460 offers the user a submenu of icons illustrated in FIG. 5E, and the module icon 470 offers the user a submenu of icons illustrated in FIG. 5F.

Figure 6:
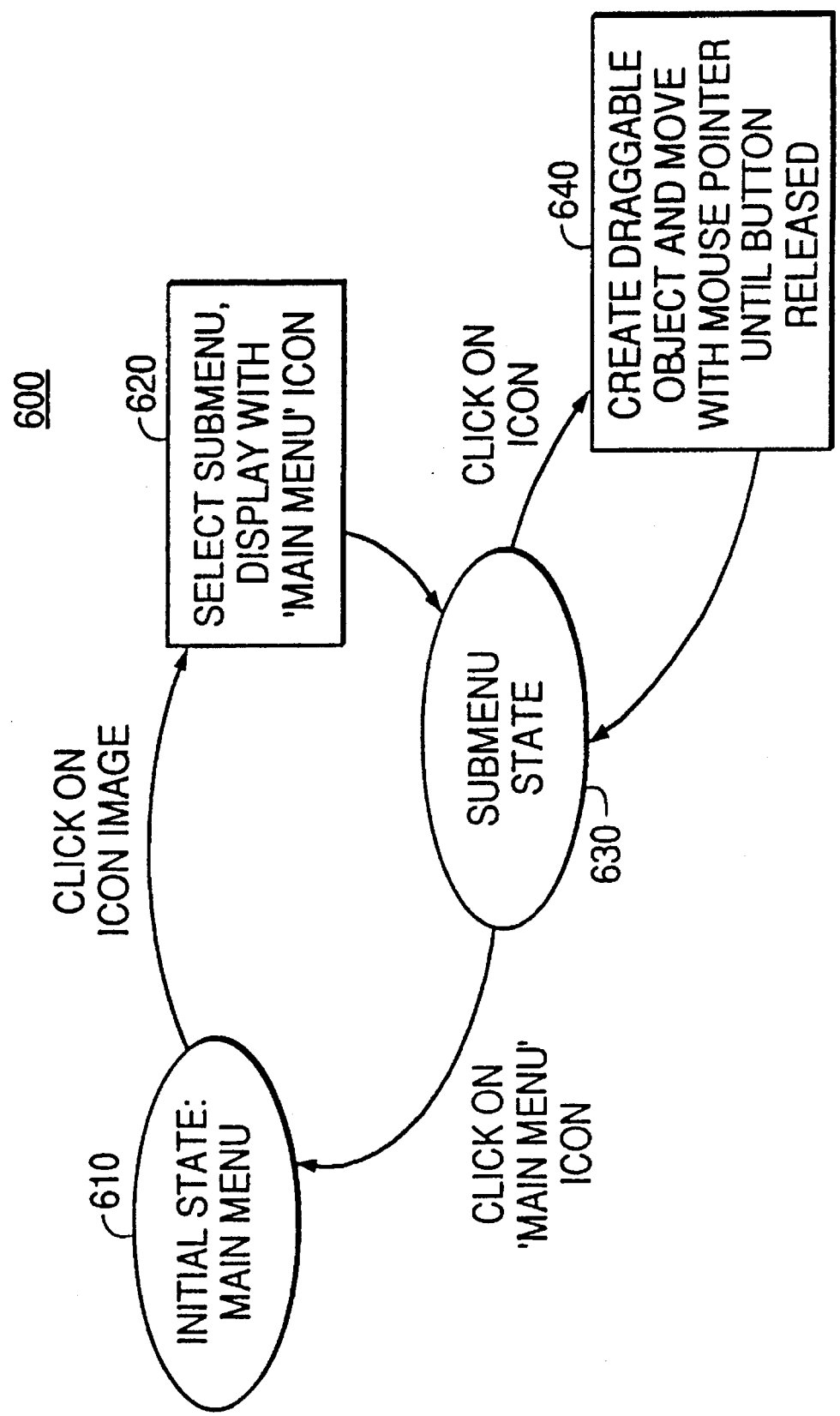
FIG. 6 illustrates the icon menu operational flow of the main icon menu and the icon submenus illustrated in FIGS. 5A–5F.

FIG. 6 is a state diagram which illustrates the method used by the preferred implementation to scroll from the main icon menu 400 to the icon submenus illustrated in FIGS. 5A–5F. First, when the user begins an editing session in the flow editor 210 of the preferred implementation, the main icon menu 400 is displayed in the bottom of the display screen 122 (state 610). When the user positions the cursor using the mouse 110 on an icon in the main icon menu 400 and clicks the left mouse button 113 on the selected icon, the user selects one of the icon submenus (state 620) and the selected icon submenu along with the main menu icon (not shown in FIGS. 5A–5F) and trashcan icon 410 are displayed on the bottom of the display screen 122 (state 630).

When the user positions the cursor using the mouse 110 on a icon from the selected icon submenu and clicks the left mouse button 113 on the icon, the selected icon becomes a draggable object. Holding the left mouse button 113 down, the user can then drag a copy of the icon from the icon submenu into the GRID 310 of the flow window 300. The icon remains a draggable object until the user releases the left mouse button 113 (used to drag the icon) when the icon is in the selected space on the GRID 310 (state 640). This process is described below in detail with reference to the processes of the flow editor 210.

Once the left mouse button 113 is released, flow editor operation is returned to the submenu state 630. To return from the submenu state 630 to the main icon menu state 610, the user merely positions the cursor using the mouse 110 on the main menu icon (not shown) which is displayed on the far right in every icon submenu and clicks the left mouse button 113. This informs the flow editor 210 to return to the main menu state 610.

Each of the icons in the icon submenus (FIGS. 5A–5F) represents an action to be performed at the time of the presentation's evaluation (discussed below). Most of the icons perform a general type of action (e.g., playback of animation), but must be individually defined by the user. This definition may include, for example, the selection of the animation file to be played, the number of iterations, the position on the screen, as well as other pieces of information.

The flow window 300 is displayed with the GRID 310 marking the positions icons may be placed. An icon's position, relative to the other icons in the GRID 310, determines how the icons interact. The default traversal of the icon structure is from the top of a presentation in the GRID 310 to the bottom. Icons immediately above/below each other are called sibling icons. Certain icons may be used to group a collection of other icons. These are displayed on the main icon menu 400 (FIG. 4) or submenus (FIG. 5A–5F) with a hollow triangle pointing to the lower right of the icon. When these types of icons are placed in the GRID 310, other icons may be placed below and to the right of them. The triangle is then displayed as a solid, with the marked icon being called the parent and the lower icons called children.

This parenting process allows a presentation to be maintained in a modular manner. When a parent icon is dragged about the presentation and placed in a new position, all of its children are also moved to the new location. When the parent is dragged outside of the GRID 310 and dropped on top of the trashcan icon 410, all of its children are also deleted from the displayed presentation.

In the preferred implementation, there are four basic icon relations: parent icons, child icons, sibling icons, and partner icons. These relations can have a direct effect on the order of execution of a presentation which will be discussed below.

In the preferred implementation, there are nine icons which can function as parent icons: the module icon 551, subroutine icon 552, screen icon 541, loop icon 504, form icon 526, select icon 521, keyboard interrupt icon 511, mouse interrupt icon 512, and grouped wait icon 531, each of which will be described below with reference to FIGS. 5A–5F. As stated, these parent icons are identified by the presence of a hollow triangle in the lower right of the icon. This triangle indicates that the user can place child icons underneath the parent icon. When a parent icon is selected and placed in the GRID 310 and the user selects one or more child icons and places them to the right of the parent icon, the triangle is filled in. On the GRID 310, child icons would be placed beginning one column to the right and one row down from a parent icon.

Figure 7A:
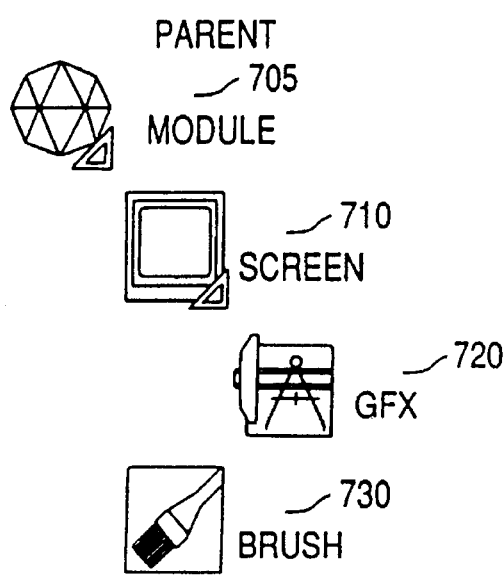
FIGS. 7A–7D illustrate the relationships used by the preferred implementation to describe icons on the GRID of the flow-window of FIG. 3.

FIG. 7A illustrates an example of the parent icon-child icon relationship. The module icon 705 of FIG. 7A is a parent icon. This is identified by the triangle in the lower right corner of the module icon 705. In this case, the triangle of the module icon 705 is filled in or appears solid because this module icon 705 has child icons: the screen icon 710, and the brush icon 730. The graphic icon 720 is a grandchild to the module icon 705 and is therefore a descendant of the module icon 705. The operations or acts which would be performed in response to each of these icons will be described below with reference to FIGS. 5A–5F. The screen icon 710 of FIG. 7A is a parent icon with the graphics icon 720 as its child. The parent-child relationship of icons in the preferred implementation is important because the relationship of icons determines the method and order by which the evaluator 240 will execute the operations or acts identified by the icons.

Figure 7B:
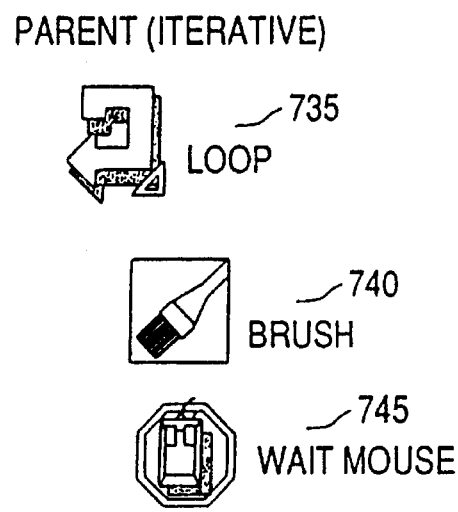

FIG. 7B also illustrates another example of the parent icon- child icon relationship, however, in FIG. 7B, the loop icon 735 is a parent icon which signifies that this parent icon-child icon relationship is one of a parent iterative relationship. This means that the loop icon 735 is used to inform the evaluator 240 to repeat certain operations identified by the child icons of the loop icon 735. The actions of the child icons would be repeated until a condition associated with the loop icon 735 is evaluated as true. In this example, the brush icon 740 and the wait mouse icon 745 would be child icons of the parent loop icon 735 and these child icons may be performed more than once, depending upon the conditions of the loop icon 735.

Figure 7C:
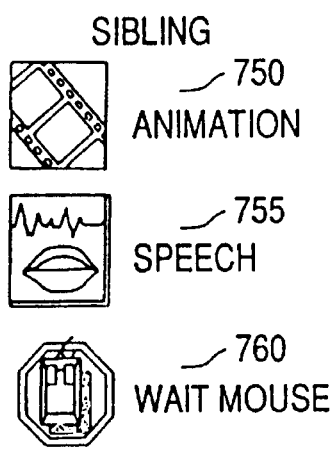

The preferred implementation also has sibling icons. Sibling icons are icons that are directly above and below each other. The sibling icon may have a partner icon or one or more child icons. FIG. 7C illustrates an example of three sibling icons: an animation icon 750, a speech icon 755, and a wait mouse icon 760, each of which will be described below with reference to FIGS. 5A–5F. As sibling icons, when the evaluator 240 of the preferred implementation executes the operations of the these icons, their operations are performed in a top-down fashion or sequentially.

Figure 7D:
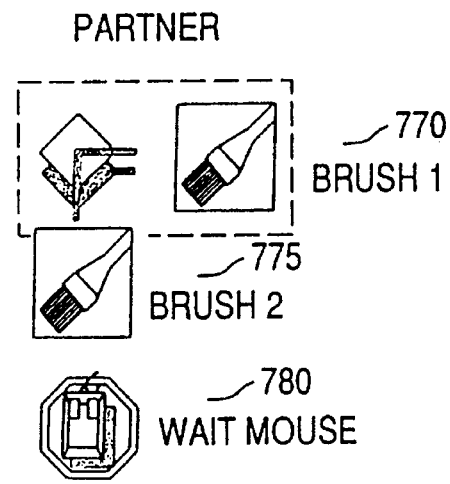

The forth icon relation used by the preferred implementation is the partner relationship. FIG. 7D illustrates an example of the partner icon relationship. The if-then-else icon 765 requires a partner icon which, in this example, is the brush icon identified by the label brush 1 770. If the expression or condition associated with the if-then-else icon 765 is evaluated during execution as true, then the operations of the partner icon, the brush 1 icon 770, will be executed. Otherwise if the condition of the if-then-else icon 765 is evaluated as false, then the operation of the sibling icon, the brush icon labeled brush 2 775 is executed. In the preferred implementation, if the operation of the partner icon of an if-then-else icon 765 is executed, then the evaluator 240 will continue execution beginning with the next sibling icon immediately following the icon which follows the if-then-else icon. In this example, if the actions of brush 1 770 are executed, then brush 2 775 is skipped and evaluation continues with the icon following brush 2 775 in the presentation which is the wait mouse icon 780.

Returning to FIGS. 4 and 5A–5F, the main icon menu 400 and icon submenus FIGS. 5A–5F will be described. When the user selects an icon from the submenus FIGS. 5A–5F and places the selected icon in the GRID 310 for a presentation, an icon requester must, in most cases, be completed to define the selected icon. Several icons however do not require definition using requesters or the expression editor 280.

Each icon in the submenus FIGS. 5A–5F has a different icon requester. In general, an icon requester is a window (or framed area on the display screen 122) containing information specific to a given icon which must be completed by the user to properly define or describe the attributes for an icon. As will be described in detail below with reference to the operations of the flow editor 210, after the user selects an icon and places it in the GRID 310, the user clicks the left mouse button 113 twice (a double click) to reveal (or to have the flow editor 210 generate on the display screen 122) the appropriate icon requester. The user then completes the icon requester to properly define the icon for later evaluation by the evaluator 240 of the preferred implementation. In cases where no icon requester is used to define an icon the expression editor 280 may be used to define the icon. In other cases, no icon definition is necessary, e.g. call icon or goto icon.

The submenu accessible through the control icon 420 of the main icon menu 400 is used to affect the flow of a presentation through the use of branches and conditional statements. When the user is in the flow editor 210 of the preferred implementation and selects the control icon 420, the main icon menu 400 displayed on the bottom of the display screen 122 is replaced by the control icon submenu 500 (FIG. 5A). In addition to the submenu 500, the trashcan icon 410 is displayed in the far left of the bottom of the display screen 122 and the main menu icon (not shown) which, when selected by the user, returns the main icon menu 400 to the display screen 122, is displayed in the far right of the bottom of the display screen 122. Both the trashcan icon 410 and the main menu icon (not shown) are displayed when the preferred implementation is in the submenu state 630 (FIG. 6) with any of the submenus (FIGS. 5A–5F) displayed on the display screen 122.

The control icon submenu 500 consists of 7 icons. The call icon 501 executes a subroutine which must be defined by the user using the subroutine icon 552 of FIG. 5F. When the user is in the flow editor 210 and selects the call icon 501 and places a copy of the call icon 501 in the GRID 310 (FIG. 3), a referencing placeholder icon (not shown) will appear on the GRID 310 adjacent to the selected call icon which is used to hold the partner icon for the call icon. The partner icon for the call icon 501 is the subroutine icon 552 of FIG. 5F.

A subroutine is a collection of icons with the subroutine icon 552 of the module icon submenu 550 of FIG. 5F as its parent. During evaluation, when a presentation reaches a call icon 501, the referenced subroutine identified in the partner icon to the call icon is performed. During the performance of the subroutine, when either a return icon 554 (FIG. 5F) is encountered or if the subroutine is completed, the presentation will continue starting with the icon following the call.

To select a partner to the call icon 501 placed in the GRID 310, the user double clicks the left mouse button 113 on the referencing placeholder icon adjacent to the referencing icon (e.g., call icon 501). The user is then asked whether he or she wishes to specify the icon to be referenced (e.g., the partner). If yes, then the next icon upon which the user places the cursor on the display screen 122, using the mouse 110, and double clicks the left mouse button 113 initiates the referencing process. The user if then asked if the double clicked icon is the desired referencing partner icon. If yes, then the referenced icon's image replaces the original referencing placeholder icon, and the referencing process is complete. If the user does not wish to reference the selected icon, then the selection process may be continued with another reference icon or aborted.

The conditional-goto icon 502 is used to branch to another part of a presentation on a specified condition. This icon conditionally transfers the flow of logic from one part of the presentation to another. The conditional-goto icon 502 cannot contain children, but requires a partner. The partner is a reference to an icon elsewhere in the presentation. In a manner similar to the call icon 501, when the user selects the conditional-goto icon 502 and places the icon on the GRID 310 for a presentation, a placeholder icon (not shown) appears in the GRID 310 adjacent to the conditional-goto icon which holds the place for the partner icon which will identify where to branch to in the presentation. The user selects a partner for this icon in the manner described above with reference to the call icon 501. Additionally, the user must input an expression, using the expression editor 280 (discussed below), to indicate to the presentation when it is to branch to the identified partner. To invoke the expression editor 280, after placing the conditional-goto icon 502 on a GRID 310, the user places the cursor over the icon and double clicks the left mouse button 113.

Another control icon in the control icon submenu is the goto icon 500. This icon is used for unconditional branching or transfer control within a presentation. The goto icon 503 cannot contain children, but, like the call icon and conditional goto icon 502, requires a partner. Again, when the goto icon 503 is selected by the user from the control icon submenu 500 and placed in a GRID 310, a placeholder appears in the GRID adjacent to the goto icon and the user must specify where the presentation is to branch to when executing the goto statement. This icon represents an unconditional branch in a presentation and therefore does not require definition by using a requester or the expression editor 280. However, the user must select a partner for this icon in the manner described above with reference to the call icon 501.

Another control icon in the control icon submenu 500 is the loop icon 504. The loop icon 504 is used to specify a loop structure within a presentation. The loop icon 504 does not have a partner, but it does require children as described above with reference to FIG. 7B. Children are identified on the GRID 310 by placing icons on the GRID 310 in the column to the right of the parent icon beginning with the row directly below the row upon which the parent icon is placed. The user selects the loop icon 504 to set up a structure to cycle through a group of children icons.

Three types of loops may be constructed with the flow editor 210 and are defined using the loop icon requester and the expression editor (discussed below). They are: the endless loop, the counted loop, and the conditional loop. Each of these loop structures has different exit conditions. The endless loop can be terminated with the loop exit icon 505, which can also be used to terminate the other types of loop structures. The counted loop terminates at the end of the count specified using the loop icon requester and the conditional loop is ended when a selected condition, written in the expression editor, is set to false during the performance of a presentation. During a presentation, when the presentation reaches a loop icon, the actions of the children icons are performed. When the actions of the children icons are completed, the presentation will resume execution from the beginning of the loop. If an exit condition is reached, the loop stops and the presentation moves on to the next sibling of the loop icon.

The exit loop icon 505 ends a loop structure and during a presentation, when an exit loop icon 505 is reached, the presentation continues with the next sibling icon following the loop. The loop exit icon cannot contain children and does not have a partner icon. The loop exit icon 505 does not require definition by an icon requester because when this icon is encountered during execution of a presentation, the current (inner-most) loop executing is exited.

The if-then icon 506 of the conditional icon submenu 500 is used to define a condition which, if true, will cause the action of its partner icon to be performed during a presentation. If the condition is false the partner icon is skipped and the action of the sibling icon following the if-then icon will be performed. In either case, the icon following the if-then icon is always performed. Thus, the if-then icon 506 cannot have children but does require a partner. Again, to set the condition for the if-then icon, the user defines the if-then icon 506 using the expression editor (discussed below) which can be initiated from the flow editor 210 by double clicking the left mouse button 113 while the cursor is positioned on the if-then icon 506 placed in the GRID 310. The partner icon for the if-then icon 506 is selected in the same manner discussed above with reference to the call icon 501.

Finally, the control icon submenu 504 has an if-then-else icon 507. This icon 507 defines a condition for executing one of two separate icons: one if the case specified in the condition, set using the expression editor, is true and one if the condition is false. Similar to the if-then icon 506, the if-then-else icon 507 cannot have children, but requires a partner. During the presentation, if the condition specified for the if-then-else icon in a presentation is true, the presentation performs the actions of its partner icon. It then skips the icon following the if-then-else icon which represents the else part. If the condition is false, then the presentation performs the action of the else part, which is the sibling icon immediately following the if-then-else icon. The if-then-else icon 507 in a presentation is defined using the expression editor (discussed below).

Returning to FIG. 4, the icon main menu 400 also has an interrupt icon 430. When the interrupt icon 430 is selected by the user in the flow editor 210, the interrupt icon submenu 510 of FIG. 5B is displayed on the bottom of the display screen in place of the main icon menu 400. The interrupt icon submenu 510 in the preferred implementation consists of three interrupt icons: (1) the keyboard interrupt icon 511, (2) the mouse interrupt icon 512, and (3) the remove interrupt icon 513. These icons are used to define an action in a presentation that is to be performed during a presentation when the executing presentation is interrupted.

The keyboard interrupt icon 511 allows an interruption to the executing presentation when certain keys are pressed. If one of the specified keys is pressed, the presentation will pause, and the actions of the children of the keyboard interrupt icon will be performed. Thus, the keyboard interrupt icon 511 can have children as well as siblings. The keyboard interrupt icon 511 is defined using the keyboard interrupt icon requester and the object editor 250 (discussed below). To initiate the keyboard interrupt requester, the user double clicks the left mouse button 113 while the cursor is on the icon in the GRID 310. The keyboard interrupt requester has a gadget that, when selected, enables the user to enter the object editor 250.

The mouse interrupt icon 512 interrupts a presentation when a mouse button 112 or 113 is clicked. The mouse interrupt icon 512 defines an interrupt to the presentation flow if the mouse is clicked in a certain area of the display screen 122. If interrupted, the presentation will pause and the actions of children of the interrupt will be performed. The mouse interrupt icon 512 is defined using the mouse interrupt icon requester and the object editor 250 (discussed below). To initiate the mouse interrupt requester, the user double clicks the left mouse button 113 while the cursor is on the icon in the GRID 310. The mouse interrupt requester has a gadget that, when selected, enables the user to enter the object editor 250.

Finally, the remove interrupt icon 513 only disables interrupts in the same column on the GRID 310 of the presentation that have the same parent. This icon 513 does not contain children.

Another submenu of the main icon menu 400 is the data icon submenu 520 illustrated in FIG. 5C. The data icon submenu 520 defines a set of icons used to define variables, define data entry forms, store and retrieve data from a database, and define printed or file output in a presentation. Of the data icons in the data icon submenu 520 there are three icons which exclusively relate to data operations on an existing database: the select icon 521, the read/write icon 522, and the delete icon 523 (FIG. 5C).

The select icon 521 of the submenu 520 can be used to open a database file and select records using one or more fields. The select icon can have other icons as children. One or more of the fields may be key fields. As described more fully below with reference to the database editor 230 of the preferred implementation, a key is made up of one or more fields of the database record structure and is used when searching the data file for a specific record or a set of records. For example, a database of employee information may contain employee information alphabetically by the last name or by employee ID number. Therefore when creating the database the last name field and employee ID field are specified as key fields. In this way, the user can access data records either by specifying the employee ID or the employee last name. The select icon 521 in a presentation is defined using the select icon requester.

Another data icon in the data icon submenu 520 is the read/write icon 522. This icon 522 reads and writes to database records which were previously selected using the select icon 521. The read/write icon 522 cannot contain children. When using this icon, the user assigns a variable to a field in the database record, and selects the appropriate action (read, insert, or update). The read/write icon 522 in a presentation is defined using the read/write icon requester.

Another data icon in the data icon submenu 520 is the delete icon 523. This icon 523 removes the currently selected record. This icon 523 has no children and is defined using the delete icon requester.

The next icon in the data icon submenu is the variables icon 524. This icon 524 is used to define new global variables, or assign new values to existing variables by evaluating expressions specified by the user. The difference between global variables and local variable is conventional. Global variables can be accessed from anywhere in a presentation and local variables can only be accesses in a particular region of a presentation, e.g., within a subroutine. The variables icon 524 can have no children and is defined using the variables icon requester and the expression editor 280.

Next in the data icon submenu 520 is the output icon 525. The output icon 525 is used to send a single line of output to a disk file or a printer. The output icon 525 cannot contain children and is defined using the output icon requester.

The data form icon 526 follows to the right of the output icon 525 on the data icon submenu 520. This icon 526 defines forms on the screen for data entry by users during the execution of a presentation. The data form icon 526 can have other icons as children. The object editor 250 (discussed below) is used to define all of the data fields for the form.

Finally, the data form exit icon 527 of the data icon submenu 520 is used to exit or abort a data form operation. The form exit icon 527 cannot contain children and this icon 527 can only be used as a child to the data form icon 526.

Returning to FIG. 4, to the right of the data icon 440 is the wait icon 450. When the user selects the wait icon 450, the wait icon submenu 530 illustrated in FIG. 5D replaces the main icon menu 400 on the bottom of the display screen 122. The wait icon submenu 530 consists of five icons.

The first icon in the wait icon submenu 530 is the grouped wait icon 531. This icon 531 is used to combine wait icons. The function of the grouped wait icon 531 is as a parent to other specific wait icons from the wait icon submenu 530. This icon 531 waits for any one or all of its children to be completed.

The next icon on the wait icon submenu 530 is the wait condition icon 532. This icon 532 is used to wait for a specific condition to be true. Once the condition occurs, the presentation continues. This icon 532 cannot contain children and the condition is defined using the wait condition icon requester and the expression editor 250 (described below).

The next icon in the wait icon submenu 530 is the wait keyboard icon 533 which is used to pause the presentation and wait for a desired keystroke. This icon 533 cannot contain children. When the user selects this icon 533, there are two options. The first is to wait for a specific key or keys to be pressed. Second, the user may allow for the presentation to wait for any key to be pressed. A keyboard icon requester and the object editor 250 are used define the condition of this wait icon 533. The display objects and text for the wait keyboard icon 533 are created in the object editor 250 (described below).

The next wait icon in the wait icon submenu 530 is the wait mouse icon 534. This icon 534 is used to pause a presentation and wait for a desired click of a mouse button 112 or 113 (FIG. 1). The wait mouse icon 534 has no children. Similar to the wait keyboard icon 533, the wait mouse icon 534 has two options. First, is to wait for a mouse click in a specific hit box or area of the display screen 122 and the second is to wait for any mouse click. A wait mouse icon requester and the object editor 250 are used define the condition of this wait icon 534. The display objects and text for the wait mouse icon 534 are created in the object editor 250 (described below).

Finally, the last icon in the wait icon submenu 530 is the delay icon 535. The delay icon 535 is used to pause the presentation for a specified number of seconds. It does not require a response from the user. This icon 535 has no children. With this icon, during evaluation (or execution of a presentation), the evaluator 240 does not move to the next icon until a preset time has elapsed. The delay icon 535 is defined by the delay icon requester.

Referring again to FIG. 4, the main icon menu 400 also contains an AV icon 460. When this icon is selected, the AV icon submenu 540 illustrated in FIG. 5E replaces the main icon menu 400 on the bottom of the display screen 122 (FIG. 1). Audiovisual icons are used to perform operations such as playing video, animation, sound, speech, or musical files, and displaying pictures and graphics.

The left-most icon in the AV icon submenu 540 is the screen icon 541. The screen icon 541 is used to define the background screen for presenting any visual information such as pictures. This icon 541 uses an icon requester to specify display parameters, e.g., screen resolution, number of colors, palette, and the size of the picture. The screen icon 541 may also be used to load a bit-mapped image from the disk drive 105 (FIG. 1) to display on the display screen 122. Bit-mapped images are conventional and therefore will not be explained. The screen icon 541 can have other screen icons as children as well as any other AV icons from the AV icon submenu 540.

To the right of the screen icon 541 on the AV icon submenu 540 is the digitized sound icon 542. This icon 542 is used to play a recorded voice or sound that has been previously digitized. This icon 542 cannot have children and is defined using the digitized sound icon requester.

Next in the AV icon submenu 540 is the synthesized speech icon 543. The synthesized speech icon 543 can be used to play back text that the user inputs or text from an ASCII text file. This icon 543 cannot contain children and is defined using the synthesized speech icon requester.

Next to the synthesized speech icon 543 on the AV icon submenu 540 is the music icon 544. The music icon 544 is used to play back musical scores created in music software programs. This icon 544 also cannot contain children and is defined using the music icon requester.

The fourth icon from the left in the AV icon submenu 540 is the graphics icon 545. This icon is used to modify and control the display screen 122 (FIG. 1) and enables the user to place display objects (created using the object editor) on the display screen 122. This icon also lets the user specify color cycling effects. Like most of the AV icons, this icon 545 also cannot have children and is defined using a graphics icon requester.

To the right of the graphics icon 545 in the AV icon submenu 540 is the brush icon 546. This icon 546 is used to overlay a specific picture file on top of the current display screen 122. The brush icon 546 also cannot have children. The brush icon 546 differs from the screen icon 561 in that it does not delete the existing background pictures or graphics on the display screen 122. It also does not modify screen attributes such as resolution. However, the user may specify palette changes in the brush icon requester used to define this icon 546.

The AV icon submenu 540 also contains a video icon 547. The video icon 547 is used to play a segment of video or a single video frame from a videodisc player which may be part of the platform 100 of FIG. 1. The video icon 547 cannot have children and is defined using the video icon requester and may make use of the videodisc controller 260 (discussed below).

To the right of the video icon 547 on the AV icon submenu 540 is the animation icon 548. The animation icon 548 is used to play back an animation file which has been created in a conventional paint or animation software application. The animation icon cannot have children and is defined by the animation icon requester.

At the right hand side of the AV icon submenu 540 is the text file icon 549. The text file icon 549 is used to display text from an ASCII file onto the display screen. The text file icon cannot have children and is defined using the text file icon requester.

Returning to FIG. 4, the last icon on the right of the icon main menu 400 is the module icon 470. When the user selects the module icon 470, the main icon menu 400 is replaced on the display screen 122 (FIG. 1) with the module icon submenu 550 illustrated in FIG. 5F.

The module icon submenu 550 consists of six icons. The first icon in the module icon submenu 550 is the module icon 551. The module icon 551 is used to help organize presentations. The module icon 551 can be used as a parent for other icons or groups of icons including other module icons. Thus the module icon 551 can contain other module icons like itself, as well as other icons as its children. The module icon 541 can also be a child to other parent icons. The module icon is defined using the module icon requester and the expression editor 280. Variables defined in a module of a presentation are local to that module. For example, if the user defines variables for the module icon 705 in FIG. 7A, these variables exist during the evaluation of the module icon's 705 descendants including icons 710, 720 and 730. These local variables would not exist during the evaluation of the module icon's 705 siblings (not shown).

Another icon in the module icon submenu 550 is the subroutine icon 552. The subroutine icon 552 provides another method of structuring a set of actions that the user wishes to use repeatedly in a presentation. The subroutine icon 552 can contain other icons as children, but cannot contain itself as a child. It must always appear in the left-most column of the GRID and therefore, may be a sibling of the very first module icon. The subroutine icon 552 is defined using the subroutine requester and the expression editor 280. Variables associated with a subroutine icon are subject to the same scoping (local) as described above with reference to the module icon 541.

To the right of the subroutine icon 552 on the module icon submenu 550 is the quit icon 553. The quit icon 553 can be used to exit and return to the flow editor 210 when creating a presentation or terminate the execution of a presentation.

The next icon in the module icon submenu 550 is the return icon 554. The return icon 554 explicitly stops the execution of a subroutine and returns control back to the next icon following a call icon 501. This icon 554 cannot have children and it can only appear as a part of the flow of a subroutine. The preferred flow editor 210 will not permit the user to place the return icon 554 outside of a subroutine.

The execute icon 555 is adjacent to the return icon 534 in the module icon submenu 550. The execute icon 555 references an external program and allows the external program to execute as a part of the presentation flow. The execute icon 555 cannot have children and is defined in a presentation with the execute icon requester.

The timer icon 556 of the module icon submenu 550 is used to time specific parts of a presentation. It does not stop the presentation, but merely acts as a stopwatch measuring time in elapsed seconds with up to two decimal places. This icon 556 also cannot contain children and is defined using the timer icon requester.

Finally, the last icon in the module icon submenu 550 is the resource control icon 557. The resource control icon 557 is used to preload and unload resources such as picture, sound, animation and music into memory 135 of the platform 100 (FIG. 1). This icon 557 is used to reduce long waits in the middle of a presentation for the system to load the required information. This icon 557 also cannot contain children and is defined using the resource icon requester.

Returning to FIG. 6 the operational flow of the icon menus may be further explained in the context of a typical editing session as follows. When the flow editor 210 of the preferred implementation is started, the user is presented with an editing screen on the display screen 122 showing a screen header across the top, a panel of icons across the bottom, and an untitled presentation or flow window on the left.

The editing process is started by selecting a specific icon for placement in the empty flow window 300. The icons initially displayed on the panel at the bottom of the display screen 122 consists of the main icon menu 400 (see FIG. 4) which represents the different types of actions the preferred implementation supports. Positioning the cursor on an icon and clicking the mouse (or selecting the icon) instructs the preferred implementation to display on the bottom panel of the display screen 122 the appropriate icon submenu (FIGS. 5A–5F) depending upon which icon from the main icon menu 400 (FIG. 4) was selected. For example, the main icon menu 400 in the preferred implementation has an AV icon 460 which represents the submenu containing all of the audiovisual actions supported by the preferred implementation. These include the icons discussed above with reference to FIG. 5E.

Once the desired submenu has been displayed, any one of the icons in the selected submenu may then be selected for placement in the GRID 310 of the flow window 300 by (1) positioning the cursor on the icon, (2) pressing the left mouse button 113, (3) holding the left mouse button down and dragging the icon with this button depressed, (4) positioning the selected icon being held or dragged by the mouse in the proper position in the GRID 310 of the flow window 300, and (5) releasing the left mouse button 113. The selected icon will now be added to the presentation displayed in the GRID 310.

The definition of icons may be performed in a requester specific to each type of icon. The requester for an icon placed in the GRID 310 is "opened" by double-clicking the left mouse button 113 (FIG. 1). The icon requester is then displayed on the display screen 122. Opening the requester for the first time presents an empty requester with only limited preset attributes (or descriptive information). The requester includes a set of one or more buttons which are regions that the user may activate to modify different attributes. The user can then modify any of the attributes by clicking on the appropriate buttons. Some buttons present further requesters for entering numeric values, selecting a file from a directory on a disk, etc.

Although each icon has specific attributes and therefore a specific icon requester, an example of an icon requester will now be explained with reference to the icon requester for the animation icon 548 discussed above with reference to FIG. 5E.

Figure 8:
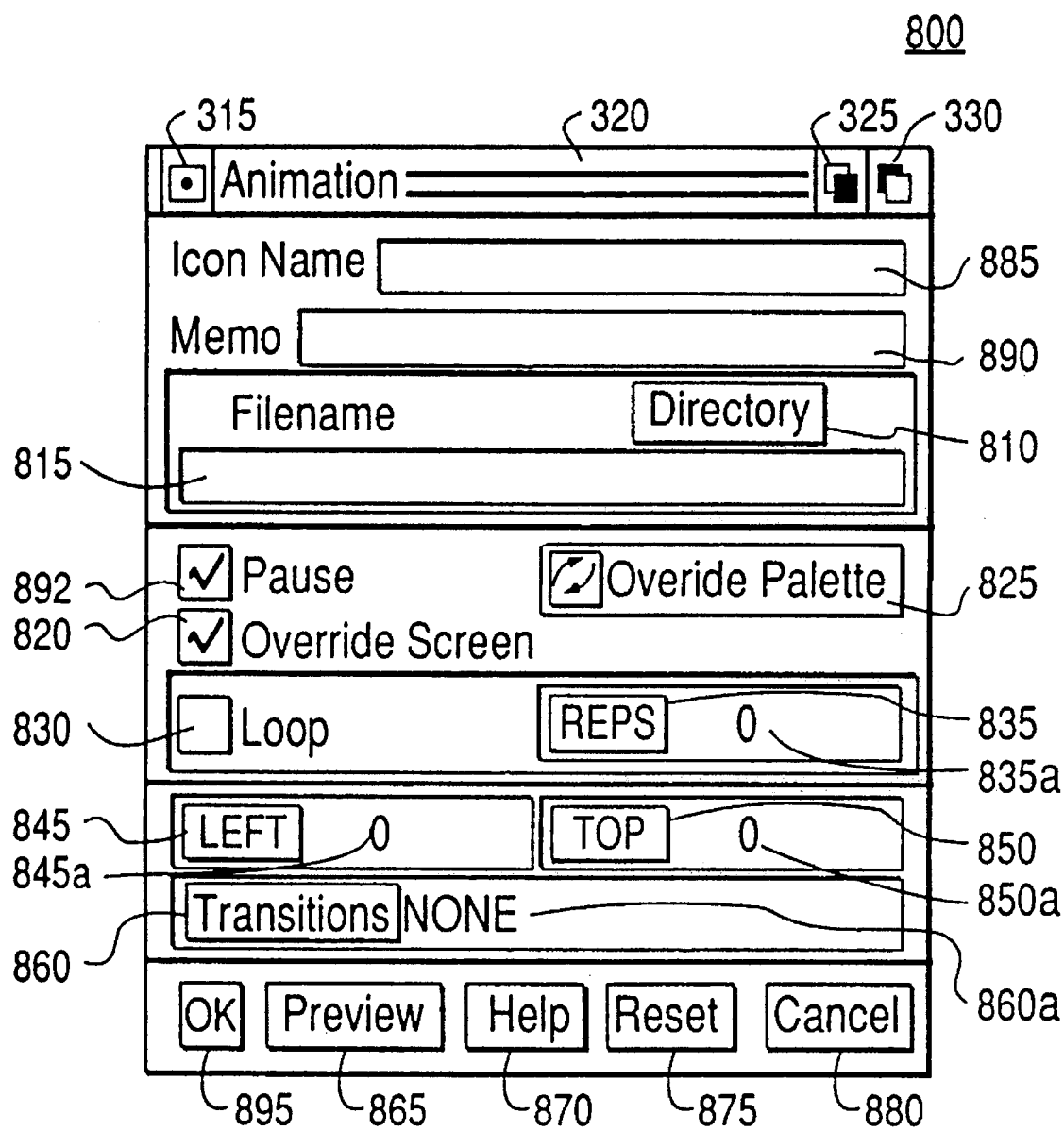
FIG. 8 illustrates an example an icon requester using the animation icon of FIG. 5E.

FIG. 8 illustrates the preferred icon requester 800 for the animation icon 548. The animation icon 548 is used to play back an animation file created using a conventional paint or animation software application. The animation icon requester 800 consists of several input fields in which the user must input information to set the attributes of the animation icon 548 or to define the animation icon 548. The animation icon requester 800 also consists of several gadgets which are used to set icon attributes and reposition the requester 800 on the display screen 122. To initiate each of these gadgets, the user positions the cursor using the mouse 110 on the gadget in the display screen 122 and then clicks the left mouse button 113. This permits the user to alter the attributes associated with an icon using the gadgets of the icon requester.

The first gadget in the animation icon requester 800 is the directory gadget 810 which permits the user to select, using the file requester, the name of an animation file to be played. Alternatively, the user may click the left mouse button 113 on the filename field 815 in the animation icon requester 800 and type in the name of an animation file in the space 815. The animation icon requester 800 also has an override screen gadget 820 which defaults to "on" and uses the screen resolution of the animation file, completely replacing the previous screen. If the user clicks the left mouse button on this gadget 820 to turn it off, then the evaluator 240, during execution of the presentation, will assume the current resolution, i.e., the resolution of the last screen that was displayed.

The palette gadget 825 is used to specify between the current palette and an override palette. A palette is the set of colors specified for display on the display screen 122. The palette gadget 825 is defaulted to the current palette which, if retained by the user, causes the specified animation to be displayed using the current palette of display colors. If the override is selected by the user, then the animation's palette will be used, changing the existing colors displayed on the display screen 122.

The loop gadget 830 is selected if the user wishes to play the animation a specified number of times. The number of loop repetitions is specified in the reps field 835a of the animation icon requester 800 by clicking the left mouse button 113 on the reps gadget 835 which enables the user to enter a number into the reps field 835a. In FIG. 8, the loop gadget 830 has not been activated and therefore the reps gadget 835 is "ghosted" or appears shaded. If the user selects the loop gadget 830, then the reps gadget 835 will be "unghosted" and the user will be permitted to alter the number, e.g., 0, in the reps field 835a.

The left gadget 845 and the top gadget 850 of the animation icon requester 800 are used to specify the coordinates of the top left corner of the picture in the selected animation file. The user merely clicks the left mouse button 113 on either gadget to enter the specific value for these fields 845a and 850a, respectively. The transitions gadget 860 of the animation icon requester 800 is used to specify the screen pattern to be used when switching to the first picture of an animation.

The animation icon requester 800 also has a preview gadget 865, help gadget 870, reset gadget 875, and a cancel gadget 880. The preview gadget 865 is used to see an operation, without running the presentation, while you are creating the presentation. The help gadget 870 initiates the help system 270 of the preferred implementation which provides the user with help information concerning, in this case, the animation icon requester 800. The reset gadget 875 clears all of the attributes previously set by the user in the animation icon requester 800, and the cancel gadget 880 cancels the animation icon requester 800 and returns the user to the point at which she selected the animation icon and double-clicked on the icon to initiate the animation icon requester 800 in the flow editor 210.

The Icon Name field 885 allows the user to give a meaningful name to the icon which will be shown on the GRID 310. It is also useful when searching for a particular icon. The use and contents of this field is completely up to the user. To enter an Icon Name into the icon name field 885, the user merely clicks the left mouse button 113 on the Icon Name field 885.

The Memo gadget 890 allows the user to add a description of the actions of the icon which will be presented only inside the requester. The use and contents of this field is completely up to the user. To enter a memo into the memo field 890, the user merely clicks the left mouse button 113 on the memo field 890.

The Pause gadget 892 allows the user to specify if icons following the animation icon may be started before the animation is completed. If the Pause gadget 892 is selected (remains checked), the animation will be completely presented before its sibling icon is started. If the Pause gadget is not selected (cleared), the animation will be started, and while being presented, the actions of its sibling icon will be performed. Other gadgets in the animation icon requester, e.g., the drag bar gadget 320, have already been described with reference to the flow window 300 of FIG. 3.

After all attributes have been properly set, the requester can be closed, and the information saved, by clicking on the "OK" button 895 which is in all requesters. Subsequent openings of the requester will display the previously set attributes for review or editing.

C. The Presentation Structure

Figure 9A:
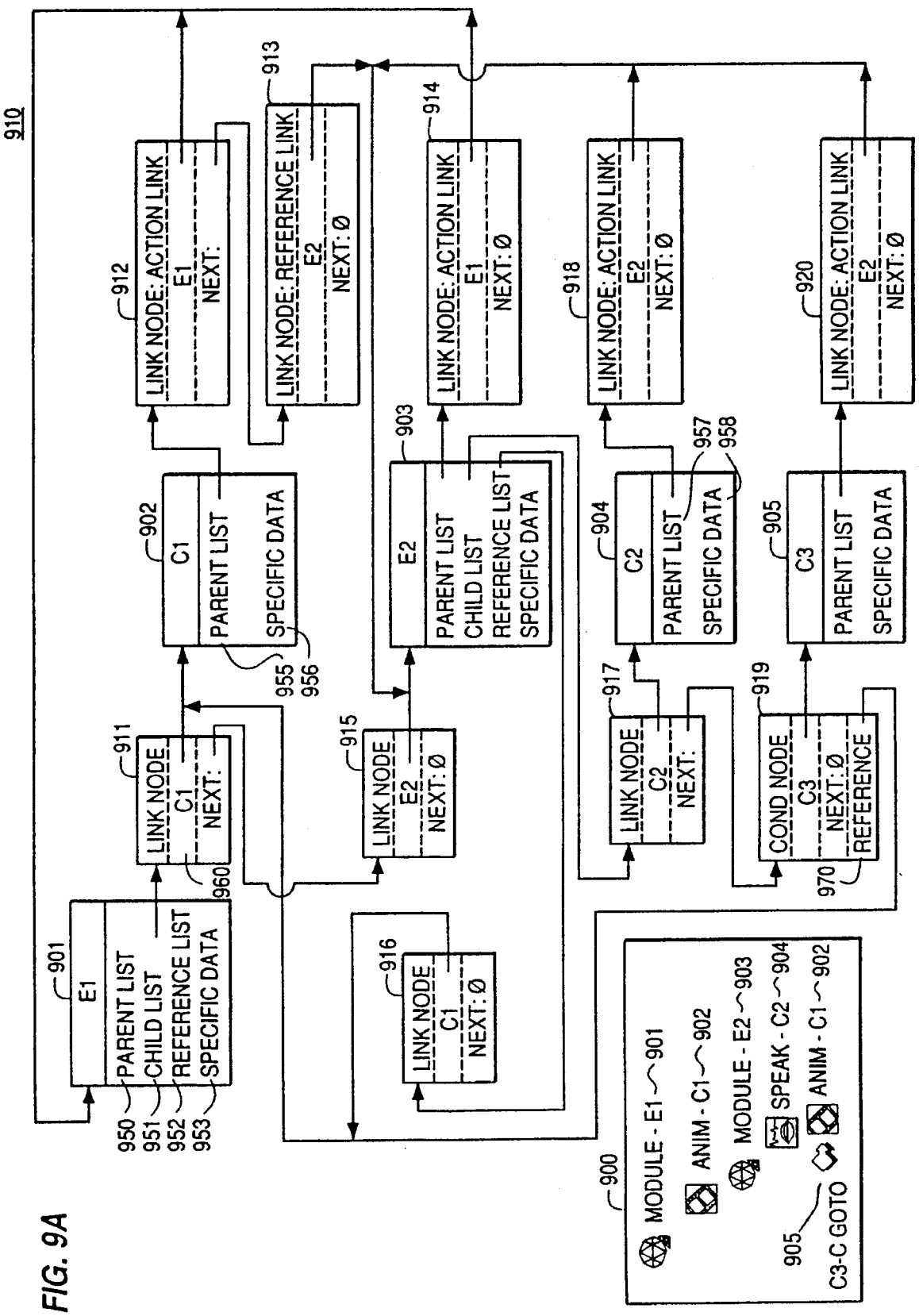
FIGS. 9A–9B illustrates a block diagrams of an exemplary data structures associated with a presentation created with the preferred implementation and which may be evaluated with the preferred implementation.

The preferred implementation may be used to generate or create a presentation, to manipulate or edit already created presentations and to execute presentations using the above-described icons. However, each icon is merely an identification of an act to be performed during the evaluation of the presentation and the icon requester is used to define the identified act. As described above, in the preferred implementation icons have familial relationships which are used to determine the order in which the operations of a set of icons in a presentation are to be evaluated. This familial relationship corresponds to the underlying structure of a presentation which is evaluated by the evaluator 240. FIG. 9A illustrates an example of the structure of a presentation which will determine not only how the evaluator 240 would evaluate and execute this presentation structure but would also determine how the flow editor 210 traverses the presentation structure in response to user commands.

A presentation structure created with the preferred implementation is made up of a RootEvent (not shown) and any number events and commands. The RootEvent is a part of every presentation structure and will be described below with reference to the evaluator 240 processes. An event is an icon which may contain children and a command is an icon that may not contain children.

The small block 900 on FIG. 9A shows a sample presentation as viewed in the flow editor. It contains two module icons 901 and 903 (both containing children) and four other icons. The module icons 901 and 903, and all other icons which are displayed with the triangles, may contain zero, one, or more children, as described earlier. These icons are represented internally by event structures. All icons which cannot contain children are defined internally by command structures.

Command and event structures are similar, with event structures being a superset of the command structures. While the complete details of these structures need not be described here, the primary members are the parent list, the child list, the reference list, and the specific data pointer. List structures are defined by the conventional operating system, and are used because of the operating system-supplied routines for fast and easy maintenance of the list contents. Both events and commands contain a parent list and specific data members, but only the event structure contains child list and reference list members. This is illustrated in FIG. 9A. For example, the event structure 901 contains a parent list 950, a child list 951, a reference list 952, and a specific data member 953, and the command structure 902 contains a parent list 955 and a specific data member 956.

The data structures that connect the event structures and command structures of a presentation together are called "LinkNodes." LinkNodes are small sections of memory that comprise the elements of any of these lists. For example, LinkNode 911 connects event node 901 with command node 902. The child list 951 of event structure 901 points to the LinkNode 911 and the LinkNode 911 points to the command structure 902 with a pointer field 960.

An expanded version of a LinkNode also exists which is called a CondNode. CondNodes are used when two icons are displayed on the same horizontal line in the flow editor, and may only be present on an event structure's child list. For example, in FIG. 9A, the CondNode 919 refers to the conditional-goto specifier displayed in the small box 900. Like other LinkNodes, the CondNode 919 contains a pointer field that points to the command structure 905 representing the conditional-goto icon. Since the CondNode 919 is one which refers to another command or event in the presentation structure 910 to be executed when a condition is evaluated as true, the CondNode 919 contains a reference pointer field 970 which points to the referenced command structure 902.

All of these structures can be seen in the example of a presentation structure 910 which represents the structure of the example presentation in box 900.

Figure 9B:
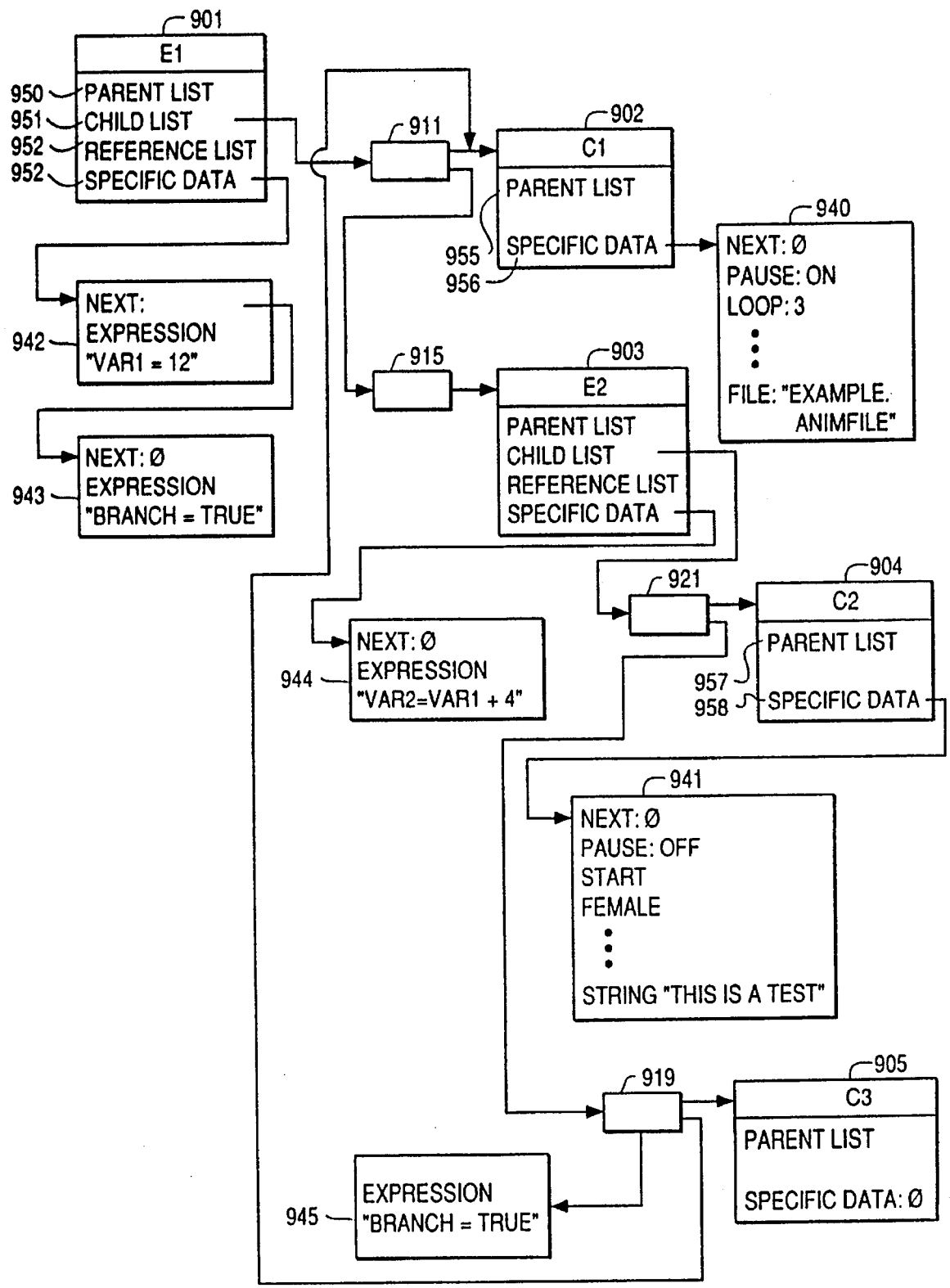

For each child of a given event, there exists one LinkNode or CondNode on its child list. In FIG. 9B event E1 901 contains two children, a command C1 902, and another event E2 903. Present on E1's child list are two LinkNodes 911 and 915 each pointing to one of the children. Likewise, the child list of event E2 903 contains two elements. The first is a LinkNode 921 pointing to the command C2 904, and the second is a CondNode 919 pointing to the command C3 905. Command C3 905 represents the Conditional Goto icon as shown in block 900 of FIG. 9A. Since the action of the Conditional Goto requires a partner to be specified, the CondNode contains a member 970 (FIG. 9A) which points to an event or command defined elsewhere in the presentation. In this example, the referenced icon is the command C1 902.

Referring again to FIG. 9A, each icon which is a child of another has at least one member on its parent list 950, 955 and 957. This list may contain only LinkNodes and is maintained to allow easy tracking of all points in the presentation that refers to each icon. The first element on the list must be a pointer to the event which contains a LinkNode to the child on the event's child list. These are marked as "ActionLink" LinkNodes 912, 914, 918 and 920. This example shows several one element parent lists (event E2 903, command C2 904, and command C3 905).

Any subsequent LinkNodes on an icon's parent list represent non-parental references to the icon and are marked as ReferenceLink LinkNodes. This setting reflects that the event pointed to contains a LinkNode on its reference list referring to this icon. Only the parent list of command C1 901 contains more than one LinkNode, because this is the only icon in the example that is referenced from some other point in the presentation (by the Conditional Goto C3 905). The ReferenceLink LinkNode 913 further marks that the event pointed to has at least one CondNode on its child list that points to the icon 902 containing the ReferenceLink LinkNode 913 on its parent list 955. Only events contain reference list members, which may contain only LinkNodes, each one pointing to the non-child icons referred to by all of the CondNodes on the event's ActionList. For example, as illustrated in FIG. 9A, the event E2 903 has a reference list which contains LinkNode 916 which points to the command C1 902.

Referring again to FIG. 9B, most icons may only be defined by opening their requester in the flow editor 210, specifying the desired information and choosing the OK button. This information is stored either in the Event/Command structure, or in a block of data pointed to by the specific data pointer. This pointer may in fact point to a list of nodes, each storing part of the information specified by the icon. The majority of the information is stored outside of the Event/Command structure to allow these structures to be as small as possible.

The command C1 902 is an animation icon which will show the animation named "Example.AnimFile" in a loop 3 times in paused mode. Likewise the speak icon contains a data block defining all of the attributes of the phrase to be spoken. This is shown in FIG. 9B where the specific data pointer 956 of command C1 902 points to the specific data block 940 which stores information specific to the actions of the animation icon (shown in block 900 of FIG. 9A) as set by the user (described below). Similarly, the specific data pointer 958 of command C2 904 points to the specific data block 941 the action of a speech icon (shown in block 900 of FIG. A).

Both events shown in the diagram contain at least one expression 942, 943, and 944. These are stored in distinct data blocks, marked as expressions, which contain the string version of the expressions. When the module event is encountered by the evaluator 240 during presentation, each of the expressions is evaluated, defining or redefining variables to be used elsewhere in the presentation.

Expression data blocks are also used by all CondNodes which point to commands that define conditional expressions for certain icons (e.g., conditional goto, If-then, or If-then-else). This is shown in FIG. 9B where the CondNode 919 points to the expression data block 945.

D. The Authoring System

The preferred implementation of the present invention provides users with an authoring system in which users can create presentations having a structure of the type described in FIGS. 9A–9B using icons from the submenus (FIGS. 5A–5F) and evaluate the created presentations.

As illustrated in the flow diagram of FIG. 24, the user selects an icon from one of the icon submenus and the preferred implementation receives an indication of the user's selection (step 2410). Based upon the user's selection of a particular one of the icons in the submenus, the preferred implementation then generates a data structure in the memory of the platform 100 (FIG. 1) associated with the selected icon (step 2420). As discussed above, each icon represents an action or operation to be performed by the CPU 102 of the platform 100 during the evaluation process. Additionally, one or more data structures corresponding to selected icons form a presentation.

After the data structure for a selected icon has been generated, the preferred implementation then displays on the GRID 310 in the display screen 122 an image representing the selected icon at the position in the GRID 310 selected by the user (step 2430). After the user selects an icon and places it in the GRID 310 and defines its attributes, the user may evaluate the data structure to perform the action represented by the data structure for each selected icon (step 2440).

E. The Editing Session (Flow Editor)

Figure 10:
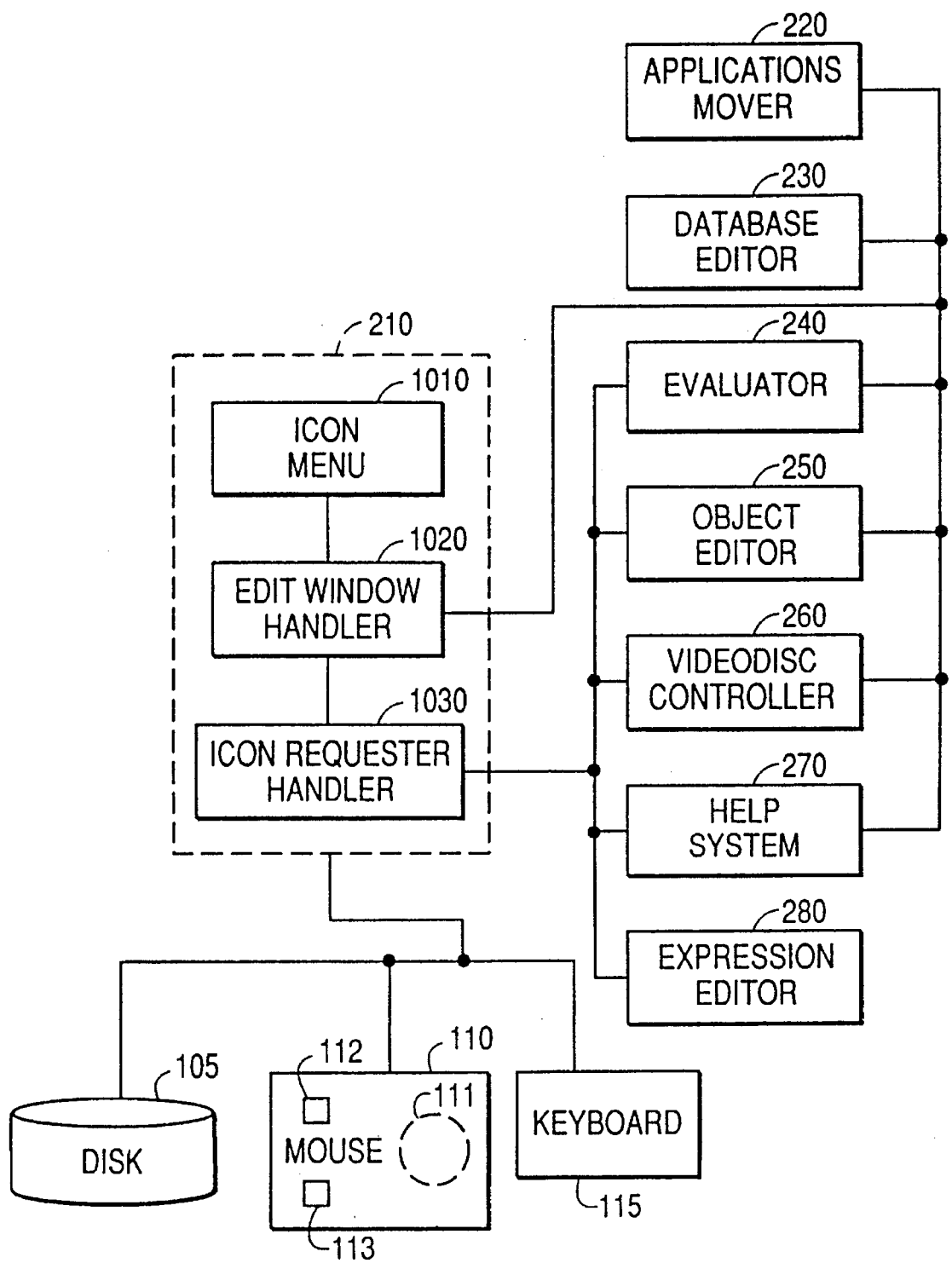
FIG. 10 illustrates a block diagram of the flow editor of FIG. 2 and the relationship of the flow editor to other components of the computer system of FIG. 1 and the preferred implementation of the present invention of FIG. 2.

FIG. 10 illustrates a block diagram of the flow editor 210 of FIG. 2 and the relationship of the three components of the flow editor 210: the icon menu 1010, the edit window handler 1020, and the icon requester handler 1030, to the software components of the preferred implementation identified in FIG. 2 and the computer system components first identified in FIG. 1. In other words, FIG. 10 illustrates that the icon menu 1010 of the flow editor 210 is connected to the edit window handler 1020 and to no other components of the preferred implementation. The icon menu 1010 however is connected to the disk drive 105, the mouse 110, and the keyboard 115 of the platform 100 (FIG. 1). Others skilled in the art may develop other methods of compartmentalizing the functions and operations of the flow editor 210, however, the preferred flow editor has been separated into components 1010, 1020, and 1030 in the preferred implementation to explain easily, the preferred operations of the flow editor. This is not meant to limit the present invention to this particular structure for this flow editor 210.

The icon menu 1010 of the flow editor 210 has been described above with reference to FIGS. 4, 5A–5F, and 6.

The edit window handler 1020, on the other hand is connected to every component of the preferred implementation except the expression editor 280. This means that when the flow editor 210 is executing in the preferred implementation, the edit window handler 1020 cannot access the expression editor 280. However, the edit window handler 1020 can access the applications mover 210, the database editor 230, the evaluator 240, the object editor 250, the videodisc controller 260, and the help system 270. The edit window handler 1020 is also connected to every component as the icon menu 1010 by virtue of them both being a part of the flow editor 210.

The last component of the flow editor 210 is the icon requester handler 1030. The icon requester handler 1030 is used to define or fully describe icons (by creating icon requesters) selected by the user during an editing session. For example, if, during an editing session, a user selects the control icon 420 from the main icon menu 400 (FIG. 4) and enters the control icon submenu 500 (FIG. 5A) and selects the if-then icon 506 to be inserted into the presentation on the GRID 310, the user must also define this icon using, in this case, the appropriate icon requester for the if-then icon. This identifies the condition in which the user wishes the presentation to perform the "then" or partner icon of the if-then icon.

Like the other components of the flow editor 210, the icon requester handler 1030 is connected to the disk drive 105, the mouse 110, and the keyboard 115 of the computer system 100 (FIG. 1). The icon requester handler 1030 is also connected to the evaluator 240, the object editor 250, the videodisc controller 260, the help system 270, and the expression editor 280 of the preferred implementation. That is, when the user has selected an icon from the icon menu and places the icon in a presentation in the GRID 310 and enters the icon requester window of the preferred implementation, the user can, from the icon requester, access the appropriate one(s) of these five components of the preferred implementation. Each of these components, except the help system 270, will be described more fully below.

Referring to FIGS. 11A–11G the operations of the edit window handler 1020 during an editing session will be described.

When the user begins the processing of the preferred implementation, the processes 1100 of the edit window handler 1020 are automatically performed. First, as illustrated in FIG. 10A, the edit window handler 1020 opens the edit screen (step 1101). The edit screen is an area of the display screen 122 which includes zero, one or more flow windows, the icon menus (FIGS. 4 and 5A–5F) along the, bottom of the display screen 122 and the main system menu along the top of the display screen 122 (not shown).

The edit window handler 1020 then displays in the edit screen the main icon menu 400 (FIG. 4) (step 1103) and opens a flow window (step 1105). The flow window is initially untitled. The flow editor then awaits a user action (step 1107) at which point the user may retrieve a presentation previously created from the disk drive 105 (FIG. 1), begin creating a new presentation in the flow window 300 or initiate some other operation of the preferred implementation, e.g., execute database editor. A user action may be initiated by positioning the cursor using the mouse 110 on a selected area of the display screen 122 and then presses the left mouse button 113 to select an operation of the edit window handler 1020. User action may also be implemented using other means, e.g., right mouse button 112 or keys on the keyboard 115, as described below.

When a user action is input the edit window handler 1020, responds by performing the requested function. If the user is in the edit window handler 1020 and clicks the left mouse button 113 while the cursor is inside of the GRID 310 (step 1109), then the operations of the edit window handler 1020 continue with step 1140 in FIG. 11B. If the click is outside of the GRID 310, and not on top of any of the icons in the icon menus, the click is ignored. The edit window handler 1020 is only concerned with user actions inside flow windows containing a GRID 310.

Figure 11A:
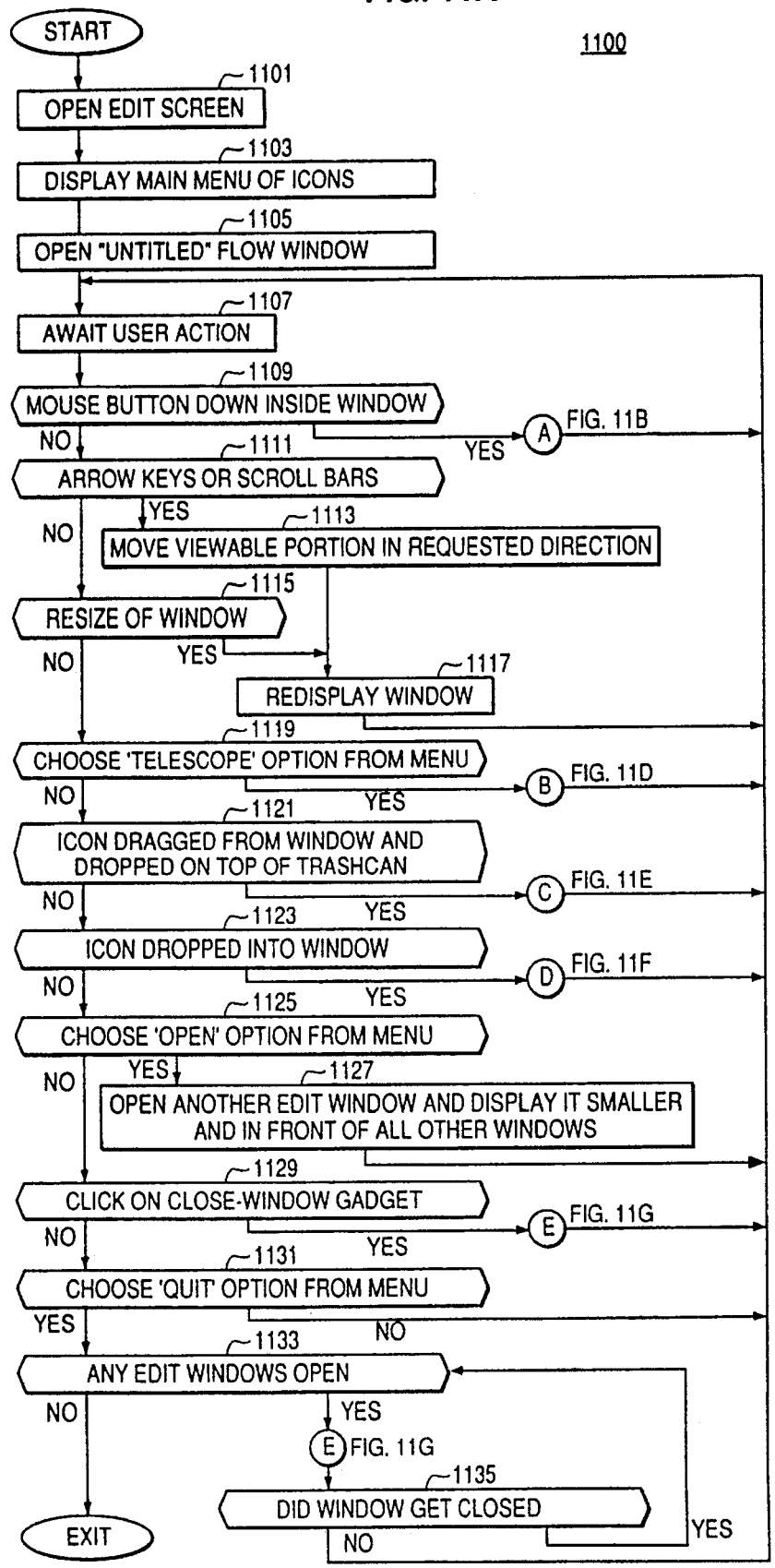
FIGS. 11A–11G are flow diagrams for the preferred implementation of the edit window handler of FIG. 8.
Figure 11B:
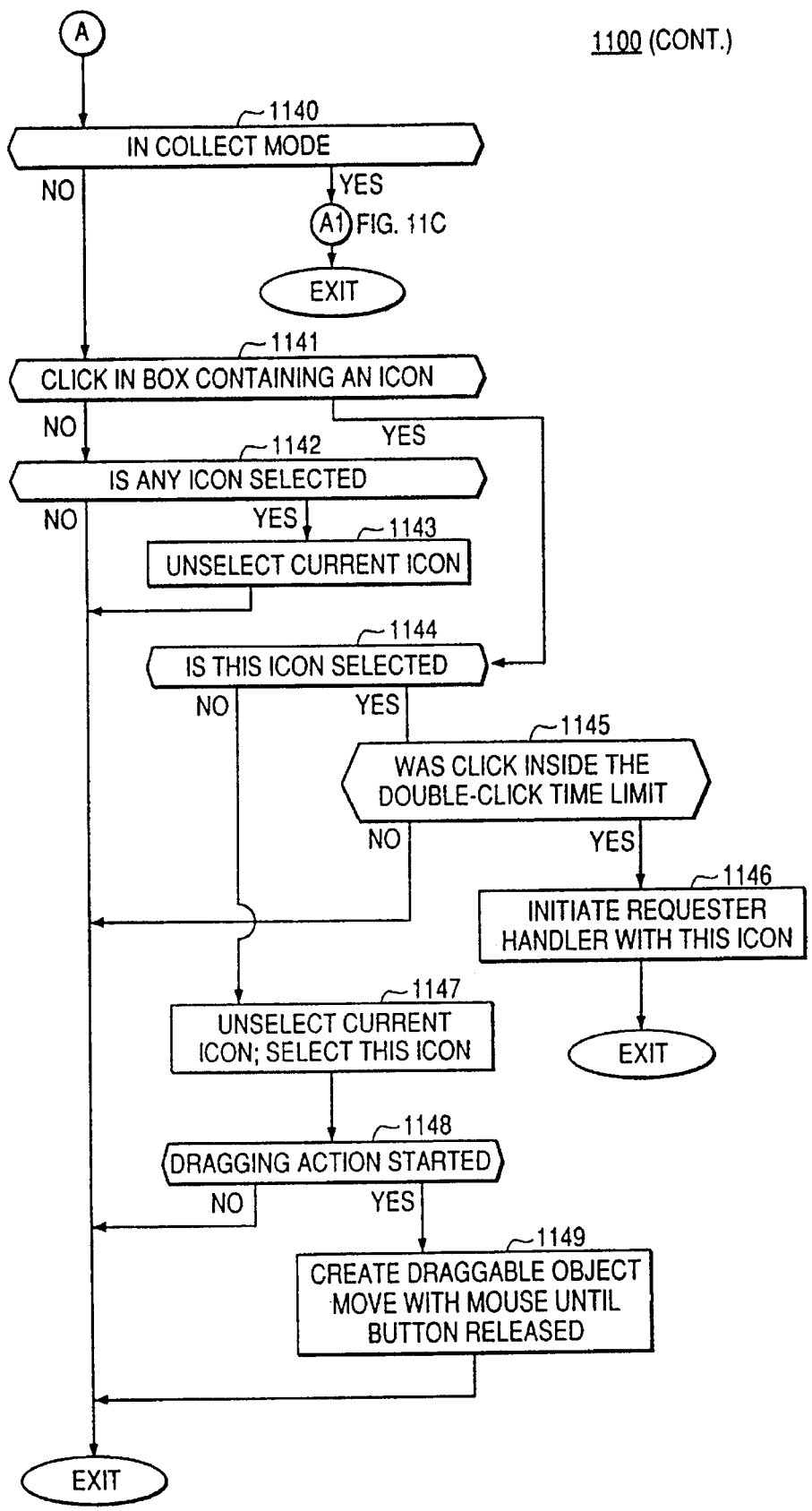

FIG. 11B shows the flow of operations of the edit window handler 1020 used to insert or edit icons in the GRID 310. First, the edit window handler 1020 determines whether it is presently in the collect mode (step 1140). The collect mode is when the user is selecting a group of existing icons for rearrangement in the GRID 310. If the edit window handler 1020 is not in the collect mode (step 1140), then the edit window handler 1020 determines whether the user has clicked on a box in the GRID 310 which already contains an icon (step 1141). If the user has not clicked on a box in the GRID 310 containing an icon (step 1141), then the edit window handler 1020 determines whether any icon in the GRID 310 has been selected (step 1142). If no, then the operation of the edit window handler continues with step 1107 of FIG. 11A. Otherwise, the edit window handler 1120 unselects the current icon (step 1143) and continues with step 1107 of FIG. 11A.

If the user has clicked on a box in the GRID 310 which contains an icon (step 1141), then the edit window handler 1020 determines if this icon is currently selected (step 1144). Selected icons are icons that appear highlighted in the GRID 310. Unselected icons are not highlighted in the GRID 310. If so, and the second click was within a predetermined time period (step 1145), then the icon requester handler 1030 is initiated for the selected icon (step 1146). Once the operations of the icon requester handler (discussed below) are complete, the flow editor returns to step 1107 of the edit window handler 1020 of FIG. 11A. If the user did not double click on the icon within the predetermined time period (step 1145), then the edit window handler 1020 continues operation with step 1107 of FIG. 11A.

If the user has not clicked on the currently selected icon (step 1144), then the edit window handler 1020 unselects the previously selected icon and then selects the currently selected icon from the GRID 310 (step 1147). After the new icon is selected, the edit window handler 1020 determines whether the user wishes to initiated a dragging action of the selected icon (step 1148). A user initiates a dragging action by holding the left mouse button 113 down while the cursor is on top of the selected icon. If no dragging action has been requested (step 1148) then the edit window handler continues with step 1107 of FIG. 11A. Otherwise, if the user wishes to drag the selected icon (step 1148), then the edit window handler 1120 creates a draggable object of the selected icon and permits the user to move the icon until the mouse button is released (step 1149). After the icon is dragged to a new box in the GRID 310, the edit window handler continues operation in step 1107 of FIG. 11A.

Figure 11C:
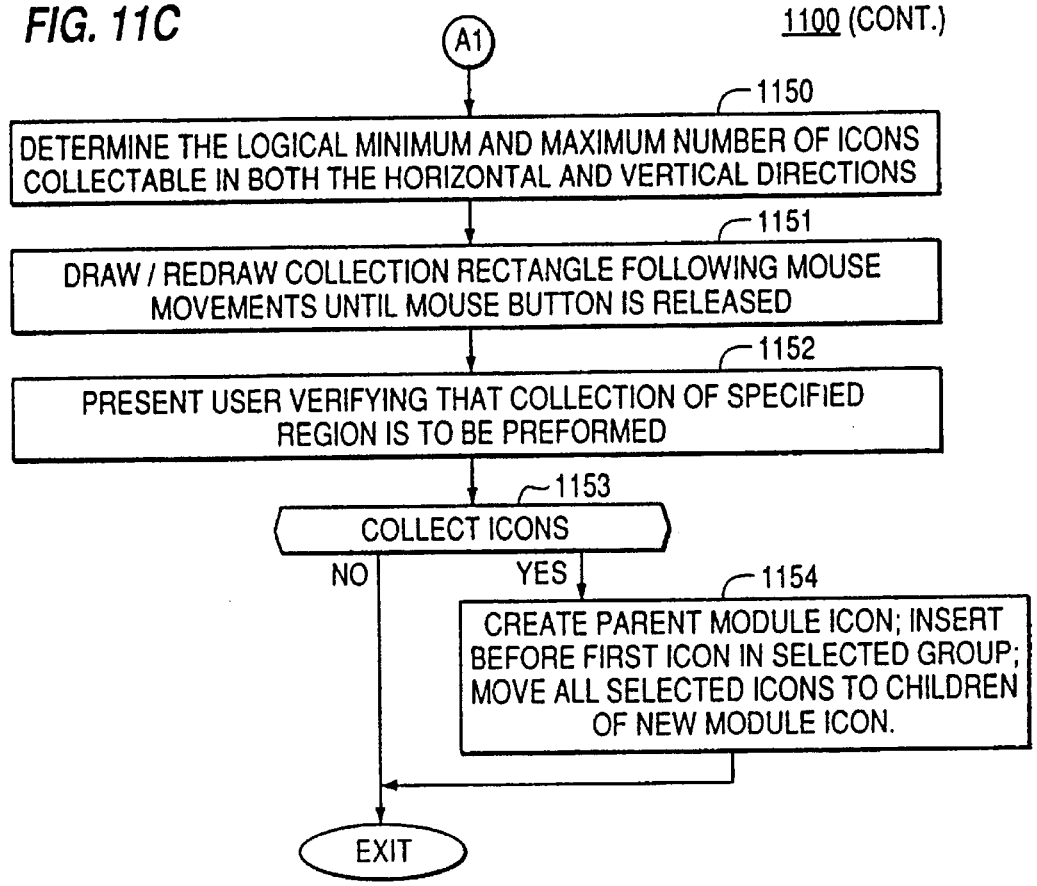

Otherwise, if the edit window handler 1020 is in the collect mode (step 1140) then the processes of the edit window handler continue with step 1150 of FIG. 11C. The operations of the collect mode of the edit window handler 1020 begin with first determining the logical minimum and maximum number of icons collectable in both the horizontal and vertical directions and generating in the GRID 310 the collection rectangle with which the user initiates the collection process when the user clicks the left mouse button 113 (step 1150). Then edit window handler 1020 draws and redraws the collection rectangle in response to mouse movements until the left mouse button 113 is released (step 1151). Then edit window handler 1020 presents the user with a requester to verify the collection region specified in the collection rectangle (step 1152). The edit window handler 1120 determines whether the user has confirmed the collection of the icons in the region (step 1153). If yes, the edit window handler creates a module icon (as a parent icon), inserts the module icon as the first icon in the selected group and moves all of the selected icons within the collection region to children icons of the new module icon (step 1154). When the operations of the collect mode are complete or if the user does not confirm the collection (step 1152), then flow of control of the edit window handler 1020 returns to step 1107 of FIG. 10A to await a user action.

Otherwise, the edit window handler 1020 determines if the user has positioned the cursor on the display screen 122 in a predetermined location and has pressed the arrow keys 345 and 350 of the flow window 300 (or the arrow keys on a conventional keyboard) or the scroll bars 335 and 340 of the flow window (step 1111). If yes, the edit window handler 1020 will move the viewable portion of the presentation on the GRID 310 in the flow window 300 in the requested direction (step 1113) and then redisplay the flow window 300 in accordance with the user's request (step 1117). The edit window handler 1020 then returns to step 1107 to await the next user action.

On the other hand, if the user positions the cursor in the flow window 300 on the display screen 122 in the resize window gadget 355 (FIG. 3) and resizes the window (step 1115), then the edit window handler 1020 redisplays the resized flow window 300 (step 1117). In the preferred implementation, the resizing process is performed by the operating system of the platform 100. The edit window handler 1020 then returns to step 1107 to await the next user action.

Figure 11G:
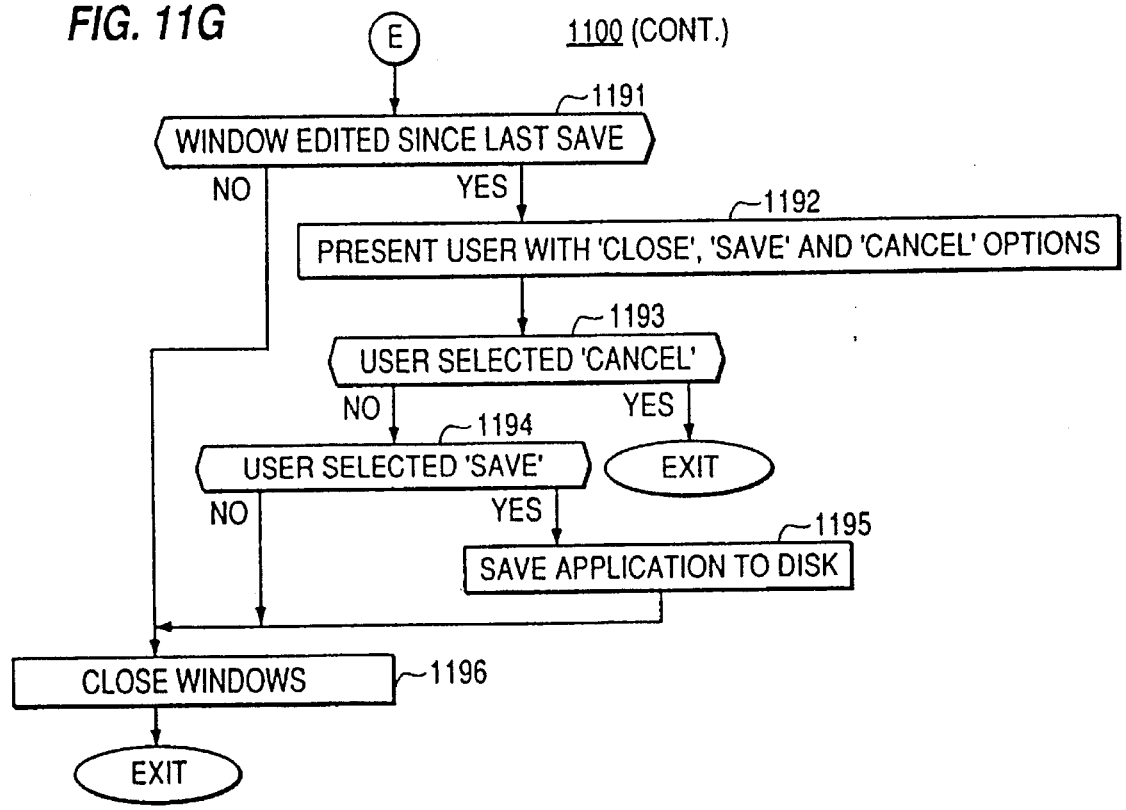
Figure 11D:
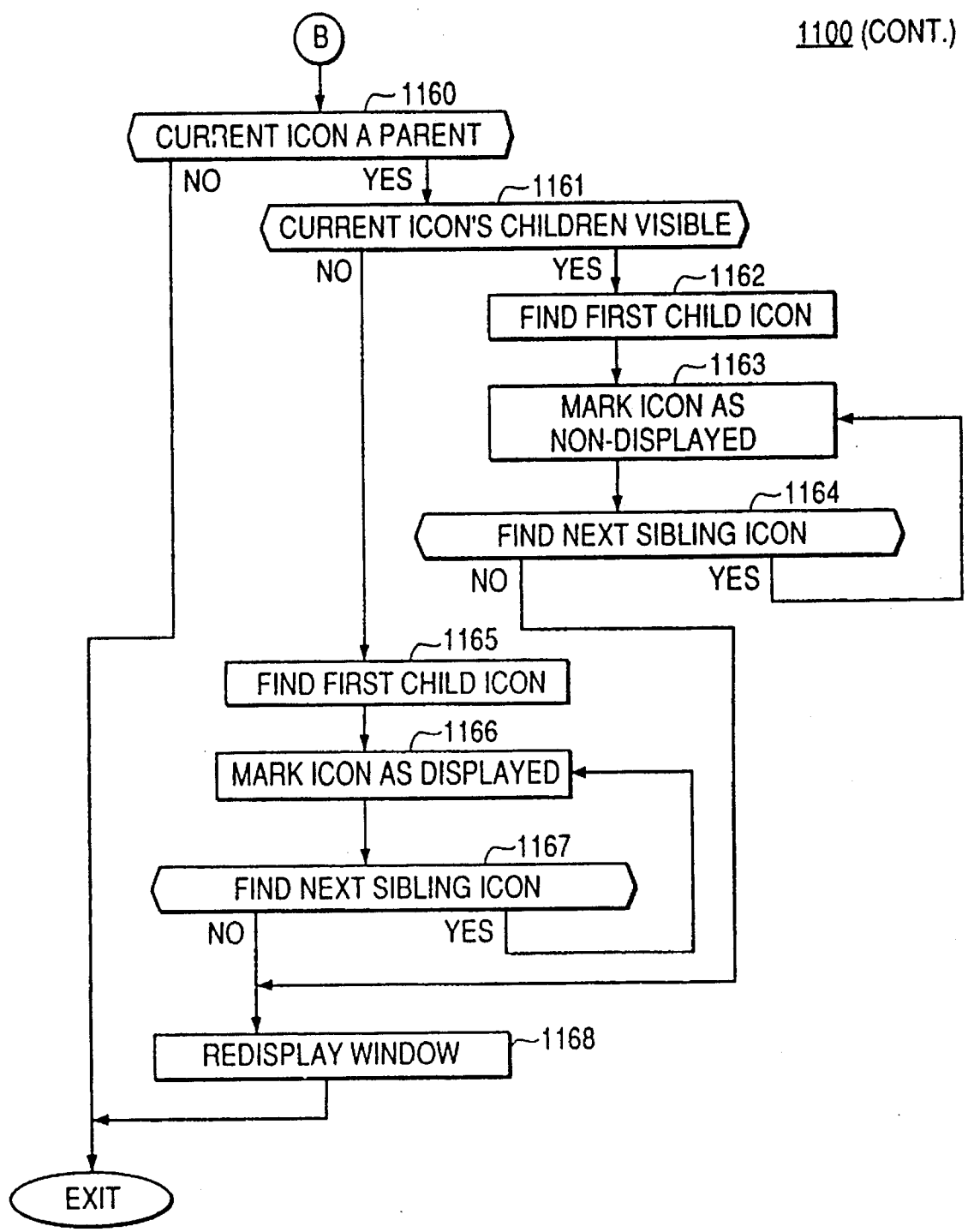

If the user selects the telescoping action from the main system menu along the top of the display screen 122 (step 1119), then the edit window handler 1020 continues with step 1160 of FIG. 11D. In the telescoping option, the user can condense child icons into their parent icons to conserve space on the GRID 310. To perform the telescoping function, the edit window handler first determines whether the current icon selected by the user is a parent icon (step 1160). If no, then the edit window handler ends the telescoping operation and returns to step 1107 of FIG. 11A.

If the current icon is a parent icon (step 1160), then the edit window handler determines whether the current icon's children are visible (are presently being displayed in the GRID 310) (step 1161). If the current icon has children being displayed in the GRID 310, then the edit window handler 1020 finds the first child icon for the current icon (step 1162) and marks the child icon as non-displayed. This informs the edit window handler 1020 that the marked icon should not be displayed in the GRID 310.

After the child icon is marked, the edit window handler 1020 then determines whether the next icon in the GRID 310 is a sibling icon to the marked child icon involved in the telescoping operation (step 1164). If yes, then this sibling icon is marked as a non-displayed icon (step 1163) and the edit window handler 1020 again continues with step 1164. If the next icon the GRID 310 is not a sibling icon to the child icon (step 1164), then the edit window handler 1020 redisplays the GRID 310 with the child icons of the parent icon selected in step 1160 no longer displayed in the GRID 310 (step 1168). The edit window handler 1020 then continues with step 1107 of FIG. 11A.

Otherwise, if the current icon's child icons are not visible in the currently displayed GRID 310 (step 1161), then the edit window handler 1020 locates the first child icon of the current icon (step 1165) and marks the child icon as displayed (step 1166) in order to display the child icon on the GRID 310. The edit window handler then determines whether the next icon in the GRID 310 is a sibling of the marked child icon (step 1167). If yes, then this child icon is also marked for display (step 1166). If the next icon in the GRID 310 is not a sibling of the marked child icon (step 1167), then the edit window handler 1020 redisplays the GRID 310 (step 1168), completes the telescoping function, and returns to step 1107 of FIG. 11A.

Figure 11E:
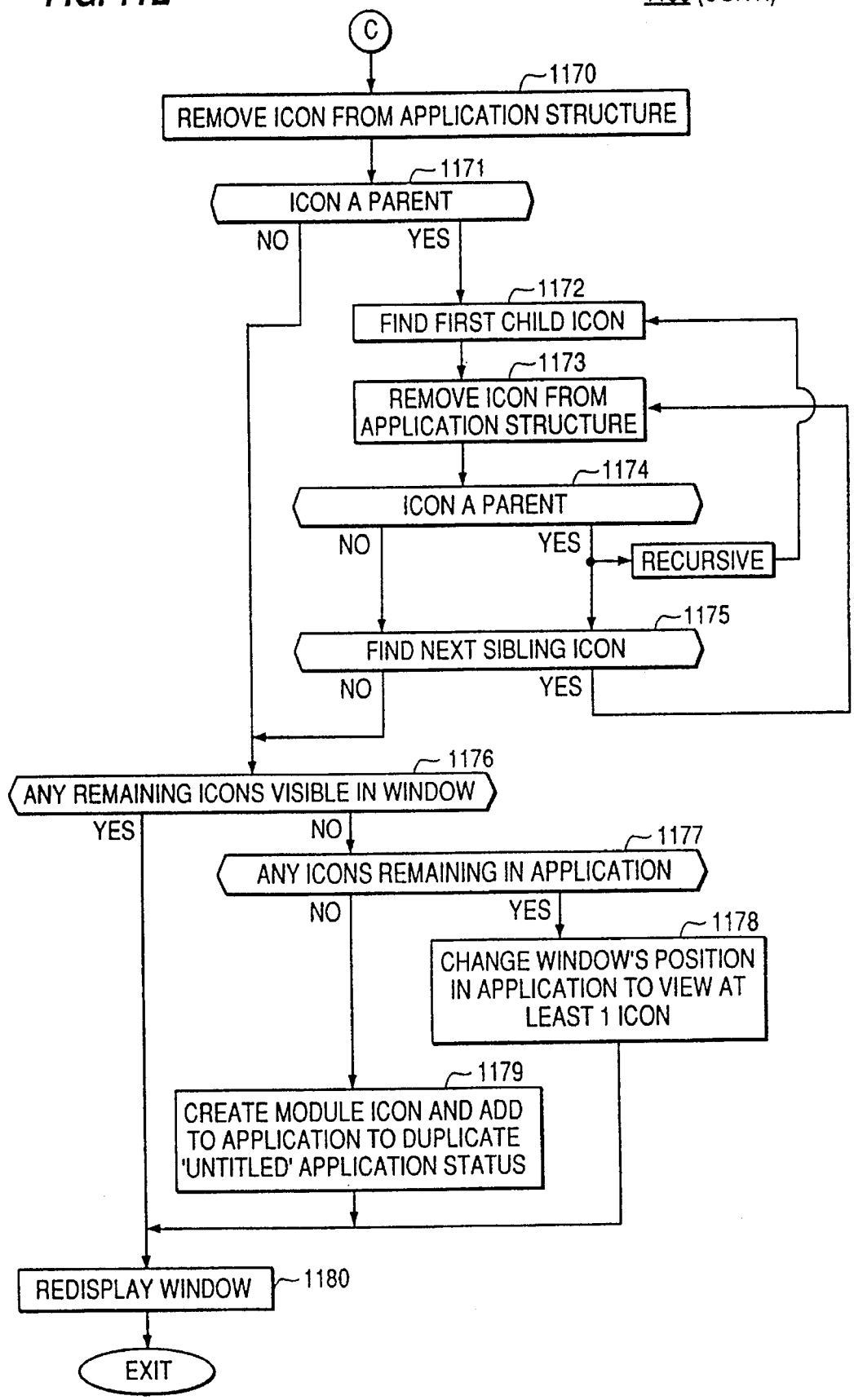

If the user in the edit window handler 1020 selects the function of the edit window handler 1020 to drag an icon from the GRID 310 to the trashcan icon 410 (FIG. 4) to delete the dragged icon (step 1121), then the operation of the edit window handler 1020 illustrated in FIG. 11E to delete the icon is performed.

First, the edit window handler 1020 begins the icon deletion process by removing the selected icon from the presentation structure presently displayed in the GRID 310

(step 1170). Next the edit window handler 1020 determines whether the deleted icon is a parent icon (step 1171). If the deleted icon is a parent icon (step 1171), then the edit window handler 1020 finds the first child icon of the deleted parent icon (step 1172) and then removes that child icon from the presentation structure (step 1173). If this child icon is also a parent icon (step 1174), then the edit window handler returns to step 1172 to find the first child icon of this parent icon. This is a recursive process which is a conventional programming function.

If the child icon is not a parent icon (step 1174), then the edit window handler 1020 determines whether the next icon in the presentation structure is a sibling icon to the deleted child icon (step 1175). If yes, then the sibling icon is removed from the presentation (step 1173) and the edit window handler 1020 determines whether this removed icon is a parent icon (step 1174). If the next icon in the presentation is not a sibling of the child icon that was removed with its parent icon (step 1175), then the edit window handler 1020 determines whether there are any remaining icons visible in the GRID 310 of the flow window 300 (step 1176).

If there are icons remaining in the GRID 310 (step 1176), then the edit window handler redisplays the GRID 310 without the deleted icon (step 1180). Otherwise, the edit window handler determines if there are any icons remaining in the presentation currently being displayed (step 1177). If there are more icons in the displayed presentation, then the edit window handler 1020 changes the GRID 310 position in the presentation to view at least one of the remaining icons (step 1178). If there are no other icons remaining in the presentation, the edit window handler 1020 creates a module icon and adds the module icon to the presentation to duplicate the untitled presentation status (step 1179). After either step 1178 or step 1179, the edit window handler 1020 redisplays the GRID 310 in the flow window 300 and then returns to step 1107 of FIG. 11A.

Figure 11F:
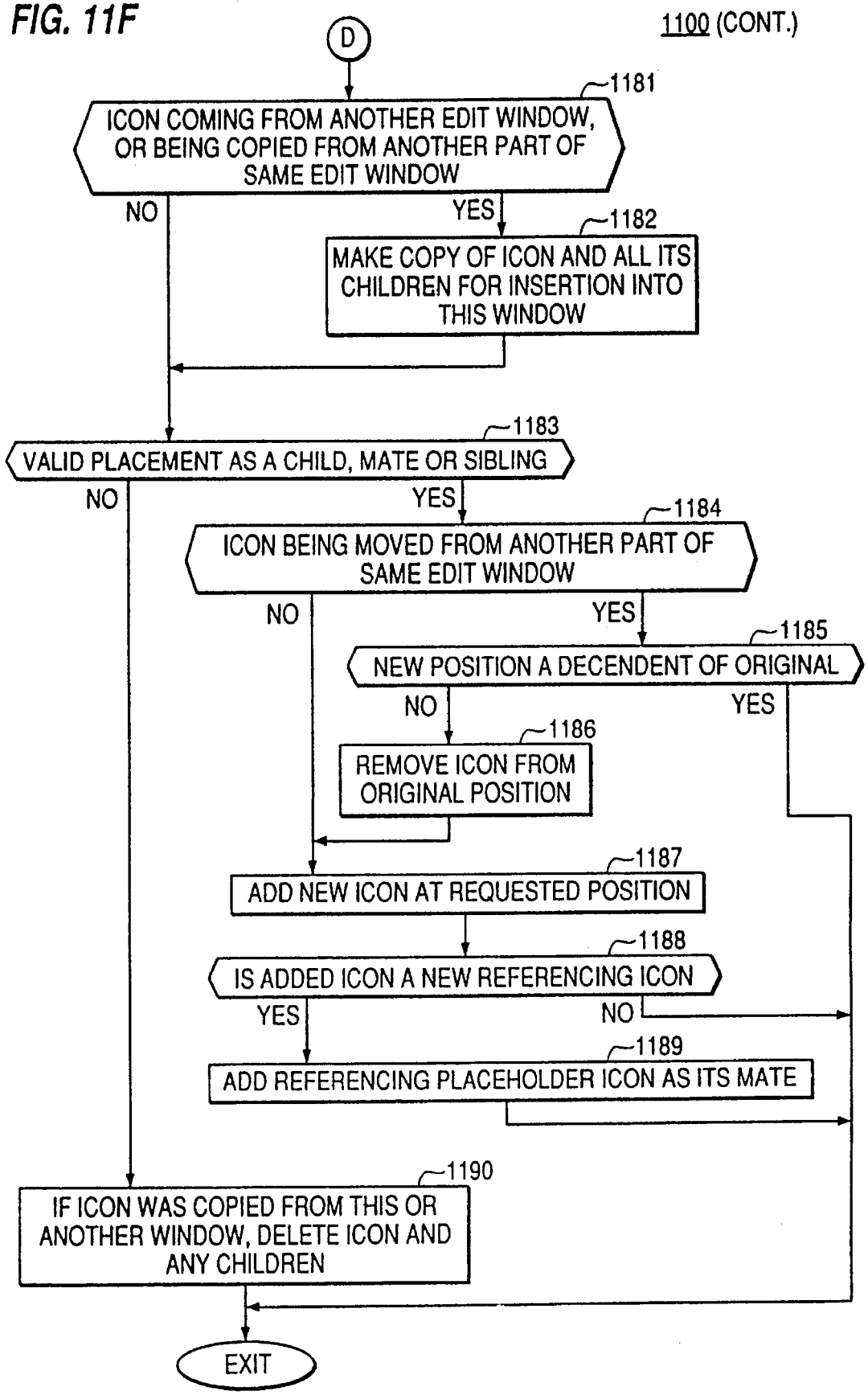

In FIG. 11A, if the user selects an icon for placement in the GRID 310 (step 1123), then the operation of the edit window handler continues with step 1181 of FIG. 11F. In this case, the edit window handler 1020 first determines whether the selected icon is coming from another GRID 310 or being copied from another part of the same GRID 310 (step 1181). If yes, then the edit window handler 1020 makes a copy of the icon and all of its children, if any, for insertion into this GRID 310 (step 1182).

If the icon is not coming from another GRID 310 or another point in the same GRID 310 (step 1181), then the icon is coming from an icon submenu and the edit window handler 1020 determines whether the user's placement of the icon in the GRID 310 is valid (step 1183). After making a copy of the icon and its children (step 1182), the edit window handler 1020 also determines whether placement of the icon (and its children) is valid (step 1183). In determining whether the placement of an icon is valid, the edit window handler 1020 considers whether the new or copied icon can be a child, mate, or sibling.

If the placement of the new icon is not valid, then the edit window handler 1020 deletes the new icon and any children if the new icon was one which was copied from this or another GRID 310 or selected from an icon submenu (step 1190). Subsequently, the edit window handler returns to step 1107 of FIG. 11A.

Otherwise, if the placement of the new icon is valid (step 1183), then the edit window handler 1020 must consider whether the new icon is being moved from another part of the same GRID 310 (step 1184). Since an icon that is being moved (not copied) from one position to another position in the same GRID 310 and the new position cannot be located in the children, grandchildren, etc. of the original position, the edit window handler 1020 determines whether the new position for the copied icon is a new descendent of the original (step 1185). Once the new position is known, the child list of the original icon is checked to determine whether new position is a descendent of the original (step 1185). If yes, the edit window handler 1020 terminates the operations of FIG. 11F and continues with step 1107 of FIG. 11A. However, if the new position is not inside this region of the presentation, the move is valid (step 1185) and the edit window handler 1020 removes the icon from the original position in the GRID 310 (step 1186). Then, or if the icon being moved is not from another part of the same GRID 310 (step 1185), the edit window handler 1020 adds the new icon at the requested position in the GRID 310 (step 1187).

If the icon being added to the presentation is one coming from an icon submenu and one which will reference another icon (e.g., a call, goto, or conditional-goto), a referencing placeholder icon is needed (step 1188). If no, then the operations of the edit window handler 1020 continues with step 1107 of FIG. 11A. Otherwise, the edit window handler 1020 creates a temporary command which is marked as this referencing placeholder icon and is added to the presentation until the referencing process is completed (step 1189). Thereafter, the operations of the edit window handler 1020 continue with step 1107 of FIG. 11A.

As described above, the edit window includes a menu from which the user may select, using the mouse 110, certain options. In step 1125 of FIG. 11A, the edit window handler 1020 determines whether the user has selected the open option form the edit window menu. If yes, then the edit window handler 1020, opens another flow window and displays the new flow window smaller and in front of all other previously displayed windows. The user may have as many windows open on the display screen 122 at the same time as the platform 100 is capable of accommodating. After displaying the new flow window, the operation of the edit window handler 1020 then returns to step 1107 to await the next user action.

If the user action clicks on the close window gadget 315 within a flow window 300 (step 1129), then the edit window handler 1020 continues operation in FIG. 11G. As illustrated in FIG. 11G the edit window handler 1020 of this invention first determines whether the flow window 300 selected by the user to be closed has been edited since the last time it was saved (step 1191). If no, then the edit window handler 1020 merely closes the current flow window (step 1196) and returns to FIG. 11A to await the next user action (step 1107).

Otherwise, if the flow window 300 has been edited (step 1191), then the edit window handler 1020 generates on the display screen 122 a message to the user to select either that the flow window be closed or saved, or to cancel the request to close the flow window (step 1192). If the user selects cancel from the generated message (step 1193), then the operation of the close window gadget 315 is terminated and the edit window handler 1020 operation continues in FIG. 11A to await the next user action (step 1107). If the user selects the save option (step 1194), then the edit window handler 1020, initiates the conventional operation of saving the presentation to the disk drive 105 (FIG. 1) and the flow window 300 is closed (step 1196). The operation of the edit window handler 1020 then continues in FIG. 11A by awaiting the next user action (step 1107). Otherwise, if the user has not selected the cancel or save option, the user selected the close option and the edit window handler 1020 closes the flow window 300 (step 1196) and then continues operation in FIG. 11A by awaiting the next user action (step 1107).

If the user selects the quit option from the menu of the edit window (step 1131), then the edit window handler 1020 determines whether there are any flow windows open (step 1133). If yes, then the operations of FIG. 11G (described above) are executed. After returning from the operations of FIG. 11G, the edit window handler 1020 determines whether the open flow window has been closed (step 1135). If yes, then the edit window handler 1020 determines whether there are any open windows remaining on the display screen 122 (step 1133). This process continues until all open flow windows have been closed. If the open flow window did not get closed, then the operation of the edit window handler 1020 returns to step 1107 to await the next user action.

On the other hand, if the user selected the quit option from the menu (step 1131) and all flow windows are closed (step 1133), then the operations of the edit window handler 1020 are complete and the edit screen is closed.

Figure 12:
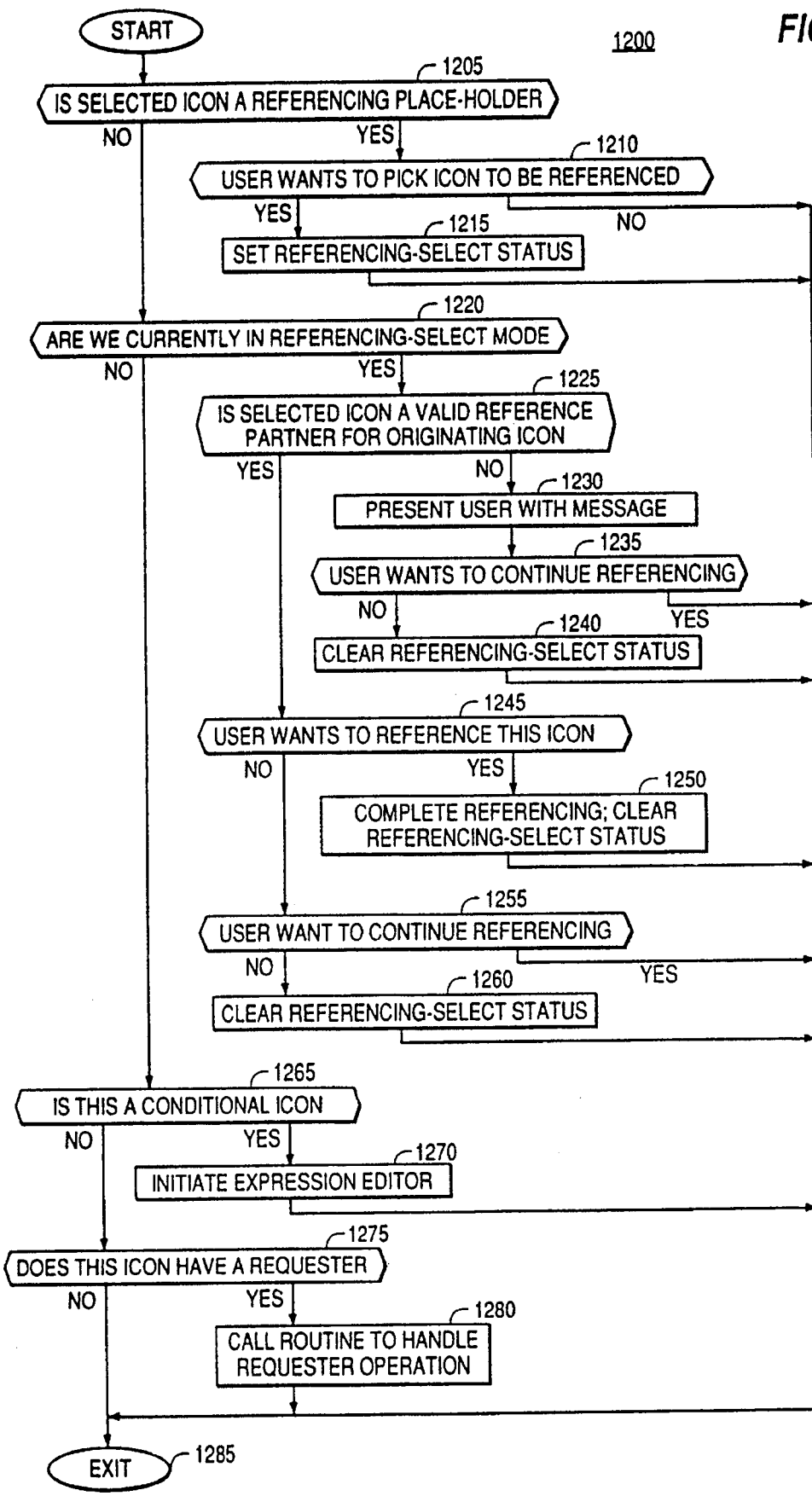
FIG. 12 is a flow diagram for the preferred implementation of the icon requester handler of FIG. 8.

Icons coming from the icon menu are handled by the edit window handler 1020 and then the icon requester handler 1030. FIG. 12 is a flow diagram 1200 depicting the flow of operations of the icon requester handler 1030.

After the icon requester handler begins operation, it determines whether the selected icon is a referencing placeholder icon (step 1205). A referencing placeholder icon is an icon which must be replaced by the image of a partner icon. If yes, then the icon requester handler asks whether the user wishes to pick an icon to be referenced (step 1210) which, if not selected by the user, causes the operation of the icon requester handler 1030 to end (step 1285). If the user does wish to select the icon to be referenced (step 1210), then the operation of the icon requester handler 1030 continues by setting the internal referencing select status switch (step 1240). The icon requester handler 1030 keeps an internal state that represents whether a reference process is being completed.

When the user begins referencing, the switch is set, and the icon requester handler 1030 is exited until the next double-click on an icon in the GRID 310. The next entry into the icon requester handler 1030 checks if the switch is set and if so, attempts to complete the referencing process. After the referencing is complete, the switch is cleared and the operation of the icon requester handler 1030 is also complete (step 1285).

If the selected icon is not a referencing placeholder (step 1205), and if the icon requester handler 1030 is currently in the referencing select mode (step 1220), then the icon requester handler determines whether the selected icon is a valid reference partner or originating icon (step 1225). If no, the icon requester handler generates on the display screen the appropriate message informing the user that the selection is invalid for the appropriate reason (step 1230). A call may only reference a subroutine icon, a goto may only branch to one of the children of its ancestors, etc. Then, if the user wishes to continue referencing (step 1235), then the operation of the icon requester handler 1030 is complete (step 1285). Otherwise, if the user does not wish to continue referencing, then the icon requester handler 1030 clears the referencing select status (step 1240) and then completes its operation (step 1285).

Otherwise, if the icon requester handler 1030 determines that the selected icon is a valid reference partner for the original referencing icon (step 1225), then the icon requester handler 1030 asks if the user wants to reference the current icon (step 1245). If yes, then the icon requester handler 1030 completes the referencing process and clears the referencing select status (step 1250) before completing (step 1285). If the user does not want to reference the current icon (step 1245), then the icon requester handler 1030 continues by asking if the user wishes to continue referencing (step 1255). If yes, then the icon requester handler 1030 completes operation (step 1285). Otherwise, the icon requester handler 1030 clears the referencing-select status (step 1260) and completes operation (step 1285).

If the selected icon is not a referencing placeholder (step 1205) and if the icon requester handler 1030 is not currently in the referencing select mode (step 1220), then the icon requester handler determines whether the selected icon is a conditional icon (step 1265). If yes, then the icon requester handler 1030 initiates the expression editor (step 1270). The operations of the expression editor of the preferred implementation are discussed below.

If the icon is not a referencing placeholder icon (step 1205), the icon requester handler 1030 is not in the referencing-select mode (step 1220) and the selected icon is not conditional (step 1265), then the icon requester handler determines whether the icon has an icon requester (step 1275). If no, then the operation of the icon requester handler 1030 is complete (step 1285). Otherwise, the icon requester handler 1030 calls a routine which handles the requester operation for each icon (step 1280).

While the process to support the requester for each of the different icons is unique to the icon type, the process clearly divides into three parts. First, if information has been saved in a specific data block and attached to the presentation structure (see FIGS. 9A and 9B), this information is extracted and used to set the state of all the buttons and other gadgets on the newly opened requester. If no information has previously been saved, meaningful default values are set in the requester. Second, the requester support code monitors the user's actions, updating gadget settings when needed and verifying user input. When the user signals that they are satisfied with the current settings by clicking the 'OK' button 895 (FIG. 8), the information currently shown in the requester is saved in a specific data block (a new one is created if needed) and the block is attached to the icon. If the Cancel button 880 is depressed, the information in the requester is discarded, and the incoming specific data block (if any) is retained. The requester is then closed, and the icon requester handler 1030 operation continues.

When the called routine has completed its operation, the icon requester handler 1030 completes its operation (step 1285).

F. The Expression Editor

Figure 13:
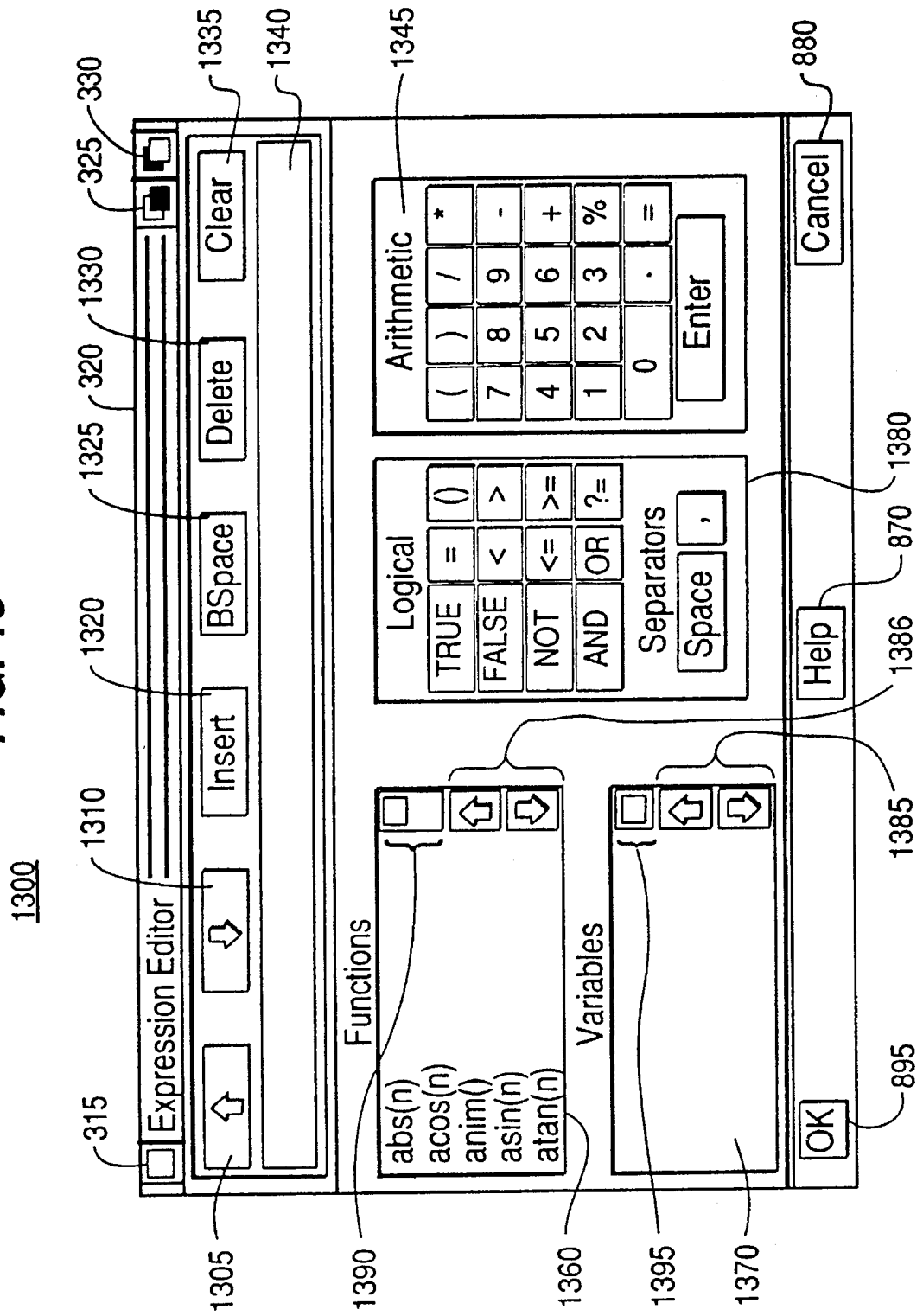
FIG. 13 illustrates a preferred example of the expression editor window displayed on the display screen when the user enters the expression editor.

As described above with reference to FIG. 2, the expression editor 280 of the preferred implementation is used to specify expressions which may define variables. FIG. 13 illustrates a preferred example of the expression editor window 1300 as displayed on the display screen when the user operates the expression editor.

The expression editor window 1300 includes several fields to input information, gadgets, and buttons. The function performed by the close window gadget 315, the drag bar gadget 320, the window-to-front gadget 325, the window-to-back gadget 330, the help button 870, the cancel button 880 and the OK button 895 of the expression editor window have already been described with reference to FIGS. 3 and 8.

The expression editor 280 may be entered in one of two modes. When a condition is needed (for the icons having a diamond shape, or for the loop, wait condition, etc.), only one string (the condition) may be entered. In this mode, the up button 1305, down button 1310, and insert button 1320 are not valid and are displayed ghosted. When the expression editor is entered from either the module, subroutine, or X/Y icon, any number of expressions may be specified. In this mode, the up button 1305 and down button 1310 buttons allow the user to move through the expressions defined by the icon. Normally, new expressions may simply be added to the end of the list. If, however, the user wants a new expression to be inserted at a particular position, the insert button allows the expression to be inserted.

The backspace button 1325 deletes the character to the left of the cursor in the expression field 1340 and the delete button 1330 permits the user to delete the character under the cursor. Finally, the cancel button 880 instructs the editor to discard any modifications made, and return only the expressions defined when the editor was entered. The expression editor window 1300 also has a clear button 1335 which clears the current expression being displayed in the expression field 1340.

Additionally, the expression editor window consists of five separate regions: the functions region 1360, the variables region 1370, the logical operators region 1380, the arithmetic operators region 1345, and the expression field 1340. The functions region 1320 contains a list of standard arithmetic and string functions. The user may scroll up and down through the functions list using the up and down arrow buttons 1385 to the right of the functions list. The user may also scroll up and down through the functions list using the positioning bar 1390 which allows more rapid movement through the list than the buttons 1385. The user may select one of the functions from the functions list using the mouse 110 and left mouse button 113.

The variables region 1370 of the expression editor window 1300 is used to list all of the local and global variables that are available for use. Again, the user may scroll up and down through this list using the up and down arrow buttons 1386 to the right of the list. The user may also scroll up and down through the variables list using the positioning bar 1395 which allows for more rapid movement through the list than the buttons 1386. The user may select one of the variables from the list using the mouse 110 and left mouse button 113.

The logical operators region 1380 of the expression editor window 1300 is used primarily for conditional icons to set the condition for the icon. For example, to set a condition for an if-then icon, when the user selects the icon and places it in the GRID 310, the user double clicks on the icon to initiate the icon requester handler for the if-then icon. Once the icon requester handler 1030 (FIG. 10) is initiated, it invokes the expression editor 280 and the expression editor window 1300 for the user to select the expression. The user then enters, in the expression field 1340, using the functions, variables, arithmetic operator, or logical operators in the expression editor window 1300 to create the expression for the if-the icon.

The arithmetic operators 1345 are used in the assignment of expressions and as a general purpose numerical pad. Finally, as previously suggested, the expression field is used to enter the expression for a conditional icon.

Figure 14:
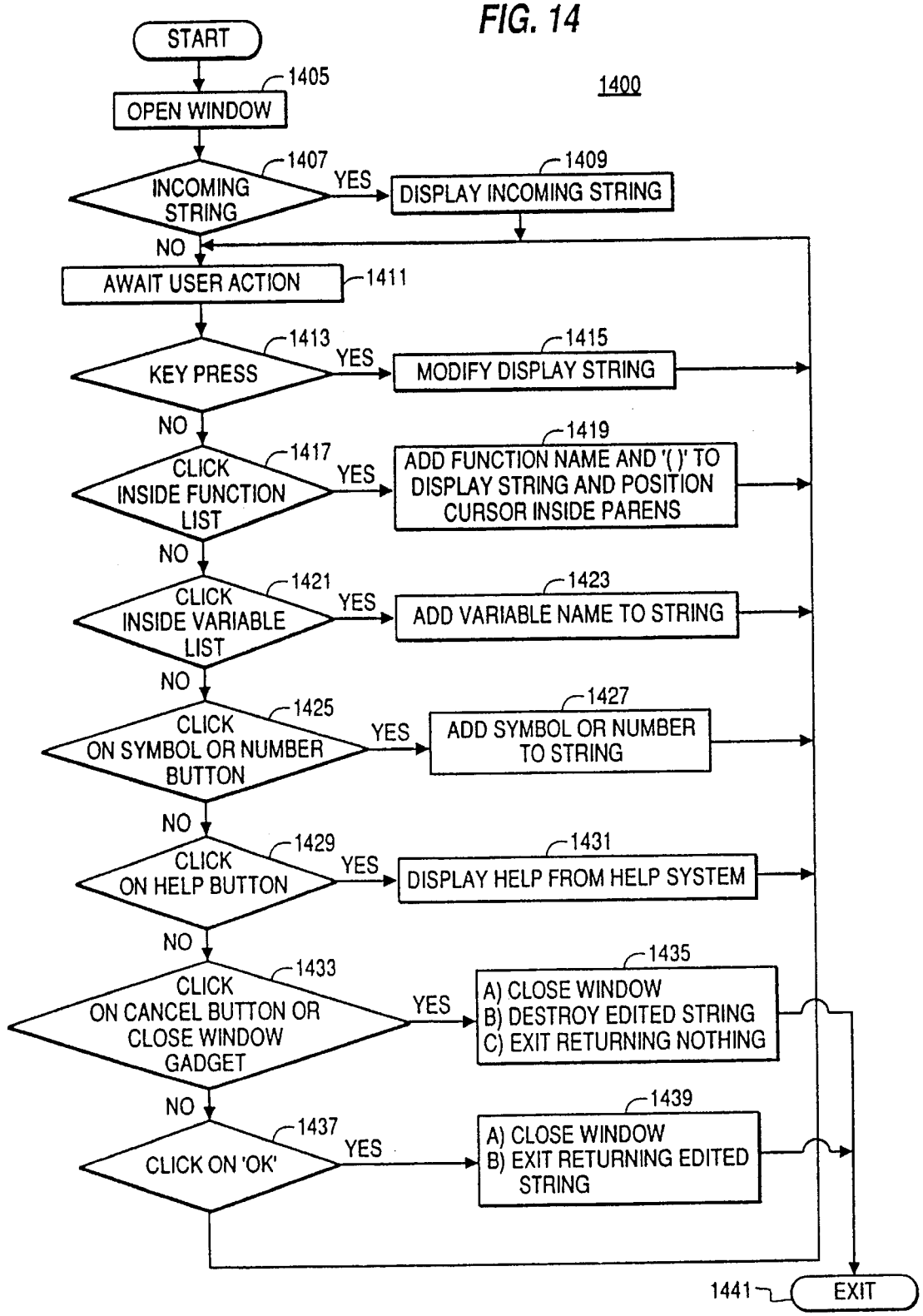
FIG. 14 is a flow diagram of the expression editor of FIGS. 2.

The preferred operations of the expression editor will now be described with reference to the flow diagram 1400 illustrated in FIG. 14.

When the user enters the expression editor 280 of the preferred implementation of the present invention, a window is opened (step 1405). This is conventional and is generally supported by the operations of the system software of the computer system 100 (FIG. 1). After the expression editor window is opened, the expression editor determines whether an incoming string has been previously specified by the user (step 1407). If yes, then the incoming string is displayed in the expression editor window (step 1409). Otherwise, or after the incoming string is displayed in the expression editor window 1300, the expression editor awaits a user action (step 1411).

After a user action is detected, the expression editor 280 responds to the input user action by first determining what the user action was and what is the required response to that action. In determining what the input user action is, the expression editor first asks whether the user action was to press a key on the keyboard (step 1413). If yes, the expression editor continues by modifying the display string (step 1415) followed by returning to step 1411 to await further user action.

If the input user action was not a key press (step 1413), then the preferred expression editor determines whether the user has clicked (positioned the cursor in the appropriate location on the display screen and pressed the left mouse button 113) in the function list of the expression editor window (step 1417). If yes, the expression editor will add a function to the display string, add parentheses to the display string, and position the cursor inside the parentheses added to the display string (step 1419). The expression editor then continues in step 1411 awaiting the next user action.

Otherwise, the expression editor determines whether the user has clicked inside the variable list (step 1421). If yes, the expression editor adds the variable name from the variable list to the display string (step 1423). The expression editor continues at step 1411.

Otherwise, if the user has clicked on one of the symbol or number buttons (step 1425), the expression editor adds the symbol or number to the expression currently being edited (step 1427). If the user has clicked on the help button in the expression editor (step 1429), the help display of the help system of the preferred implementation is displayed for the user (step 1431). Otherwise, if the user clicks on the cancel button or the close window gadget (step 1433), then the expression performs the necessary operation to close the expression editor window, destroy the currently edited display string, and exit to the flow editor returning nothing (if the icon was never previously defined) to the presentation currently in the GRID 310 (steps 1439 and 1441). If the expression is entered from a previously defined icon, selecting cancel returns the previous meaning.

Finally, if the user is in the expression editor and clicks on the 'OK' button 895 (step 1437), then the expression editor window 1300 of the preferred implementation is closed followed by the operations for exiting the expression editor 280 and returning to the presentation in the GRID 310 with the edited display string (steps 1439 and 1441).

Using the expression editor 280, the user can then add conditions and other expressions to the presentation.

G. The Object Editor

Figure 15:
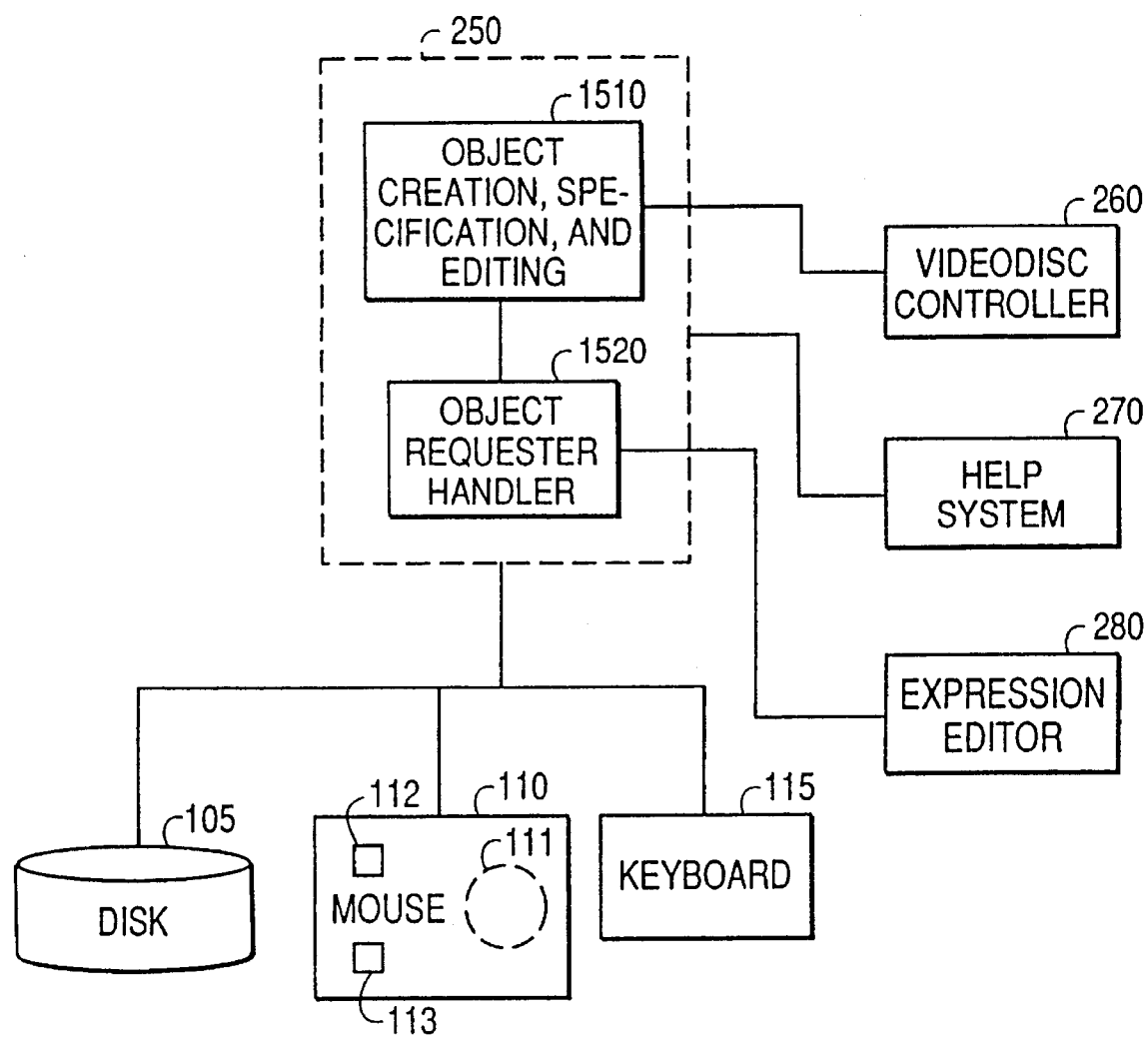
FIG. 15 illustrates a block diagram of the object editor of FIGS. 2 and the relationship of the object editor to other components of the computer system of FIG, 1 and the preferred implementation of the present invention of FIG. 2.

FIG. 15 illustrates a block diagram of the preferred object editor 250 of the preferred implementation of this invention and the relationship of the object editor to the disk drive 105, the mouse 110, and the keyboard 115 of the computer system 115 (FIG. 1). The object editor 250 includes an object creation/specification/editing component 1510, and an object requester component 1520. Both components of the object editor 250 are connected to the preferred help system 270 of the invention so that the help system 270 can be entered by the user when in either component 1510 or 1520 of the object editor 250. The object requester component 1520, however, is connected to the expression editor 280, while the component 1510 is connected to the videodisc controller 260. Therefore, only the object requester component 1520 can access the expression editor 280 (discussed below). Those skilled in the art may recognize other methods for compartmentalizing the functions and operations of the object editor, however, the preferred object editor 250 has been separated into components 1510 and 1520 to explain easily the operations of the preferred object editor. This is not meant to limit the present invention to this particular structure for this editor.

The object creation/specification/editing component 1510 is used to interactively design, position, and edit display objects to be used in a presentation, while the object requester component 1520 performs, in a manner similar to the icon requesters discussed above, the function of defining the object created by the user with the component 1520.

The operational flow of the object editor 250 will now be described with reference to FIGS. 16A–16M which is a flow diagram 1600 of the preferred operations of the object editor of this invention.

First, when the object editor 250 begins, it determines whether the user entered the object editor through the flow window icon (step 1601). If yes, then the object editor searches up from the flow window icon to find any screen definition icon (step 1602). The object editor 220 always attempts to display a background screen on the display screen 122 in the same mode that will be showing when the current icon is evaluated. Thus, when entered from an icon in an presentation, the previous siblings, parents and their siblings are checked for screen-defining actions. When a screen-defining icon is found, this screen format is used for the background of the object editor 220.

If a screen icon is found (step 1603) then the object editor 250 opens the screen defined by the found icon (step 1604) and then determines whether the user has specified a picture (step 1605). If yes, the object editor asks whether the user wants the specified picture displayed (step 1606). If the user wants the specified picture displayed (step 1606), the object editor displays the picture (step 1607) and then displays any objects associated with the screen icon (step 1608). Otherwise, if the user does not want the specified picture displayed (step 1606), then the object editor merely displays the objects associated with the selected icon (step 1608). If the user has not specified a picture (step 1605), then the object editor merely displays the objects associated with the selected icon (step 1608).

Otherwise, if no screen icon is found (step 1603), the object editor 220 opens a standard edit screen (step 1609). After the standard edit screen is opened (step 1609), the object editor determines whether any objects are defined by the selected icon (step 1610). If yes, the object editor displays the objects associated with the selected icon (step 1608). Otherwise, the object editor 250 informs the user that the editor was entered (step 1611).

Next, the object editor awaits a user action (step 1612). When a user action is input to the preferred implementation of the object editor, the object editor responds accordingly as described more fully below.

If the user selects the screen definition option from the object editor menu (step 1613), the object editor presents the screen definition requester to the user, allows the user to specify screen settings, and displays the new screen (step 1619). The object editor 250 then returns to await the next user action (step 1612).

If the user selects the screen palette option from the object editor menu (step 1615), then the object editor presents the user with the screen palette requester, allows the user to specify screen colors in the requester and displays the display screen with the palette of colors (step 1616). The object editor then returns to await the next user action (step 1612).

If the user selects the videodisc option from the object editor menu (step 1617), the object editor 250 returns to await the next user action (step 1612).

If the user chooses to load previously saved object definitions by making the proper menu selection (step 1622), then the object editor 250 presents the user with the Load Display Objects file requester allowing selection of the file to be loaded. The new objects are then displayed, erasing any existing objects on the display screen 122 (step 1623). The object editor then returns to await the next user action (step 1612).

If the user chooses the clear objects option from the object editor menu (step 1624), then the object editor 250 determines whether any objects presently exists on the display screen 122 (step 1625). If yes, then the object editor 250 first confirms with the user that wishes to continue (step 1626), and then erases all existing objects from the display screen 122 (step 1627). After erasing all existing objects (step 1627) or receiving a negative confirmation from the user in step 1625, or determining in step 1626 that there are no objects on the display screen, the object editor 250 returns to await the next user action (step 1612).

If the user chooses the preview option from the object editor menu (step 1628), then the object editor 250 enters its preview mode, displaying all objects on the display screen as if the present collection was being evaluated at run-time, and responds to the user's input until the right mouse button 112 is clicked (step 1629). The object editor 250 then returns to await the next user action (step 1612).

If the user chooses the redisplay option from the object editor menu, (step 1630), then the object editor 250 redisplays the display screen and all existing objects (step 1631). The object editor 270 then returns to await the next user action (step 1612).

If the user chooses the save option from the object editor menu (step 1632), then the object editor determines whether the current display screen has been previously saved under a file name (step 1633). If yes, then the object editor 250 saves the current objects in the display screen to the file having the same name as the previously named file (step 1634). Otherwise, the object editor 250 presents the user with the Save Display Objects file requester and allows the user to select the name for the new objects file (step 1635). After the user has selected the new name for the object file, and saves the currently displayed objects (step 1635), the object editor 250 returns to await the next user action (step 1612).

If the user selects the Save As option from the object editor menu (step 1636), then the object editor displays on the display screen the Save Display Objects file requester allowing the user to select the name of the object file, and saves the current displayed objects to the file (step 1637). The object editor 250 then returns to await the next user action (step 1611).

If the user selects the help option from the object editor menu (step 1638), then the object editor initiates the help system of the preferred implementation which generates the appropriate help display (step 1639). After the user has completed the help, the object editor returns to await the next user action (step 1612).

Figure 16A:
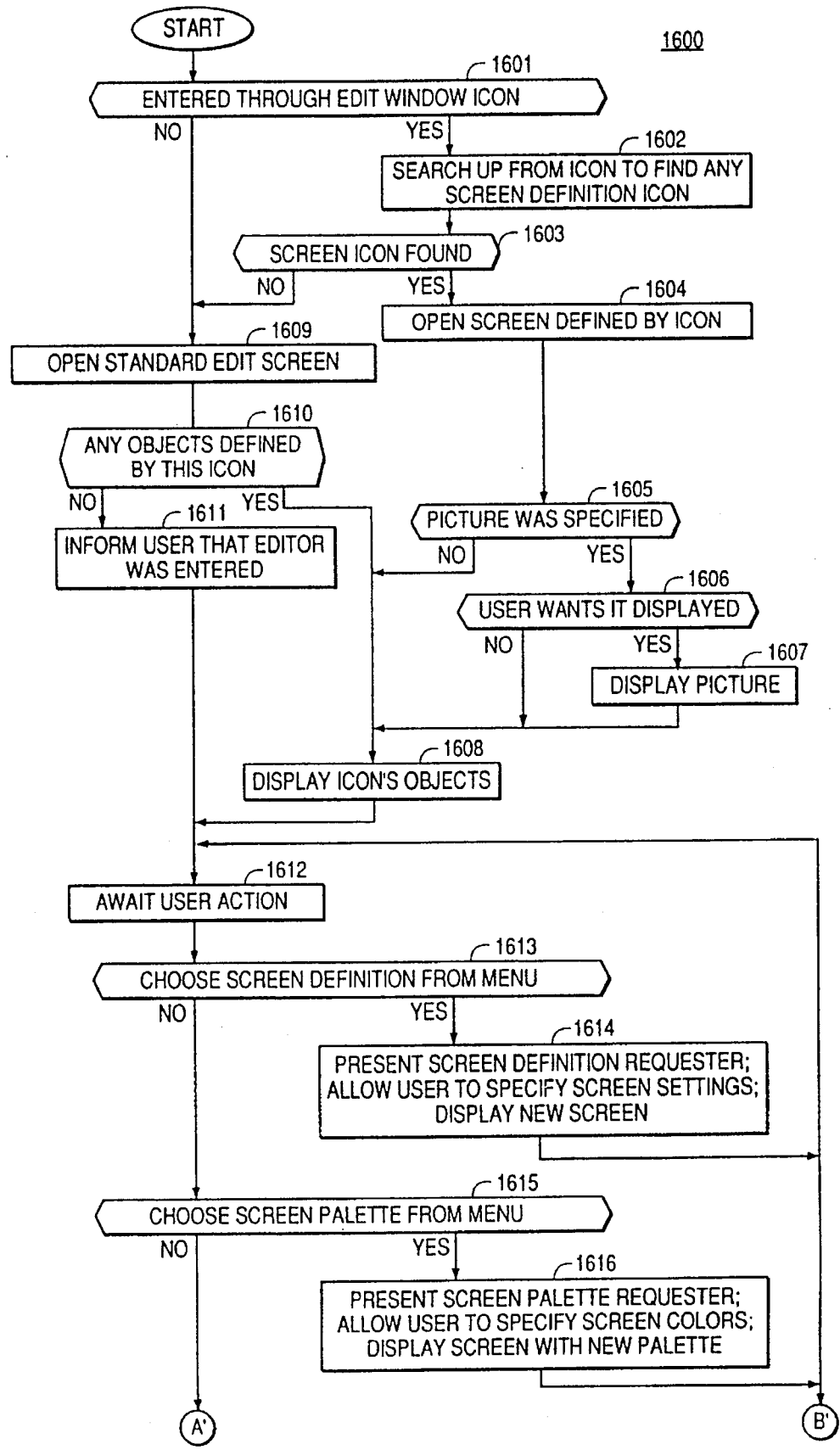
Figure 16B:
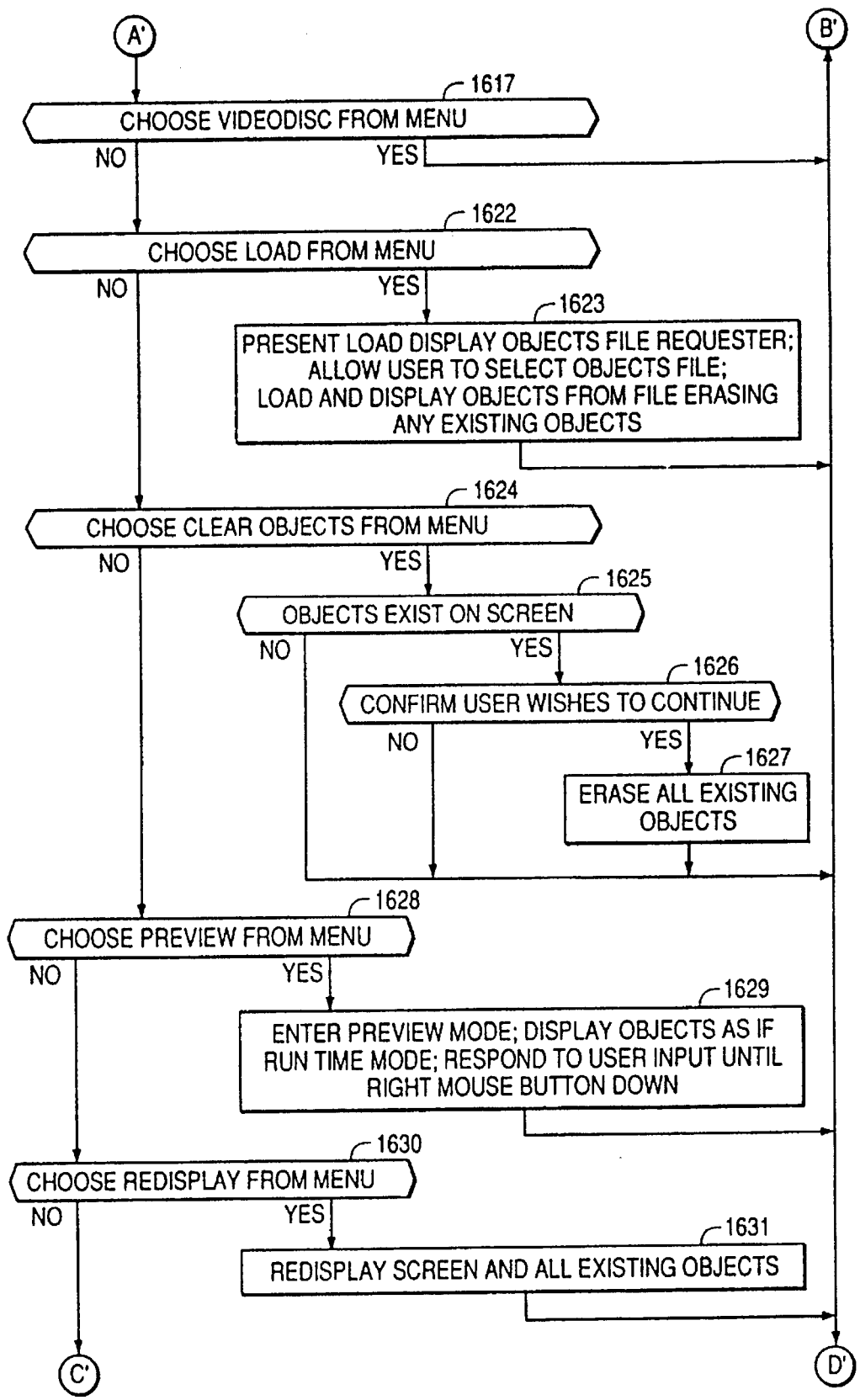
Figure 16C:
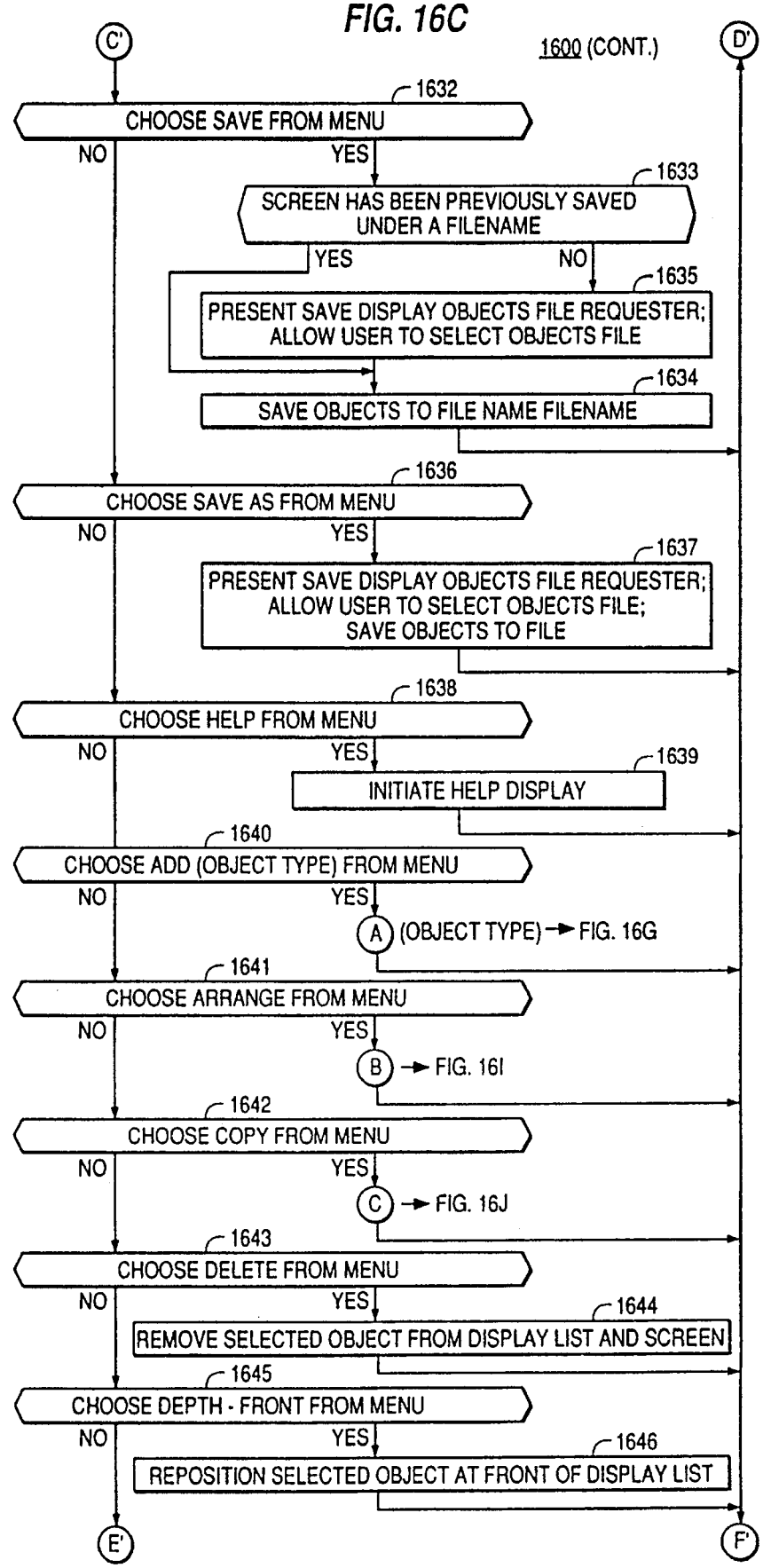
Figure 16D:
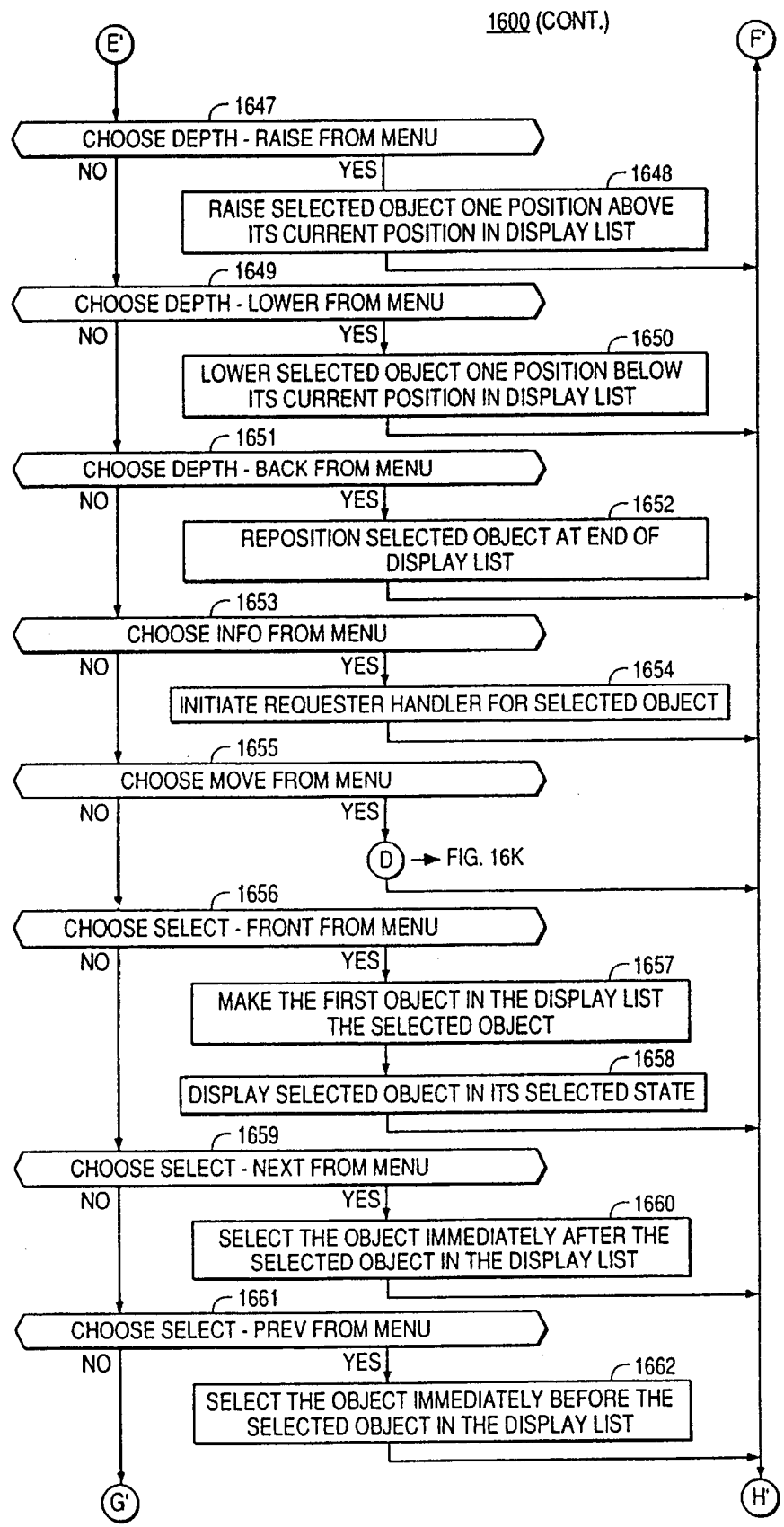
Figure 16E:
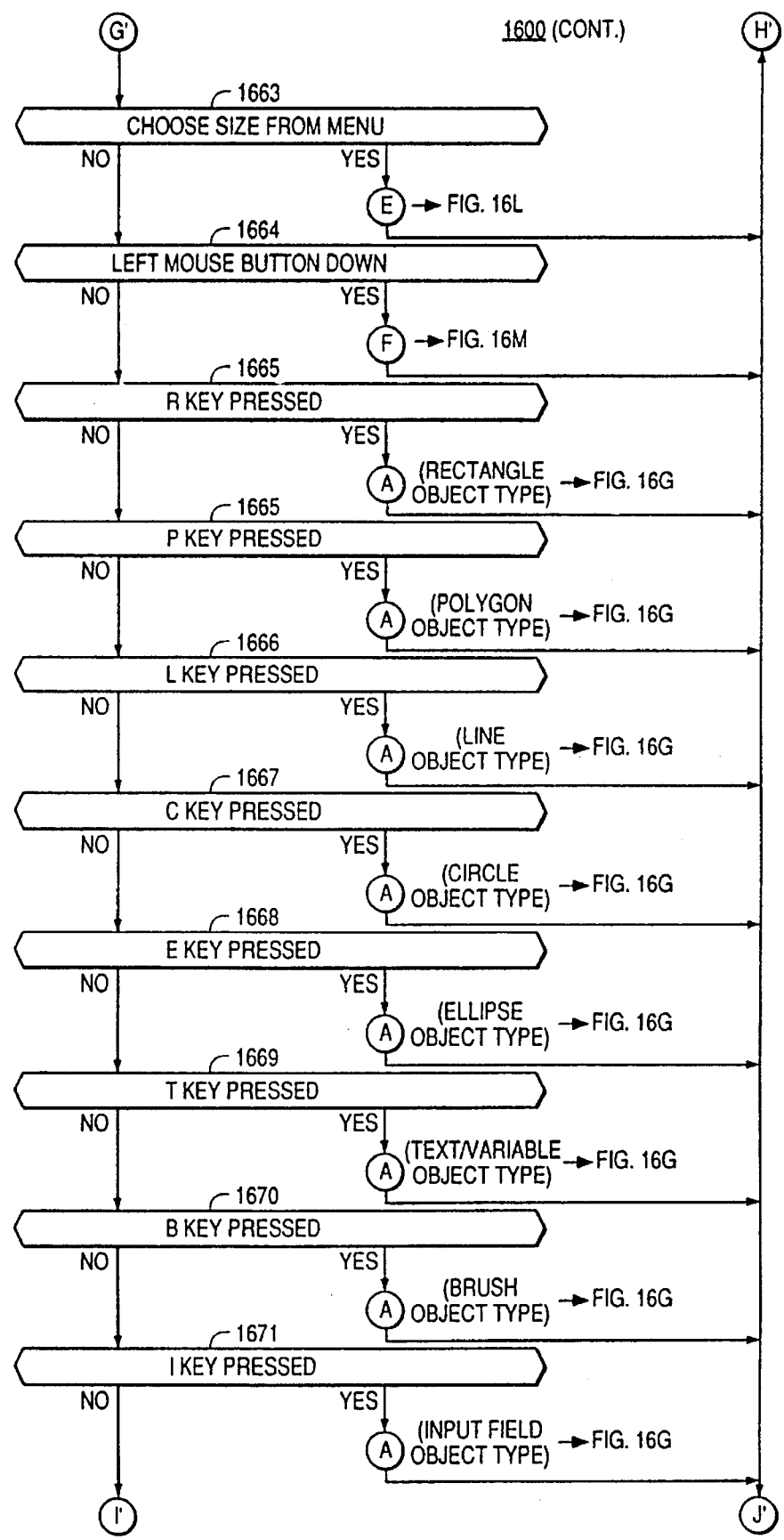
Figure 16F:
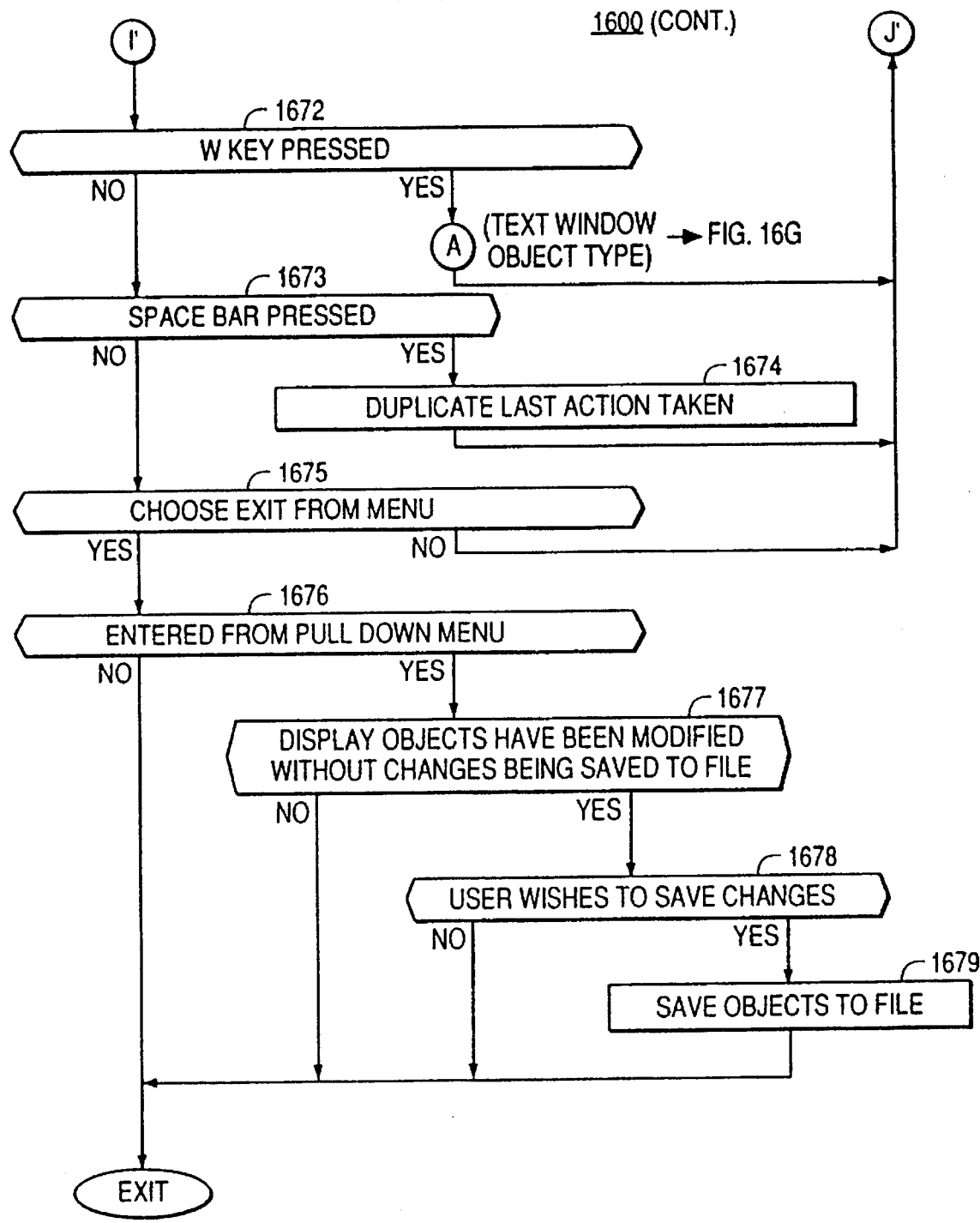
Figure 16G:
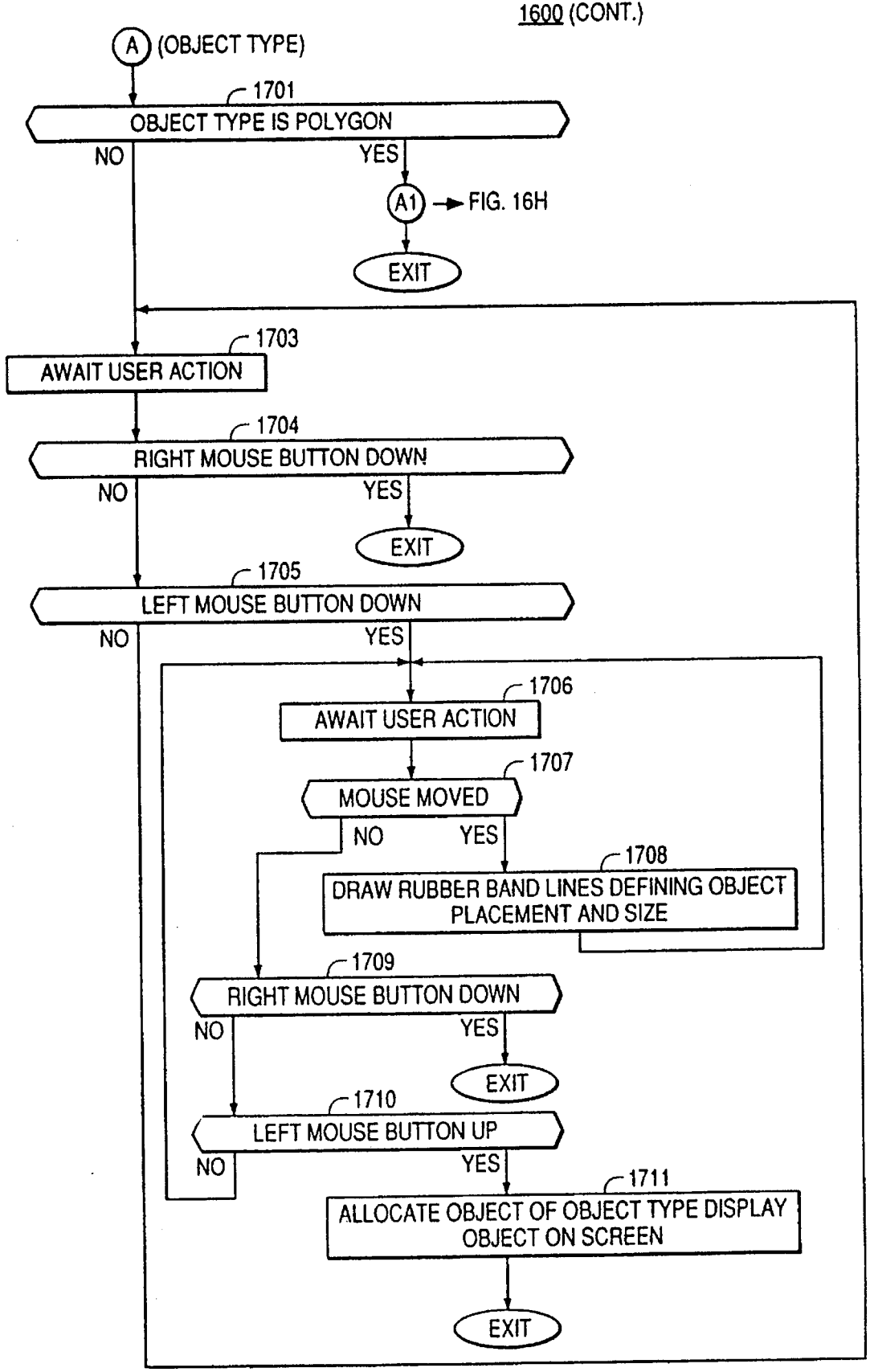
Figure 16H:
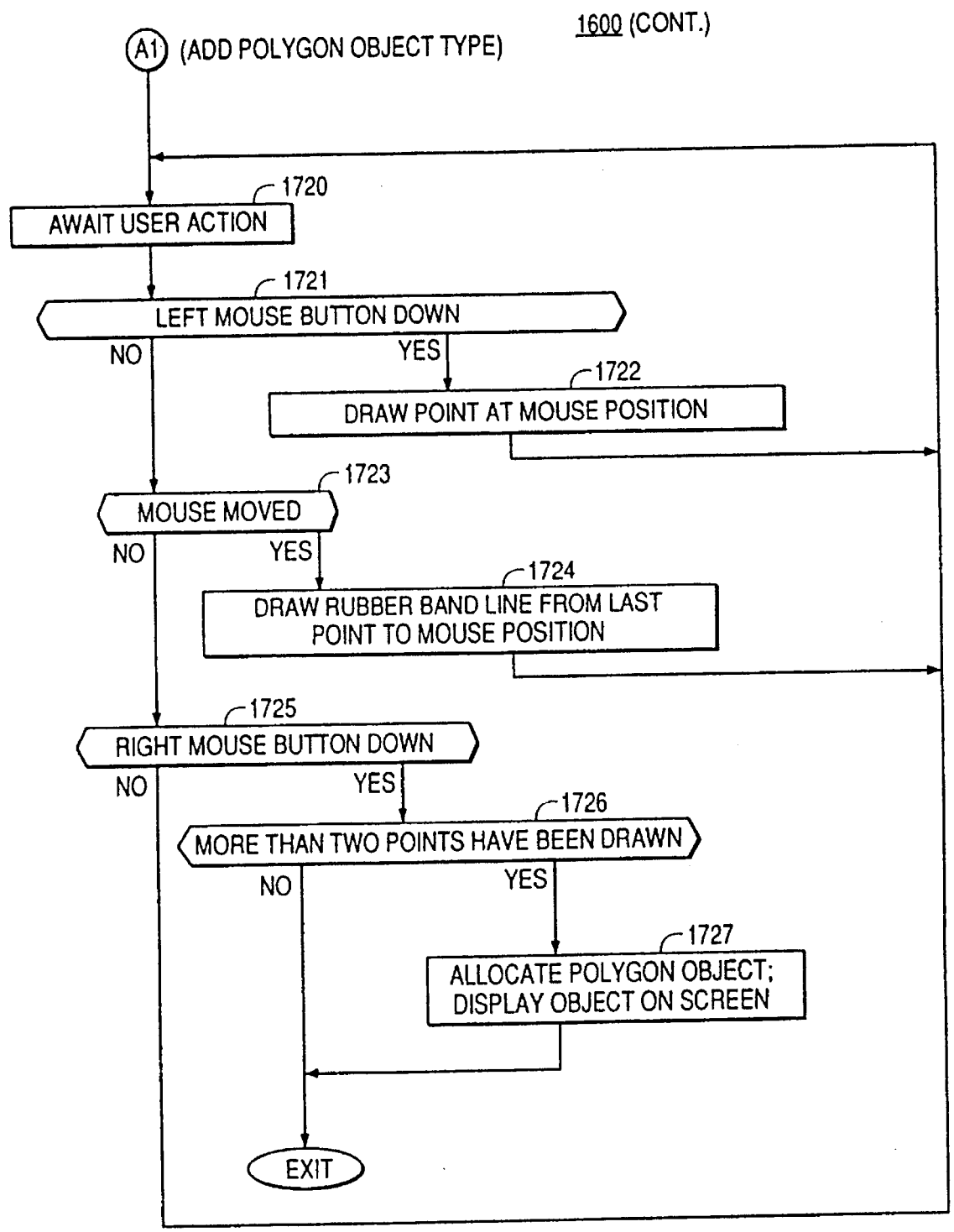

If the user selects the add (object type) from the object editor menu (step 1640), then the object editor 250 continues in step 1701 of FIG. 16H.

Most objects created by the object editor 270 are initially specified by positioning the mouse at the desired initial position, depressing the left mouse button 113, dragging the mouse until the object is the desired size and shape, and releasing the left mouse button 113. This can be envisioned for rectangles, circles, etc. The only object which requires more than two points to be specified is a polygon. Editing a polygon is performed by clicking at the initial point, moving to the second point, clicking again, repeating the move and clicking steps until the desired polygon has been defined. The definition is completed by clicking the right mouse button 112 which connects the last point defined with the first, closing the polygon. The right mouse button 112 is generally viewed to be an abort signal from the user. The object editor uses it to abort definition of all objects except the polygon, which uses the right mouse button 112 to signal completion as described above.

In step 1701 of FIG. 16G, the object editor 250 first determines whether the object type selected by the user is a polygon. If the object type selected by the user is not a polygon (step 1701), the object editor 250 awaits the next user action (step 1703). If the user clicks on the right mouse button 112 (step 1704), the functions of the add object type option of the object editor menu are complete and the flow continues in step 1612 (FIG. 16A) where the object editor 250 awaits the next user action. Otherwise, if the user clicks the left mouse button 113 down (step 1705), the object editor 270 awaits the next user action (step 1706).

If the mouse is then moved (step 1707), then the object editor draws a boundary line on the display screen 122 which the user then uses to define the object placement and size (step 1708). The object editor 270 then returns to await the next user action (step 1706). If the mouse is not moved (step 1707), but the right mouse button 112 is clicked down (step 1709), then the functions of the add object type option of the object editor menu are complete and the flow returns to step 1612 (FIG. 16A) to await the next user action.

However, if the left mouse button 113 is released (step 1710), then the object editor 250 allocates an object of the selected object type and size and displays the object on the display screen (step 1711). The object editor 270 has then completed the add object function and returns to step 1612 (FIG. 16A) to await the next user action. If the left mouse button 113 is not up (step 1710), the object editor 250 returns to step 1706 to await the next user action.

If the user selected the object type as a polygon (step 1701), then the object editor continues its operations in (step 1720) of FIG. 16H and awaits the next user action. If the user presses the left mouse button 113 down (step 1721), then the object editor 250 draws a point at the current mouse position (step 1722) and returns to await the next user action (step 1720). Otherwise if the left mouse button 113 is not down and the mouse is moved (step 1723), then the object editor draws a boundary line on the display screen 122 from the last point at which the left mouse button 113 was depressed to the current cursor position (step 1724). The object editor then returns to await the next user action (step 1720). However, if the mouse is not moved (step 1723), and the right mouse button 112 is depressed (step 1725), then the object editor 250 determines whether the user has drawn more than one point on the display screen 122 (step 1726). If yes, then the object editor allocates the polygon object for display to the display screen 122 and displays the object on the display screen 122 (step 1727). Then, and if the user did not draw more than 2 points on the display screen 122 (step 1726), the operations of the add polygon option of the add object type option of the object editor 250 are complete and the flow of control returns to the main object editor menu at which point the object editor 250 awaits the next user action (step 1612).

Figure 16I:
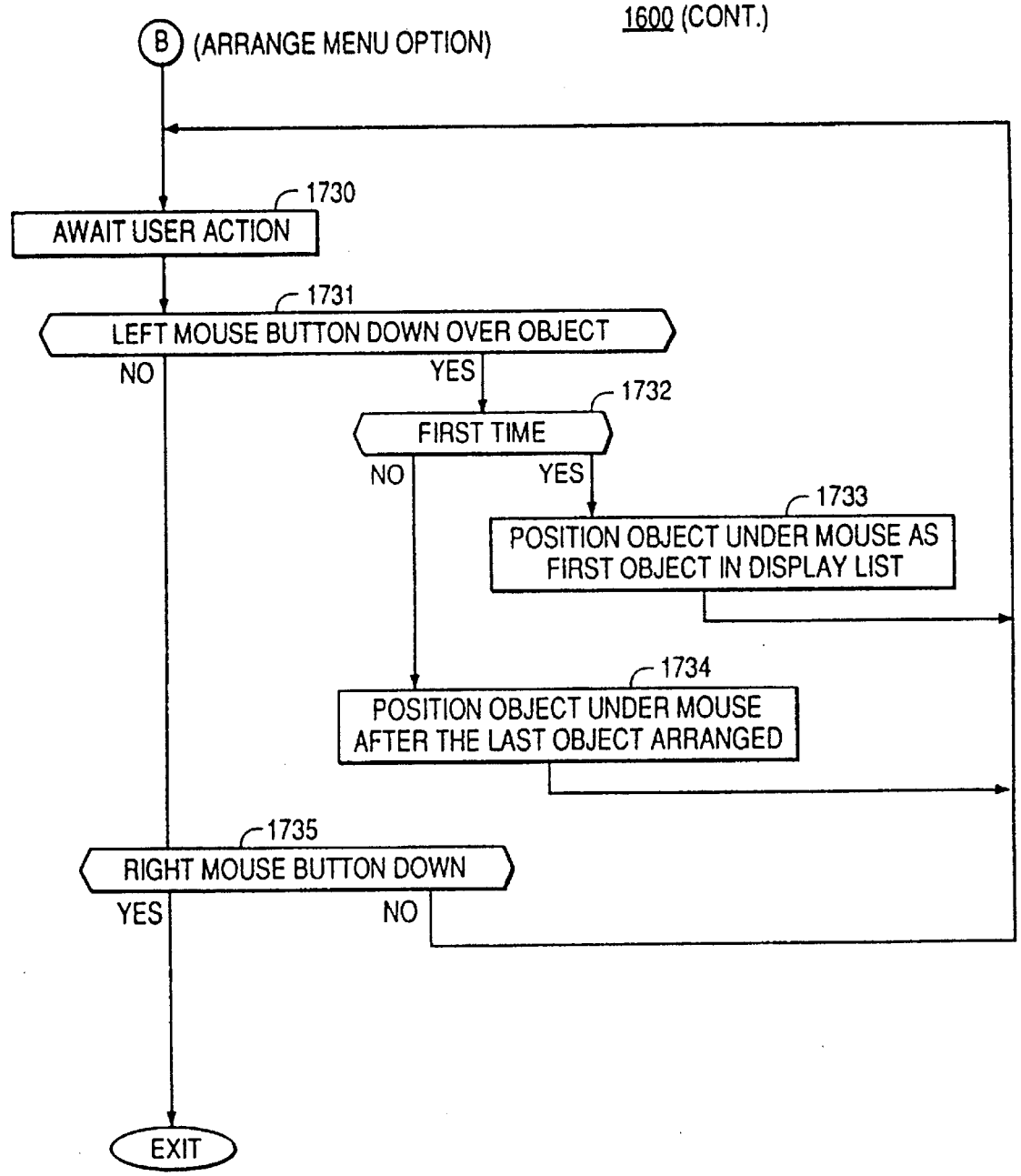

Returning to FIG. 16C, if the user selects the arrange option from the object editor menu (step 1641), then the object editor enters the arrange menu option flow illustrated in FIG. 16I.

First, the object editor 250 awaits the next user action (step 1730). If the user clicks the left mouse button 113 down over an object (step 1731), and it is the first time that user has clicked the left mouse button 113 down over an object (step 1732), then the object editor 250 positions the object under the mouse as the first object in the display list for the current display (step 1733). The object editor 250 then returns to await the next user action (step 1730).

The display list is a list of data structures representing the objects. Each data structure contains information describing one object and its attributes (e.g., coordinates for positioning on the display screen, width, height, and color).

If this is not the first object clicked upon (step 1732), the object editor 250 positions the current object under the mouse after the last object arranged (step 1734) and returns to await the next user action (step 1730). If the left mouse button 113 has not been clicked down over an object (step 1731) and the right mouse button 112 has been depressed down (step 1735), the operations of the arrange menu option of the object editor 250 have been completed and control returns to step 1612 of FIG. 16A to await the next user action. If the right mouse button 112 has not been pressed down (step 1735), then the object editor 250 awaits the next user action in the arrange option.

If the user selects the copy option from the object editor menu (step 1642) (FIG. 16C), then the functions of the copy option are performed. The copy option functions are illustrated in FIG. 16J.

The copy actions are initiated by the user selecting the operation from the menu, depressing the left mouse button 113, dragging the new object to its position and releasing the left mouse button 113. As with object definition, this process may be cancelled by clicking the right mouse button 112.

First, the object editor 250 awaits the next user action (step 1740). If the right mouse button 112 has been depressed (step 1741), then the object editor 250 cancels the copy option selected by the user main object menu to await the next user action (step 1612). If the right mouse button 112 has not been depressed (step 1741), and the left mouse button 113 is depressed (step 1742), then the object editor 250 begins dragging the image of the selected object as requested by the user (step 1743). The object editor 240 then returns to await the next user action (step 1740). If the left mouse button 113 is released (step 1744), then the object editor 250: 1) allocates a copy of the selected object, 2) adds a copy of the selected object to the front of the display list, 3) gives the object the screen coordinates where the image was dragged, 4) makes the object the selected object, and 5) displays the selected object (step 1745). The operation of the copy menu option of the object editor 250 are now complete and control returns to FIG. 16A where upon the object editor 250 awaits the next user action (step 1612). If the left mouse button 113 has not been released (step 1744), the object editor 250 redraws the object at its current position (step 1746) and the copy procedure of the object editor 240 returns to await the next user action (step 1740).

Returning to FIG. 16C, if the user of the object editor 250 selects the delete option from the object editor menu (step 1643), then the object editor 250 removes the selected object from the display list and the display screen 122 (step 1644). The object editor then returns to step 1612 (FIG. 16A) to await the next user action.

If the user selects the depth-front option from the object editor menu (step 1645), then the object editor 250 repositions the selected object at the front of the display list (step 1646) and awaits the next user action (step 1612).

If the user selects the depth-raise option from the menu (step 1647) in FIG. 16D, then the object editor 250 raises the selected object one position above its current position in the display list (step 1648). The object editor 250 then returns to await the next user action (step 1612).

If the user selects the depth-lower option from the object editor menu (step 1649), then the object editor 250 lowers the selected object one position below its current position in the display list (step 1650). The object editor then returns to await the next user action (step 1612).

If the user selects the depth-back option from the object editor menu (step 1651), then the object editor 250 repositions the selected object at the end of the display list (step 1652). The object editor 250 then returns to step 1612 to await the next user action.

If the user selects the Info option from the object editor menu (step 1653), then the object editor 250 initiates the requester handler for the selected object (step 1654). The object editor 250 then returns to await the next user action (step 1612). If the user selects the move option from the object editor menu (step 1655), the object editor 250 continues operation in step 1750 of FIG. 16K at which point the object editor awaits the next user action (step 1750).

Referring to FIG. 16K, the move option of the object editor 250 will now be explained. First, the object editor 250 determines whether the user has depressed the right mouse button 112 (step 1751). If yes, the functions of the move option of the object editor 250 are complete and flow returns to step 1612 of FIG. 16A to await the next user action. Otherwise, and if the left mouse button 113 has been depressed by the user while in the move option of the object editor 250 (step 1752), then the user may begin dragging the image of a selected object (step 1753) and the object editor 250 awaits the next user action (step 1750). Otherwise, and if the left mouse button 113 is released (step 1754), the object editor 250 sets the selected object's coordinates to its new position in the display screen and displays the object in its new position (step 1755). The functions of the move option in the object editor 250 are then complete and flow returns to step 1612 of FIG. 16A to await the next user action. Otherwise, if the left mouse button 113 is not up (step 1754), then the object editor 250 redraws the object at the current position (step 1756) and awaits the next user action in the move menu option (step 1750).

Returning to FIG. 16D, the functions of the object editor 250 will be described further. If the user chooses the select-front option from the object editor menu (step 1656), the object editor 250 makes the first object in the display list the selected object (step 1657) and displays the selected object in its selected state (step 1658). The object editor 250 then returns to await the next user action (step 1612) in FIG. 16A.

If the user selects the select-next option from the object of their menu (step 1659), the object editor 250 selects the object immediately after the selected object in the display list and redisplays the object in the select state of (step 1660). The object editor 250 then returns to await the next user action (step 1612).

If the user selects the select preview option from the object editor menu (step 1661), the object editor selects the object immediately before the selected object in the display list and redisplays the object in the selected state (step 1662). The object editor then returns to await the next user action (step 1612).

The flow of control of the object editor will now be described further with reference to FIG. 16E. If the user selects the size option from the object editor menu (step 1663), then the operations of the object editor 250 continue in FIG. 16L.

Figure 16L:
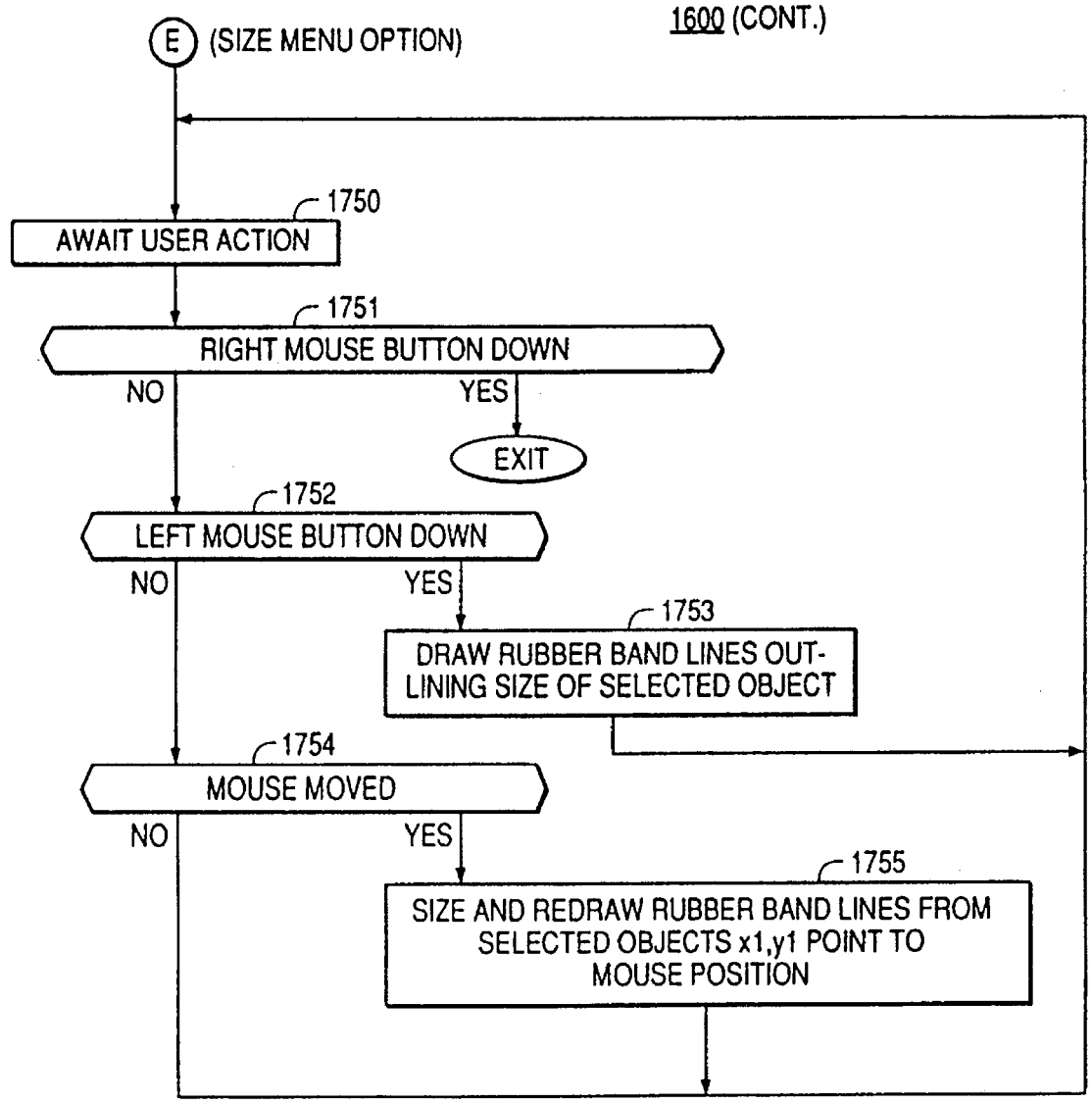

In FIG. 16L, the size function of the object editor menu first awaits the next user action (step 1750). If the user depresses on the right mouse button 112 (step 1751), the function of the size option of the object editor are complete. If the user depresses the left mouse button 113 (step 1752), then the object editor 250 draws a boundary line on the display screen outlining the size of the selected object for alteration by the user (step 1753). The object editor 250 then returns to await the next user action. If the mouse is then moved (step 1754), the object editor 250 sizes and redraws the boundary lines on the display screen from the selected object's beginning point to the current mouse position (step 1755), and then returns to await the next user action (step 1750). If the mouse is not moved (step 1754), the object editor 250 returns to await the next user action (step 1750).

Returning to FIG. 16E, if the user in the object editor menu clicks the left mouse button 113 down (step 1664), then the functions of the left mouse button option of the object editor main menu are performed. FIG. 16M outlines the operation of the left mouse button option of the object editor 250.

First, the object editor 250 determines whether the left mouse button 113 clicked over an object (step 1760). If yes, then the object editor 250 next determines whether this object has been selected (step 1761). If yes, the object editor 250 next determines whether the user has clicked the left mouse button 113 within the predetermined double click time (step 1762). If no, the functions of the left mouse button option of the object editor 250 are complete. If the left mouse button 113 has been double clicked within the predetermined time period (step 1762), the object editor 250 initiates the appropriate requester handler for the selected object (step 1763). The functions of the object requester handler and object requesters for objects are substantially the same as those of the icon requester handler and icon requesters. The only differences are in the specifics of the definition process of each object. The object editor 250 then has completed the left mouse button option.

If the click of the left mouse button 113 was not on the currently selected object (step 1761), the object editor 250 unselects the current object and selects a new object (step 1764). The new object is then the currently selected object. Again, the functions of the left mouse option are then complete.

If the mouse was not clicked over an object (step 1760) and the object editor 250 determines that there is an object currently selected (step 1765), then object editor 250 unselects the current object (step 1766) and then completes the left mouse button 113 functions. If no object has been selected (step 1765), the functions of the left mouse button option are complete.

Returning to FIG. 16E, the remaining functions of the object editor 240 will now be described. In step 1665, the object editor 240 determines whether the "r" key on the keyboard has been pressed by the user. If yes, then the add functions of the object editor, described above with reference to FIG. 16G, are performed to create a rectangle. After the rectangle object type has been added to the object list or the functions of the add option of the object editor 240 have been completed, the object editor returns to step 1612) to await the next user action.

If the user selects the "p" key from the keyboard (step 1665), then the functions of the object editor continue by adding, using the steps outlined in FIG. 16G, to add a polygon object to the display list. When the functions the add option of the object editor are complete (FIG. 16G), the object editor 250 then returns to await the next user action (step 1617). The same functions are used to add a line object (step 1666), a circle object (step 1667), in ellipse object (step 1668), a text/variable object (step 1669), a brush object (step 1670), an input field object (step 1671), and a text window object (step 1672).

If, during the object editor execution, the user presses the space bar (step 1673), the object editor duplicates the last action taken by the user (step 1674) and then returns to await the next user action (step 1612).

If the user chooses the exit option from the object editor menu (step 1675), then the object editor 250 determines whether the user has entered from the pulled down menu (step 1676). If not, then the functions of the object editor 250 are complete. If the user has entered the exit command from the pull down menu (step 1676), then the object editor 250 determines whether any display objects currently on the display screen 122 have been modified without those changes being saved to a file (step 1677). If not, then the functions of the object editor 250 are complete and the user exists the object editor. However, if the objects currently being displayed have been modified (step 1677), then the object editor 250 generates a message on the display screen 122 requesting whether the user wishes to save the modifications (step 1678). If yes, then the object editor 250 saves the objects to a file (step 1619) and the functions the object editor are then complete. Otherwise the user indicates that he or she does not wish to save the changes and the functions of the object editor 250 are complete.

H. The Database Editor

Figure 17:
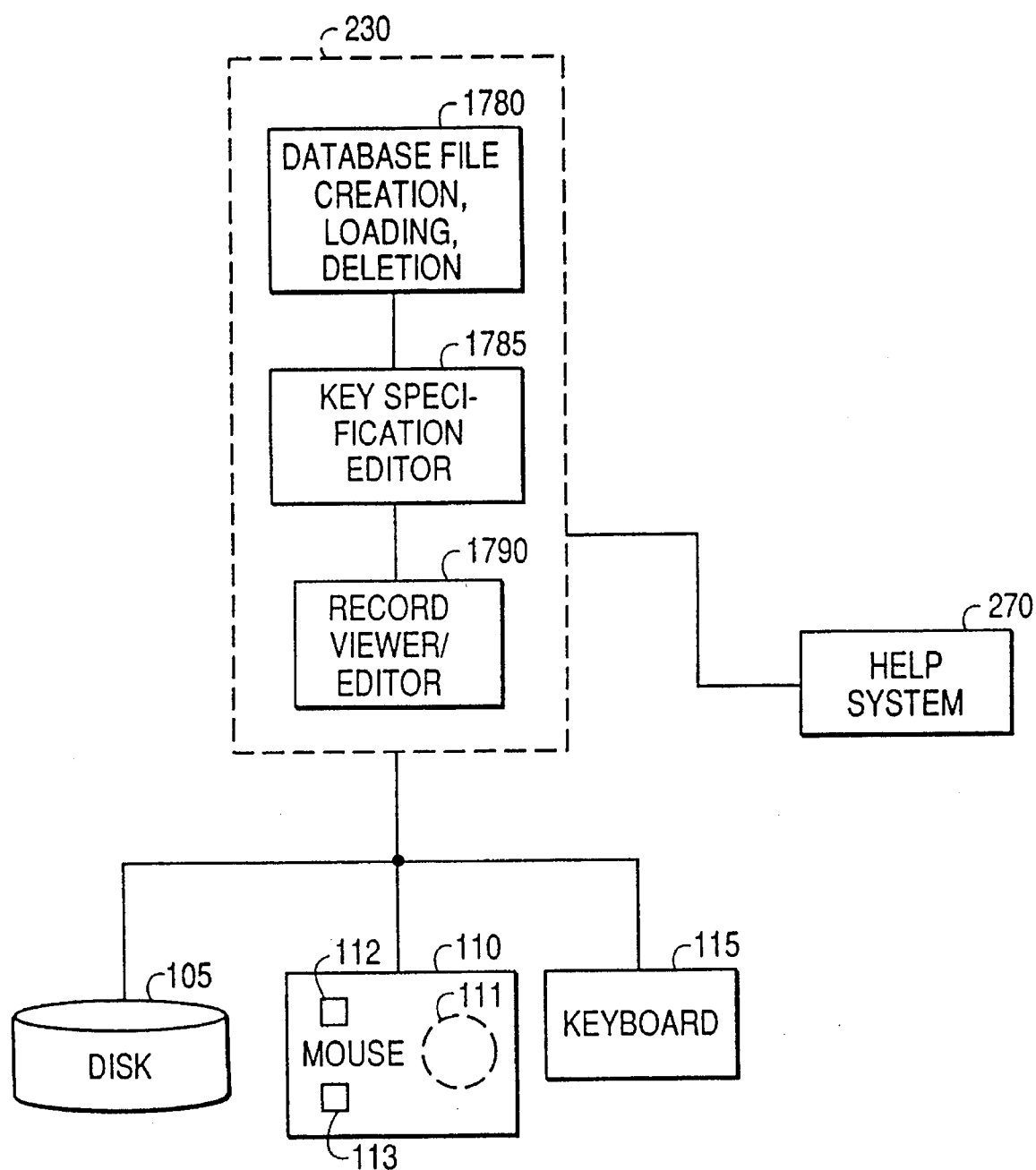
FIG. 17 illustrates a block diagram of the database editor of FIGS. 2 and the relationship of the database editor to other components of the computer system of FIG. 1 and the preferred implementation of the present invention of FIG. 2.

The database editor 230 is depicted in FIG. 17 as being composed of three parts: the database file creation/loading/deletion component 1780, the key specification editor components 1785, and the record viewer/editor component 1790. Although those skilled in the art may recognize that other structures for the database editor 230 may be used to accomplish the same functions performed by the preferred database editor 230 of the present invention, the preferred database editor 230 has been compartmentalized into these three components 1780, 1785, and 1790 for purposes explaining easily the operations of this editor. This is not meant to limit the present invention to this particular structure for this editor.

The database file creation/loading/deletion component 1780 performs the combined functions of: 1) loading an existing database file, to allow a) editing of the file's records by entering the record viewer/editor, b) deletion of all information (records) in the file, c) modification of the record structure (after deleting any existing records) or 2) specification of a new record structure and creation of the file to allow records to be added to the database file. The key specification editor 1785 allows initial or derivative specification of the key to be used when accessing the records in the database and the record viewer/editor 1790 allows the user to move throughout the records in the database, viewing and possibly editing any of the information contained in the records.

Figure 18:
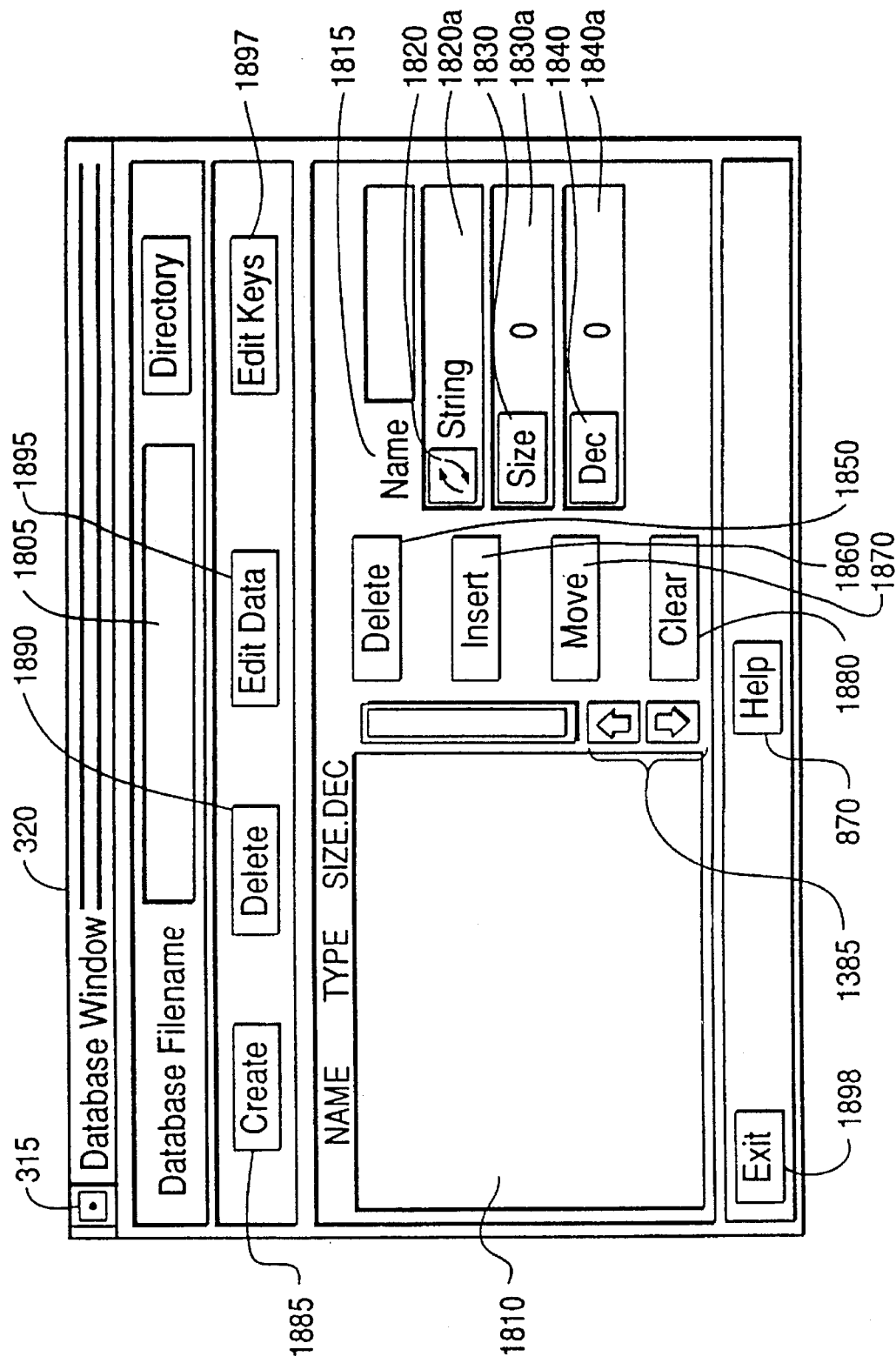
FIG. 18 is an illustration of the database window of the database editor of the preferred implementation.

After selecting the database option from a menu of the preferred implementation, the user is presented with a database window 1800, like the one depicted in FIG. 18, which allows the user to define a new database file format, or the loading of an existing database file format. In FIG. 18, the database editor window 1800 has several familiar gadgets and buttons which will have already been discussed and will therefore not be discussed again.

If an existing database file is to be accessed, the name of the file may be specified in the filename field 1805 and the file is loaded. Once loaded, the structure of the file is displayed in the middle of the database window 1800 in the database structure field 1810, showing the name, type, and size of each of the fields in the records contained in the database file.

New database files are created by the user by first defining each field of a record in the database file in the structure definition field 1810. This requires the user to define the name, type, and size of the fields using fields and the gadgets on the right of the database window 1800. To define a typical record in the database file, the user first enters the name of the field by selecting the name field 1815 and entering the name in the name field 1815. Then the user selects the type button 1820 until the selected field type is shown in the type field 1820a. The user then selects the size of the field in the record by selecting the size gadget 1830 and entering the number in the size field 1830a specifying the size of the field. If the new field in the record is a numeric field then the user selects the "dec" or decimal gadget 1840 to enter the number of decimal points for the number in the numeric field 1840a.

When the field information is complete, it may be inserted into the list 1840 on the left of the database window 1800 by clicking in the insert button. This process is repeated until each of the fields is defined. Once inserted into the list, the fields may be moved about the record by using the move button 1860 in the database window 1800.

The delete gadget 1850 permits the user to delete a field in the record, the insert gadget 1860 permits the user to insert a new field into the fields displayed in the record display area 1810. The move gadget 1870 permits the user to move a field from one location in the record to another location in the record and the clear gadget 1880 permits the user to clear the current information in the record display area 1810.

When the record structure is complete, a name may be specified for the new database file and the file is created by selecting the create button 1885. This presents the user with options to delete the current database file (gadget 1890), edit data in the current database file (gadget 1895), or edit keys (gadget 1897) for the current database file. Keys are used for quick access to the records in the database file by tracking the contents of selected fields in the records. The exit button 1898 is used to exit the current window.

Figure 19:
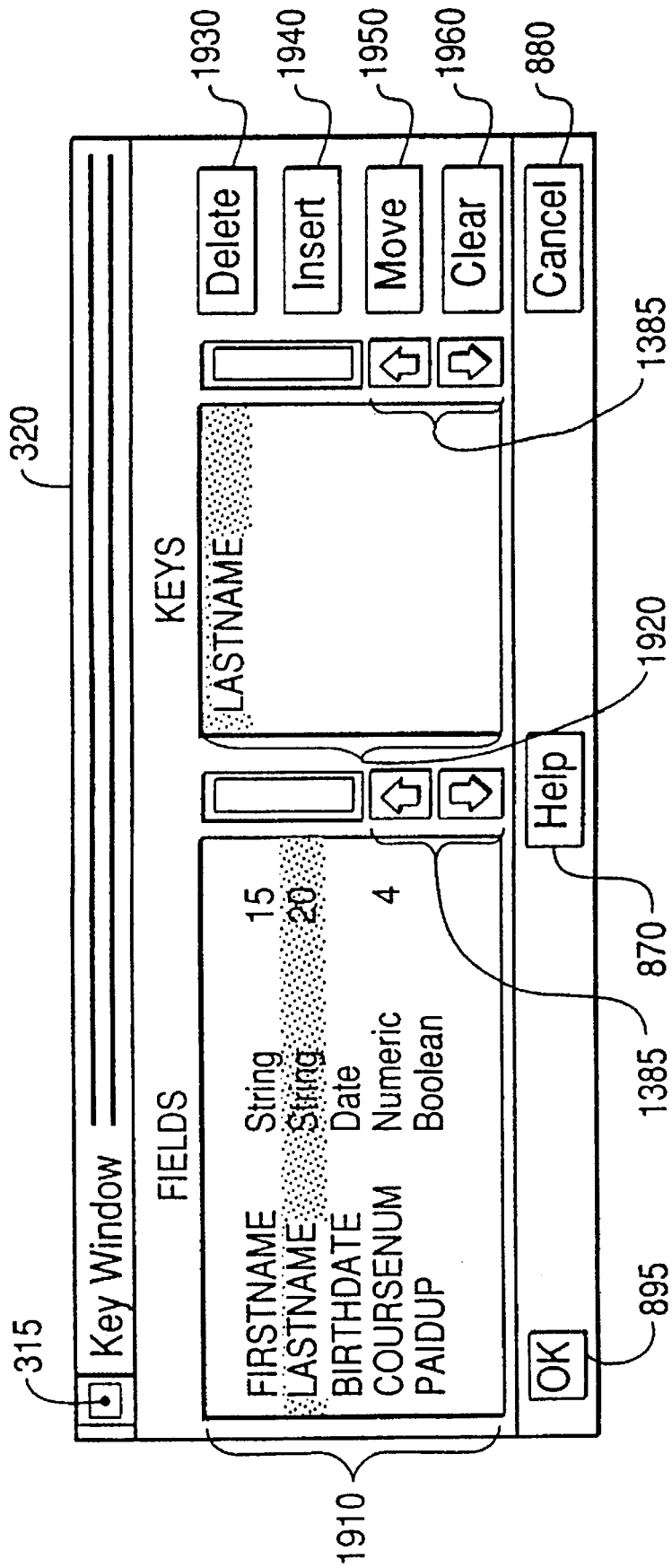
FIG. 19 is an illustration of the key window of the database editor of the preferred implementation.

Key editing in the database editor 230 is performed after the edit keys button 1897 is selected. A list of fields is then displayed on the left in the key window, an example of which is shown in FIG. 19. For each field to be used as a key, the user double clicks on its entry in the list on the left in the key fields list, entering it into the list on the right list 1920. The order of the fields may be changed by using the delete button 1930, the insert button 1940, and move buttons 1950. When the key selection process is completed, the user indicates this by clicking on the 'OK' button 895 which saves the key selections to the file, and generates a new index file if the current file contains any records. The clear button 1960 clears the current list of keys in list 1920.

Once the database file has been created, the contents of the file may be viewed and/or edited by clicking the edit data button 1895 in the database window 1800. This presents the user with the edit database window 2000, an example of which is illustrated in FIG. 20, for displaying information or records contained in a database file.

Figure 20:
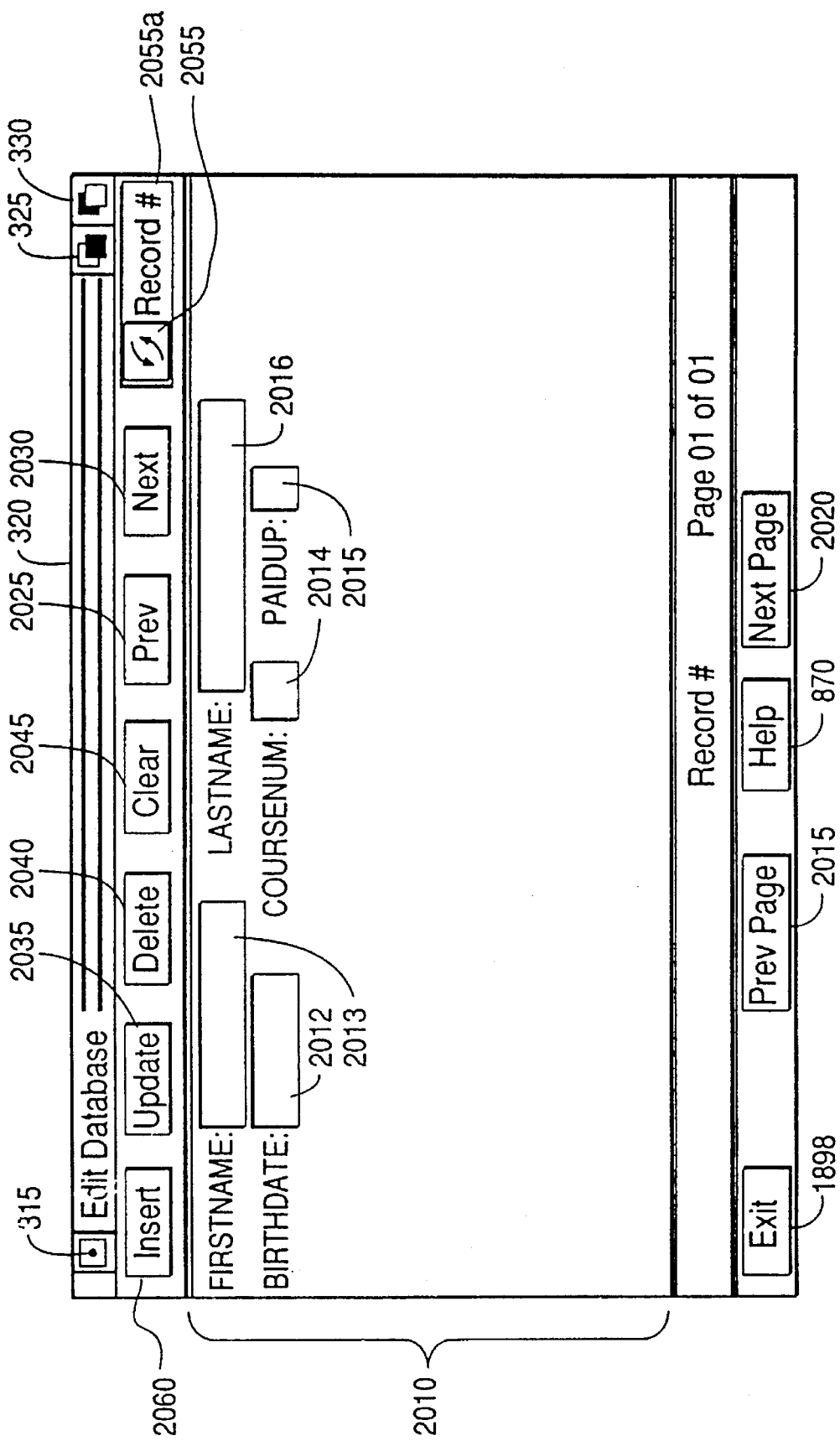
FIG. 20 is an illustration of the edit database window of the database editor of the preferred implementation.

In FIG. 20, all fields are shown with their name and a dark rectangular region 2010 where the contents of the field may be entered/edited. For example, in FIG. 20, the record consists of the first name field 2013, a last name field 2016, a birth date field 2012, course number field 2014, and a paidup 2015 field.

If the record structure of a database file is too large to be displayed on one window, the previous page and next page buttons 2015 and 2020, respectively, on the bottom of the edit database window 2000 may be used to scroll throughout the record structure. The current record displayed in the edit database window 2000 (not illustrated in FIG. 20) may be changed by selecting the prev or next buttons 2025 and 2030 at the bottom of the edit database window 2000. The other buttons on the top row of the edit database window 2000 are for modification/deletion (buttons 2035 and 2040, respectively) of the currently viewed information.

The record # field 2055*a* allows user to select the mode for access of the records in the file. If the text reads 'record #', pressing the next button 2030 will display the record physically located next in the file. If the text reads 'By Key' pressing the next button 2030 will display the next record as sorted by the associated key file. Finally, the insert gadget 2060 permits the user to insert the record in the window 2000 into the database file. Other gadgets in the edit database window 2000 have already been described above.

I. The Videodisc Controller

Figure 21A:
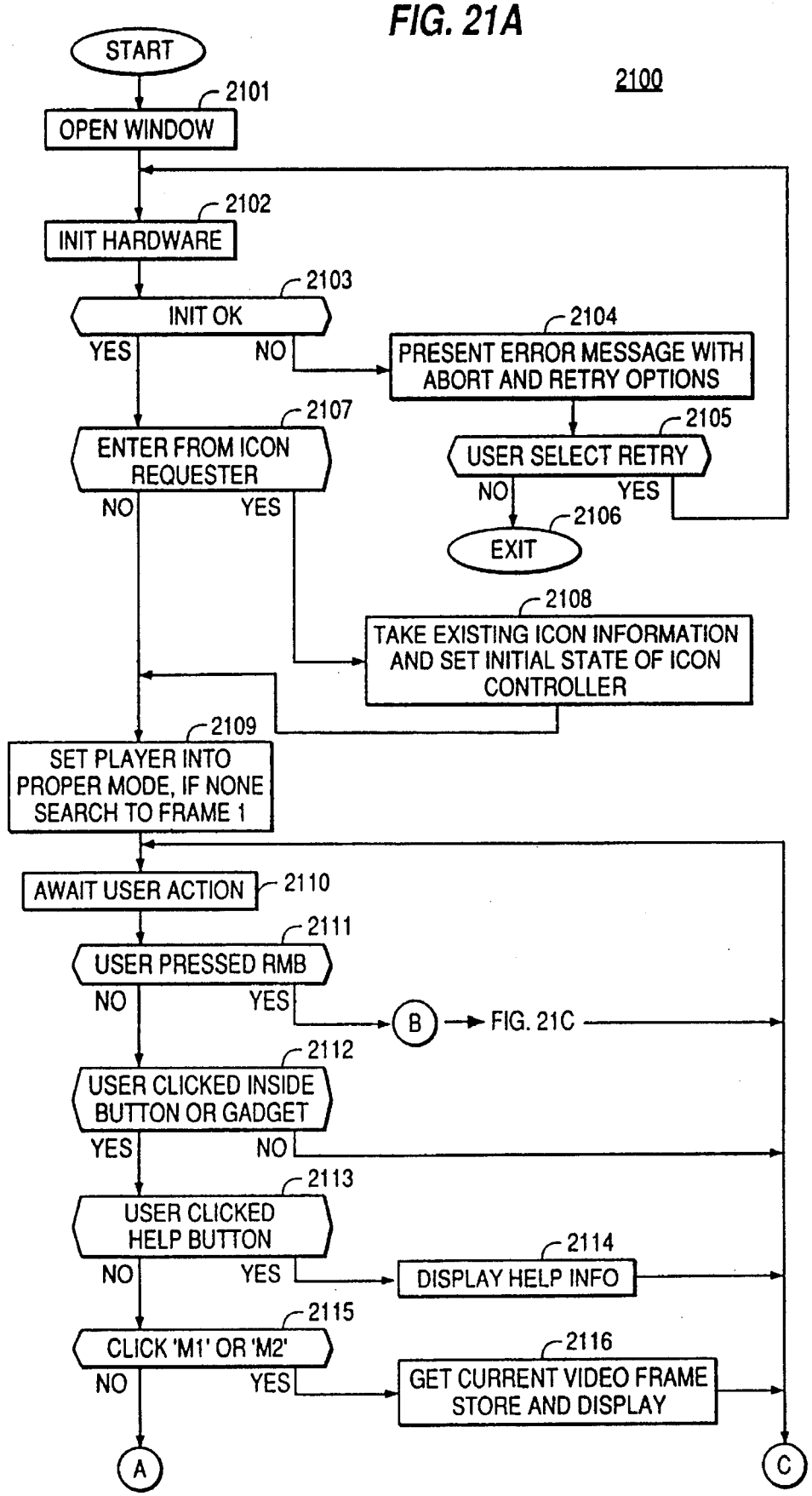
FIGS. 21A–21C are flow diagrams of the preferred implementation of the videodisc controller of FIGS. 2 and 8.
Figure 21B:
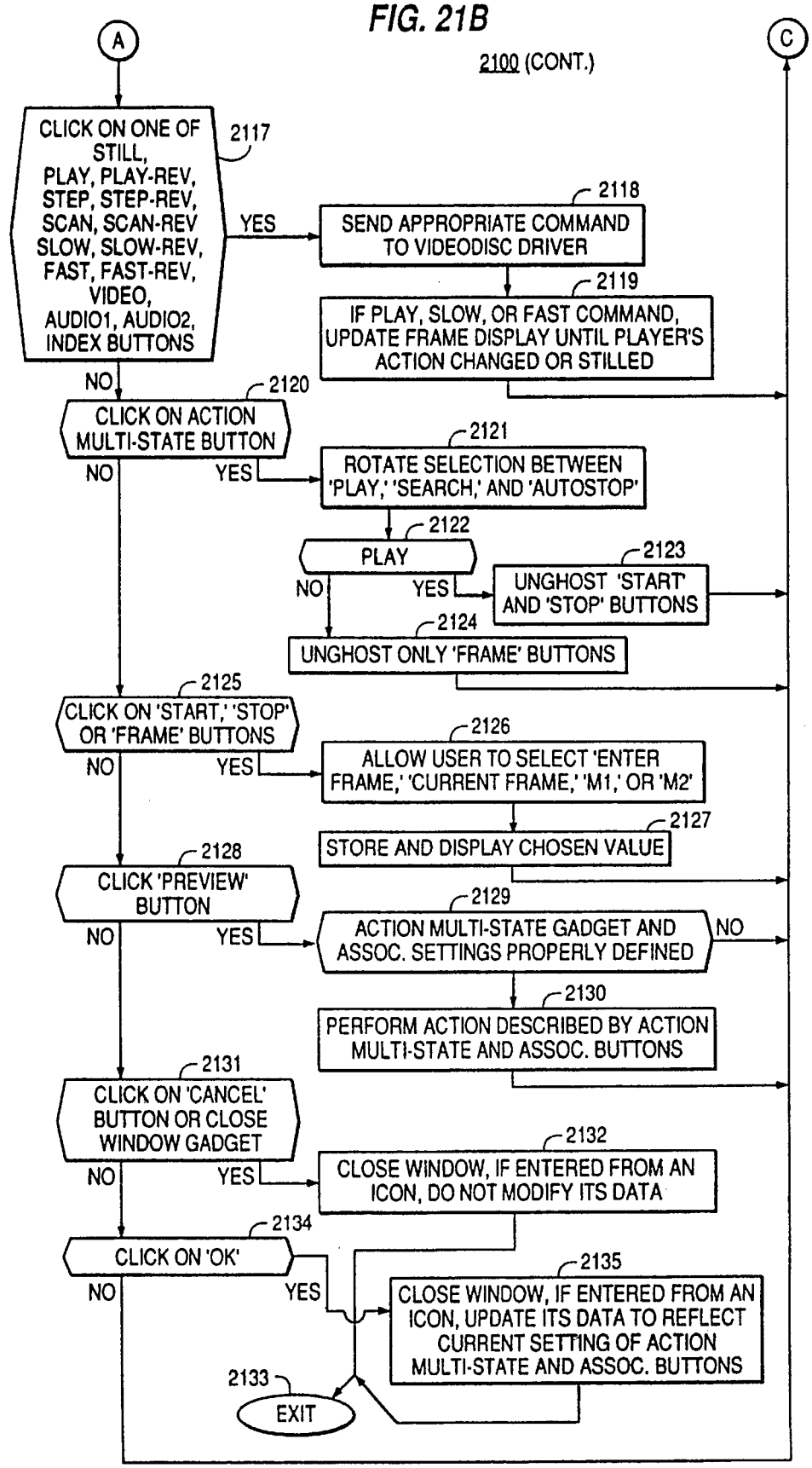
Figure 21C:
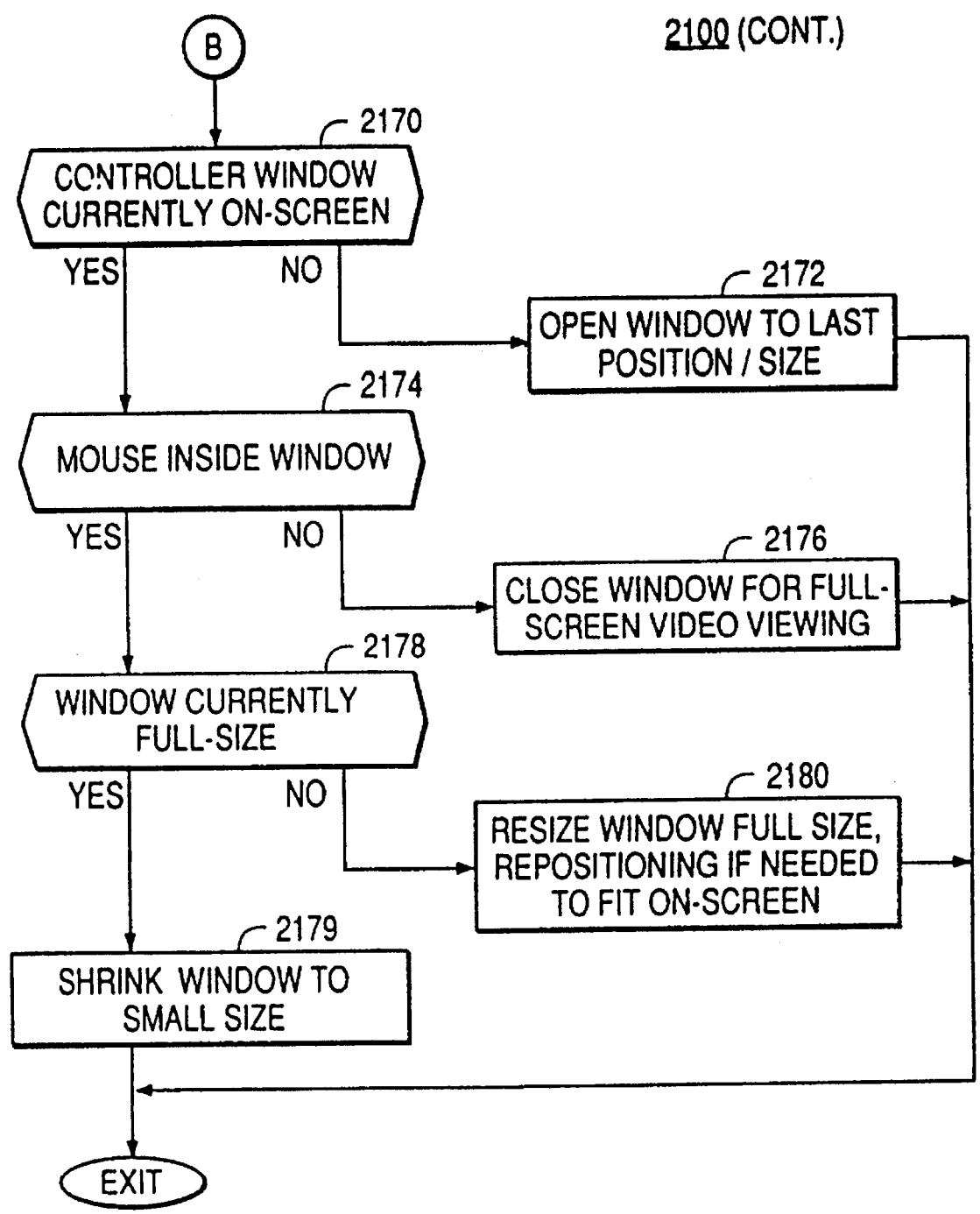

As discussed earlier, the preferred implementation includes a videodisc controller used to define video sequences or display selected video frames. FIGS. 21A–21C illustrate a flow diagram of the videodisc controller of the preferred implementation.

In FIG. 21A, the videodisc controller first begins by opening a window indicating to the user that he or she has selected the videodisc option (step 2101). The videodisc controller then begins by initiating the hardware (step 2102). That is, the videodisc controller determines whether the current platform has a videodisc system connected to it. The videodisc controller then determines whether the initiating process was completed satisfactorily (step 2103). If no, then the videodisc controller presents an appropriate error message with an abort and retry option for the user to select (step 2104). If the user selects retry option (step 2105), then the videodisc controller attempts to initialize the hardware (step 2102). Otherwise the user has selected the abort option and the functions of the videodisc controller are completed (step 2106).

If the initialization was completed satisfactorily, then the videodisc controller determines whether the user has entered the controller from an icon requester (step 2107). If yes, then the videodisc controller takes the existing icon information and sets the initial state of icon controller (step 2108). If the user did not enter the videodisc controller from an icon requester, the videodisc controller sets the videodisc system attached to the platform into the proper mode and if no mode is selected, the videodisc controller searches for the first frame of the current videodisc in the system (step 2109). Next, the videodisc controller awaits the next user action (step 2110). At this point the user may input or select different videodisc controller options.

If the user selects the right mouse button 112 (step 2111), then the functions of the videodisc controller continue in FIG. 21C.

First, the videodisc controller determines whether the controller window is currently being displayed on the display screen. If no, then the videodisc controller opens the controller window to the last known position and size (step 2172). The videodisc controller then returns to FIG. 21A to await the next user action (step 2110). If the user presses the right mouse button 112 and the cursor on the display screen is not inside the controller window (step 2174), then the videodisc controller closes the controller window for full screen video viewing (step 2176) and then returns to FIG. 21A to await the next user action (step 2110). If the user depresses the right mouse button 112 inside the window and the controller window is currently on the display screen (step 2170), and the window is currently at its full size (step 2178), the video controller then shrinks the window to a small size (step 2179). If the controller window is not currently a full size, then the video controller resizes the window to full size and repositions the controller window in the display screen if needed to fit on the screen (step 2180). The video controller then returns to FIG. 21A to await the next user action (step 2110).

In the video controller, if the user clicks the left mouse button 113 inside a button or gadget on the display screen (step 2112), then the videodisc controller goes through a series of steps to determine which button or gadget has been selected by the user.

If the user has clicked the left, mouse button 113 while on the help button (step 2113), then the video controller initiates the help system of the preferred implementation which then displays the appropriate help information on the display screen (step 2114). When the user has completed the help system information the videodisc controller returns to await the next user action.

If the user clicks the left mouse button 113 on the M1 or M2 button on videodisc controller window (step 2115), then the videodisc controller retrieves information from the videodisc system which identifies the current video frame being displayed and then stores the retrieved information (step 2116). Otherwise, if the user clicks on one of the still button, the play button, the play-rev button, the step button, the step-rev button, the scan button, the scan-rev button, the slow button, the slow-rev button, the fast button, the fast-rev button, the video button, the audio1 button, the audio2 button, or the index button (step 2113), the videodisc controller sends the appropriate command information to a videodisc driver of the videodisc system (step 2117). If the play button, the slow button or the fast button commands have been sent to the videodisc driver, then the videodisc controller updates the frame display until the videodisc player's action is changed or stilled. (step 2119). The videodisc controller then returns to wait the next user action (step 2110).

If the user clicks on the action multi-state button in the videodisc controller (step 2120), then the videodisc controller rotates the selection between play, search and auto-stop options (step 2121). If the user selects the play option (step 2122), then the videodisc controller unghosts the start and stop buttons (step 2123). The videodisc controller then returns to await the next user action (step 2110). If the play button has been selected (step 2122), the videodisc controller unghosts only the frame buttons in the videodisc controller menu (step 2124). The videodisc controller then returns to await the next user action (step 2110).

If the user selects the Start, Stop, Frame buttons from the videodisc menu (step 2125), the videodisc controller allows the user to select either the frame, current frame, M1 (memory 1), or M2 (memory 2) options (step 2126). The videodisc controller then stores and displays the selected information entered by the user in response to a selected one of the buttons identified in step 2125 (step 2127). The videodisc controller then returns to await the next user action (step 2110).

If the user clicks the preview button on the videodisc menu (step 2128), the videodisc controller then determines whether the action multi-state gadget: and associated settings have been properly and previously defined (step 2129). If no, the videodisc controller returns to await the next user action (step 2110). However, if the multi-state gadget and associated settings have been defined (step 2129), then the videodisc controller performs the action described by the action multi-state and associated settings (step 2130). The videodisc controller then returns to await the next user action (step 2110).

If the user clicks on the cancel button or close window gadget in the videodisc controller (step 2131), then the videodisc controller closes the window associated with the videodisc menu if the window was entered from an icon (step 2132). Note that in this step the videodisc controller does not modify the data associated with the icon. The videodisc controller processing is now complete (step 2133). If, however, the user clicks on the OK button in the videodisc controller menu (step 2134), then the videodisc controller closes the videodisc window if it is entered from an icon, updates its data to reflect the current settings of action multi-state and associated settings (step 2135), and then completes the videodisc activities (step 2133).

J. The Applications Mover

As described above, the preferred embodiment permits the user to create and edit multi-media presentations. Therefore, the presentation created by the user consists of the flow file or presentation file created in the flow editor and certain resources which represent the files used by the created presentation. These resources may be files containing sounds, pictures, text, music, etc. The flow file accesses these resources by their filename, which specifies where, in the platform 100, the resources can be found.

If a presentation is to be moved (for example, to another platform), all the resources must be moved with the presentation. And since these resources are no longer in their original location, all of the references to these files in the presentation must also be updated. This is the function of the applications mover component 220 (FIG. 2) of the preferred implementation.

Figure 22:
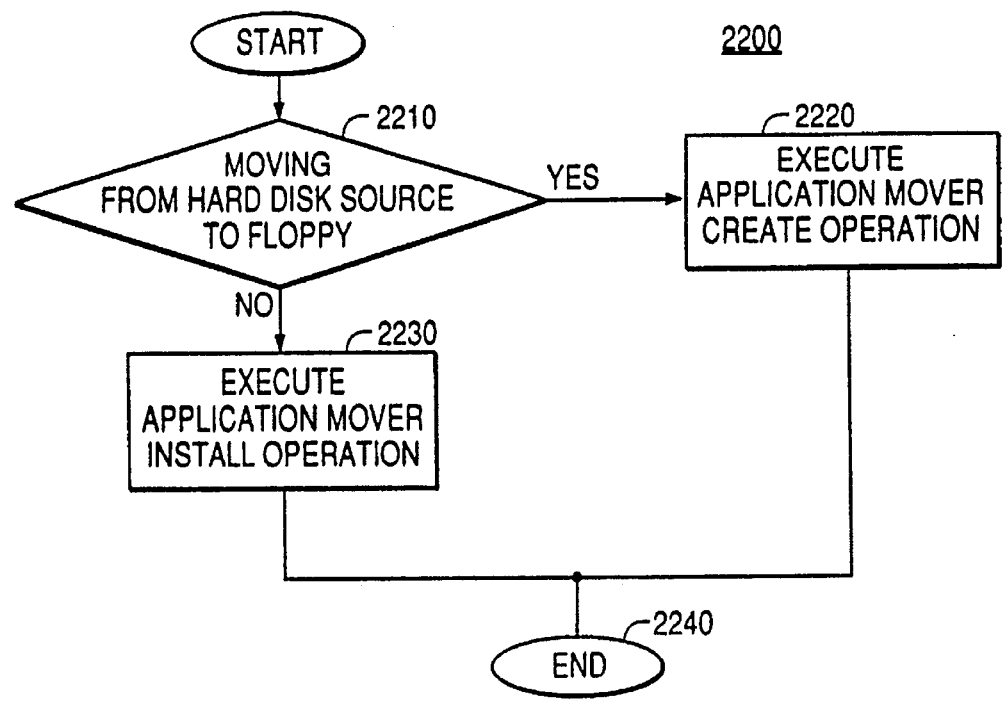
FIG. 22 is a flow diagram of the preferred implementation of the applications mover of FIG. 2.

In general, the applications mover 220 will take a given presentation, scan its flow, copy the flow and resources to the target location, and adjust the flow's references to the new location of it's resources. The applications mover 220 has two modes of operation which move presentations. The appropriate mode is selected by the user depending upon the conditions of the move. The first mode is the create mode in which the applications mover 220 copies the presentation from a harddisk drive to one or more floppy disks. The second or install mode is used to copy a presentation from one or more floppy disks a to a hard disk. This mode can also be used to copy a presentation from another location, e.g., between two hard disks. FIG. 22 illustrates a flow diagram 2200 of the applications mover 220.

If the user selects the applications mover 220 of the preferred implementation, as depicted in FIG. 22, the applications mover 220 first determines whether the user wishes to move a presentation from a hard disk to a floppy disk (step 2210). If yes, then the applications mover 220 create operation is executed (step 2220) and then the processes of the applications mover 220 are complete (step 2240). Otherwise, the applications mover 220 install operation is executed (step 2230) and then the processes of the applications mover 220 are complete (step 2240).

If the create operation is initiated (step 2220), the create operation begins by collecting or awaiting user input, e.g., the name of the flow file to be copied, the name of the presentation in the target, and which floppy disk drives to use. The applications mover 220 then reads the presentation and scans the presentation structure for resources. For each reference to a resource in the presentation, the applications mover 220 ensures that a resource node exists in the resource name list generated by the applications mover 220 during operation. If the applications mover 220, while scanning the presentation structure encounters a new resource, then the applications mover 220 creates a new resource node and adds it to the resource name list. There is only one resource node in the resource list of a presentation for each resource used by the presentation.

During this scan process, the applications mover 220 also creates a resource reference list, as part of the resource node, which contains a list of references, one entry for every reference in the presentation structure to the resource. Each entry on the resource reference list identifies what in the presentation to be moved is referring to the resource and the context of the reference. When the applications mover 220 scans a presentation structure and identifies a resource reference, the applications mover 220 creates a resource reference node linking the resource node with this reference. Some icons in a presentation may reference more than one resource.

After the presentation structure is scanned, the resource name list is scanned by the applications mover 220 three times. In the first pass, the applications mover 220 collects all information on each resource. In the second pass, for each non-existent resource (or resource which does not reside on the source disk), the user is prompted to substitute another file, skip the file, or abort. In the third pass, the applications mover 220 ensures that each resource is small enough to store on a floppy disk. If a resource is too large to fit on a floppy disk, then the applications mover 220 permits the user to substitute another file, skip the file, or abort.

After the three pass scan of the resource name list, the applications mover 220 creates a log file which includes a log of unusual or important events, e.g., user-substituted files, files skipped because of user command or because they are too large.

Next, the applications mover 220 assigns new destination names to the resource nodes by assigning them to floppy disks. This process includes sorting the resource nodes in the resource name list in descending-size order. The sorted resource name list is then scanned and for each resource name not yet assigned, the applications mover 220 sees if it will fit on the current floppy disk. If it will fit on the current floppy disk, then the applications mover 220 marks the resource as assigned, and gives it a destination name referring to the location on that floppy disk. If the resource will not fit on the current floppy, then the applications 220 mover skips that resource in the resource name list and continues with the next resource node. This process is repeated until all resource nodes are assigned to the floppy disks.

Next, the applications mover 220 updates the resource references in the presentation with the new resource name destination. Using the resource reference list, every reference in the presentation is adjusted to use the new name assigned to the resource nodes. Then the applications mover 220 informs the user of the number of floppy disks required to copy this presentation. At this point the user may abort the applications mover 220 if desired.

If the applications mover 220 is not aborted, then the applications mover 220 copies the resource to the floppy disks selected at the beginning of the applications mover 220 procedure, and asks the user to insert each disk for copying. Then the applications mover 220 copies the updated presentation, log file, and all resources to the assigned destination disks. During the copying process, the user will be prompted to swap disks in the floppy disk drive when necessary.

Finally, when the presentation copying is complete, the applications mover 220 permits the user to review the log file generated during the copying process.

If the user selects the applications mover 220 install procedure, then the applications mover 220 collects input, e.g., the presentation file to be copied, the destination name for the presentation to be copied, and the target location for resources used by the presentation. The install operation of the applications mover 220 offers more control on where resources are to be stored in the destination hard disk. After collecting input, the applications mover 220 reads the presentation file to be copied. In a manner similar to the scanning process discussed above with reference to the applications mover 220 create process, the applications mover 220 in the install process next scans the presentation structure for resources.

After scanning the presentation structure for resources, the applications mover 220 then scans the resource name list, generated during the presentation scanning process, in two passes. In the first pass of the resource name list, the applications mover 220 collects information about each resource, e.g., file type and file size. In the second pass, the applications mover 220, for each non-existent resource (or a resource identified in the presentation yet not resident in the source disk), permits the user to substitute another file, skip the file, or abort.

Next, the applications mover 220 creates the log file in a manner similar to the process used by the applications mover 220 in the create mode. After the log file is created, the applications mover 220 assigns new destination names for the resource names in the resource name list. That is, for each resource name in the list, the applications mover 220 assigns it a new name depending upon the file-type. The applications mover 220 then updates the resource references in the presentation to the new destination names. Using the resource reference list, the applications mover 220 traverses the presentation structure locating every reference in the application to a resource and adjusting the references to use the new name assigned to the resource names.

The applications mover 220 then copies the resources to specified destinations (e.g., harddisks) and when copying is finished, the applications mover 220 permits the user to review the log file.

K. The Evaluator

The evaluator 240 (FIG. 2) is another important component of the preferred implementation of the present invention and is used to evaluate (or execute) presentations on the platform 100 (FIG. 1). FIGS. 23A–23G illustrate a flow diagram 2300 of the preferred evaluator of the present invention.

When the evaluator 240 begins operation, it initializes the evaluation environment (Step 2301). The evaluation environment includes all information describing the current state of the evaluator 240. The dynamic part of this environment is the runtime return stack. The runtime return stack stores ENodes which are described below. As is shown in FIG. 23C, step 2334, whenever the evaluator 240 beings operating on a parent's children, an ENode is added to this stack which retains the state of the evaluator 240 at the time of the parent's evaluation. When the children have all been evaluated, the top ENode is removed from the runtime return stack, and evaluation continues with the icon immediately following the parent. When the evaluator begins operation, this stack is initialized to an empty state.

Next, the evaluator 240 opens the initial presentation screen (step 2302).

The evaluator 240 then attempts to locate the first icon in the application presently being evaluated (step 2303). If no icon is located (step 2303), then the evaluator 240 closes the presentation screen and frees the resources allocated by the evaluator in step 2301 which were anticipated for the presentation of the application (step 2347). The operations of the evaluator are then complete (step 2348).

If the evaluator 240 identifies the first icon in the application under evaluation (step 2303), then the evaluation process begins by identifying the icon associated with each data structure in the application, for example, FIGS. 9A–9B. First, the evaluator 240 determines whether the icon is a call icon (step 2304). If yes, then the evaluator 240 determines whether the call icon has a reference icon (partner) associated with the call icon (step 2305). If a reference icon has been defined for this call icon (2305), then the evaluator 240 locates the subroutine on the RootEvent's child list (step 2306). The RootEvent is the event structure that contains the complete presentation. All events and commands in the presentation are its descendents, with all the icons in the left-most column of the presentation being found on the RootEvent's child list. If a subroutine is located on the RootEvent's child list (step 2306), the PushENode procedure is executed to save the current state (step 2307).

Figure 23D:
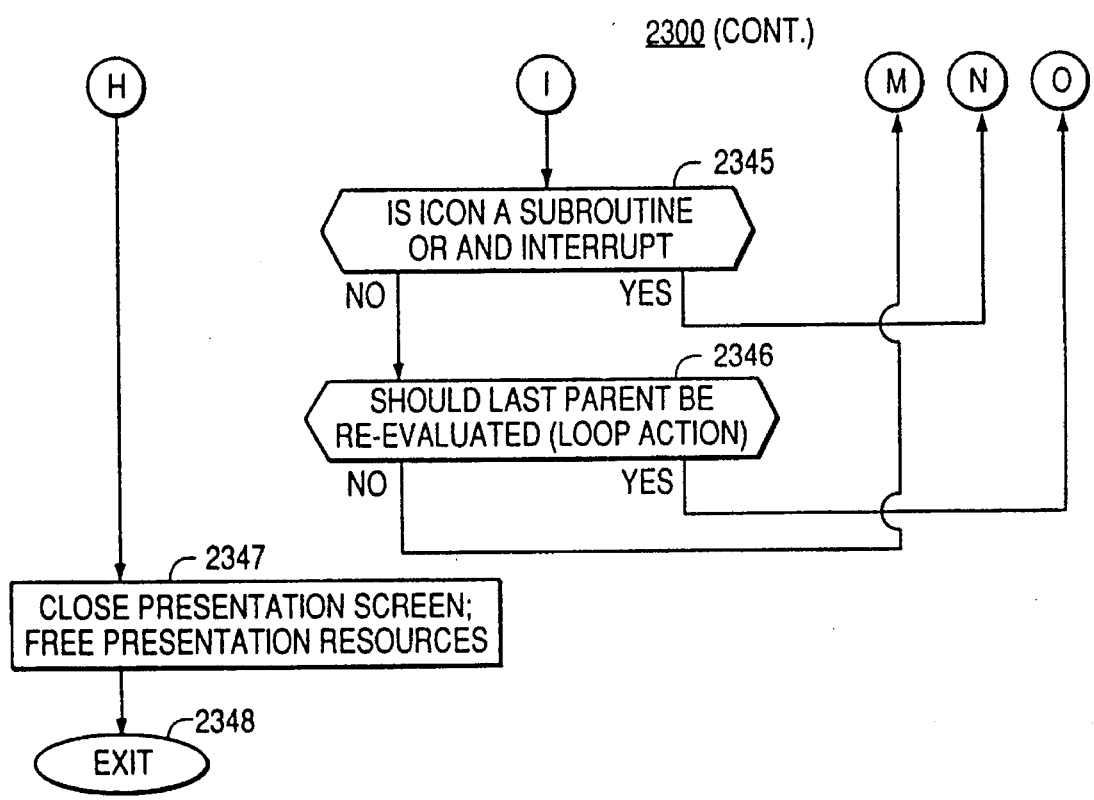
FIGS. 23A–23G are flow diagrams of a preferred implementation of the evaluator of FIG. 2.
Figure 23A:
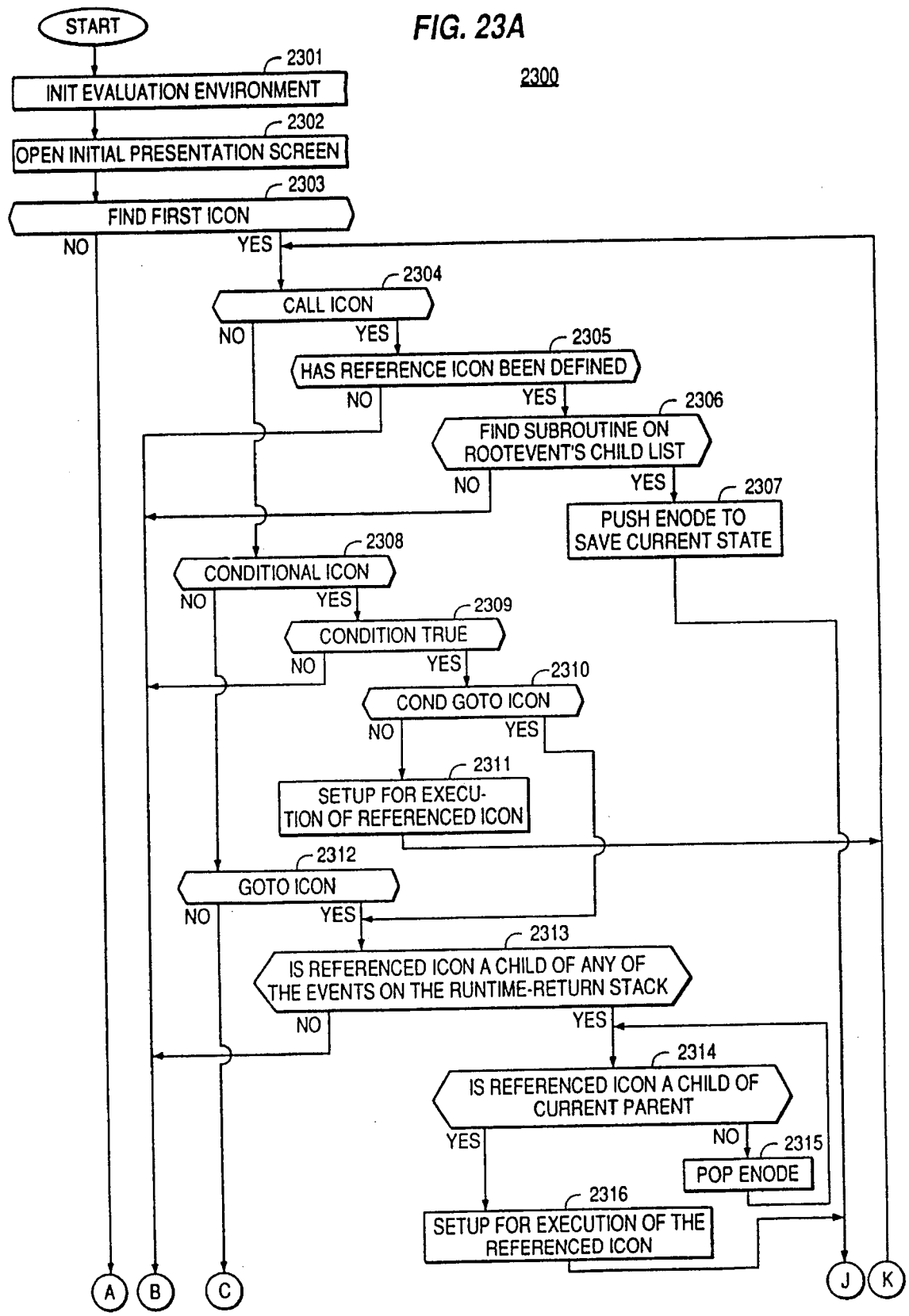
Figure 23B:
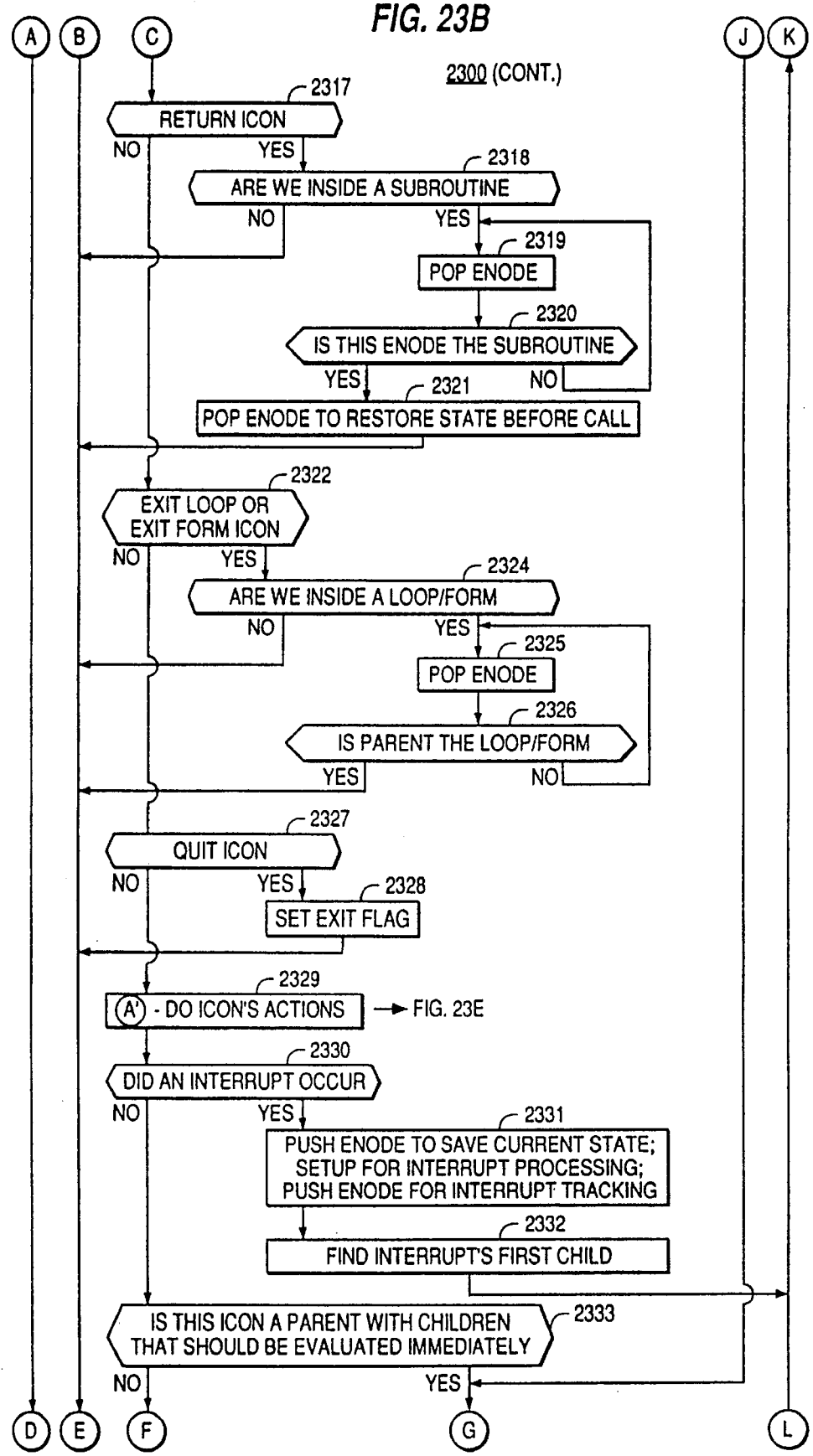
Figure 23C:
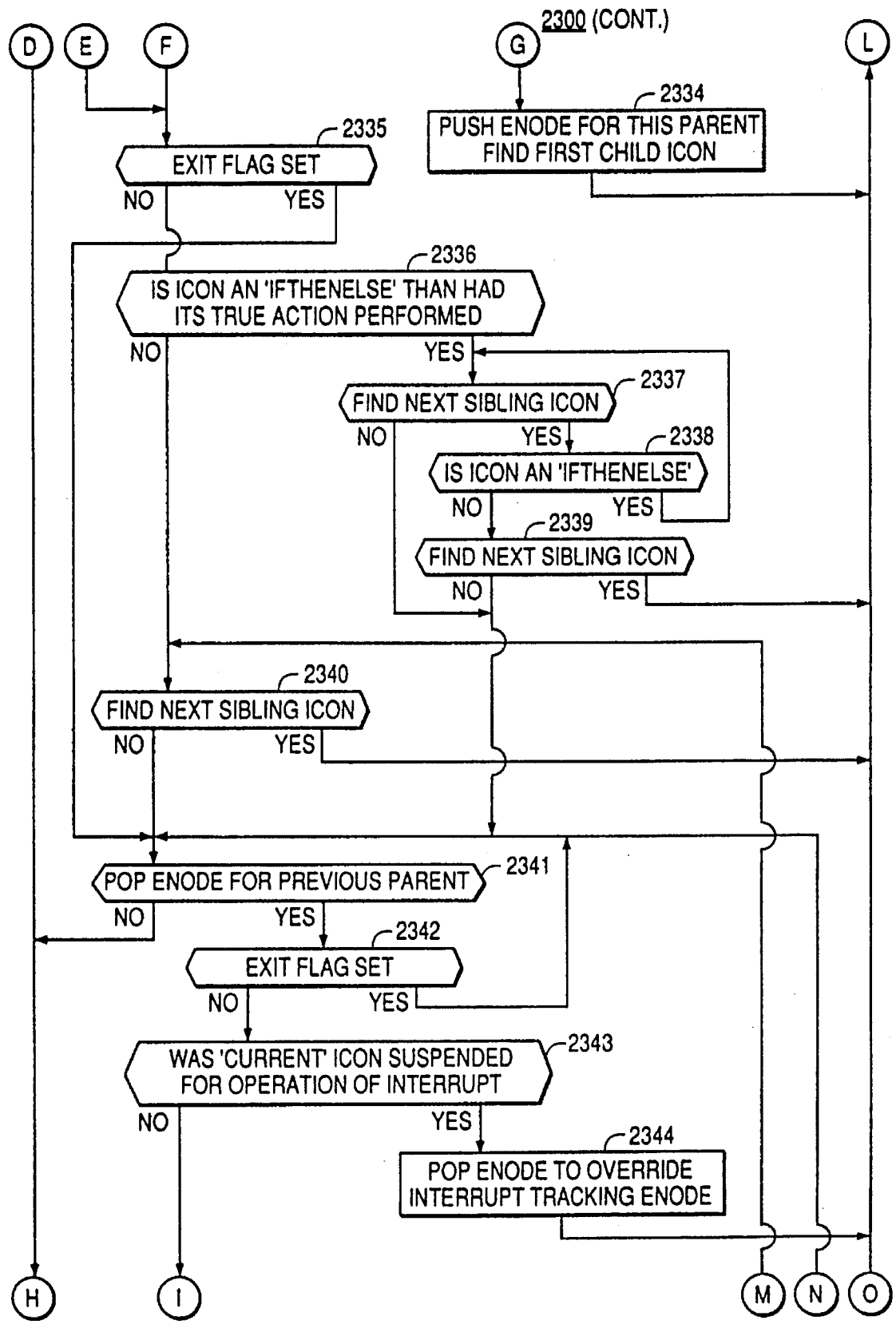
Figure 23E:
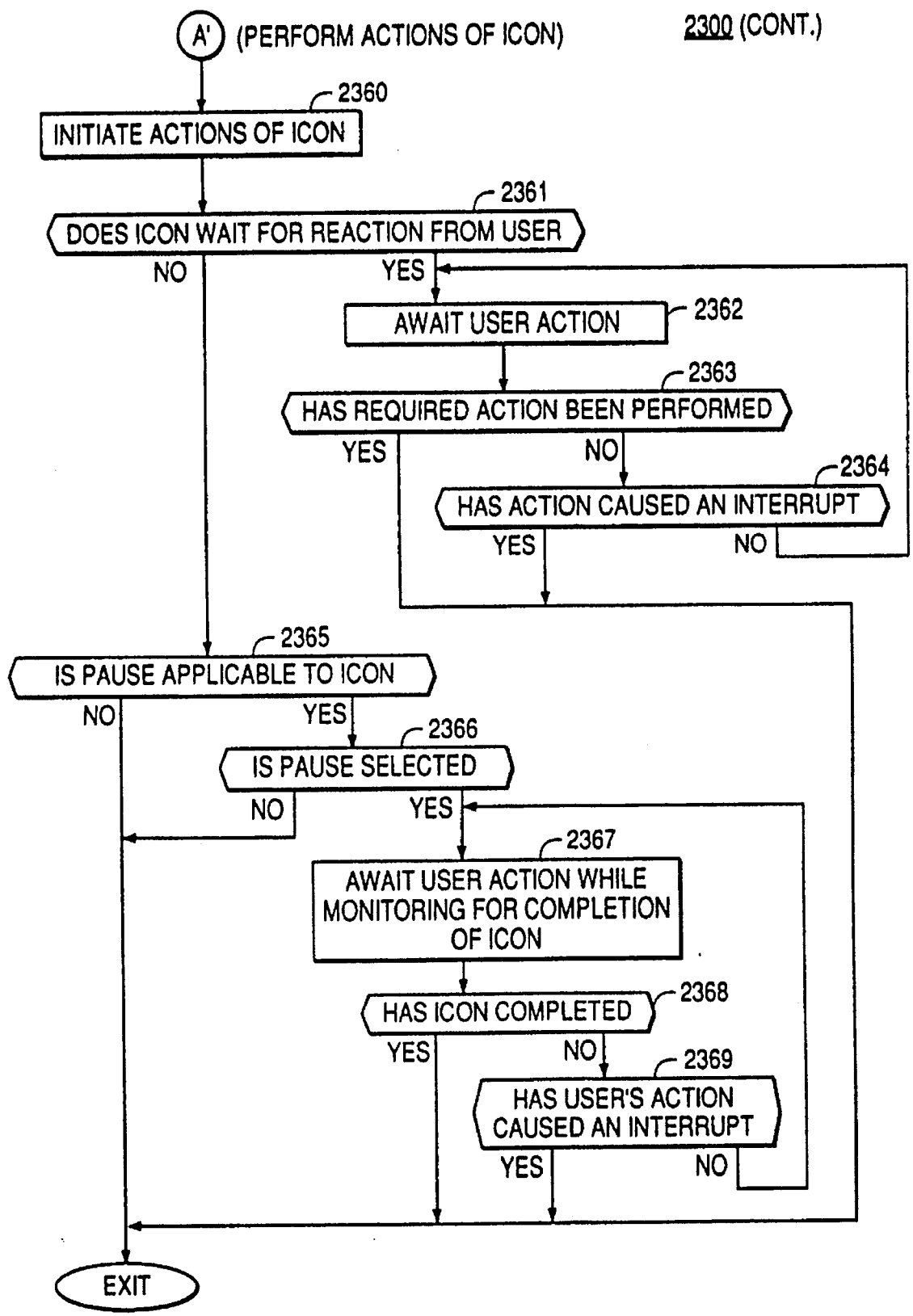
Figure 23F:
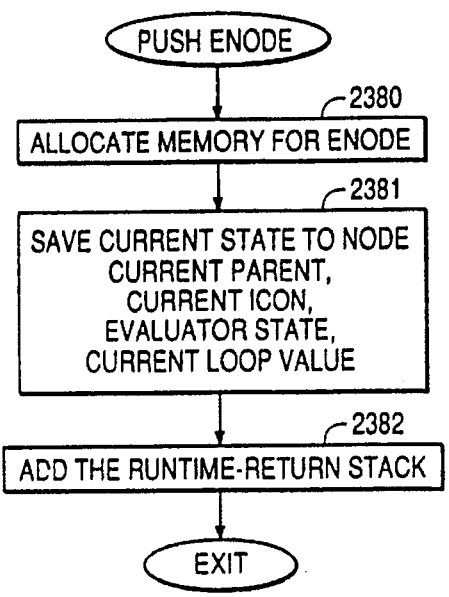

The PushENode procedure is illustrated in FIG. 23F. When the evaluator 240 begins the PushENode procedure, the evaluator 240 first allocates memory in the platform 100 for the ENode (step 2380). The evaluator 240 then saves the current state to the ENode including, the current parent, the current icon, the current evaluator state, and the current Loop value (step 2381). Then, the evaluator 240 adds the ENode to the runtime return stack (step 2382). In this case, the information contained in the ENode will be used by the evaluator 240, after the subroutine has finished, to restore the environment at the time the call was made.

After step 2307 is executed, the processes of the evaluator 240 continues with step 2334 of FIG. 23C. In step 2334, the PushENode routine of FIG. 23F is executed for the subroutine icon and the evaluator 240 attempts to locate the first child icon for this subroutine (step 2334). The evaluation process then returns to step 2304 of FIG. 23A to determine what the next type of icon in the presentation is.

If in step 2306 the evaluator 240 does not locate the subroutine on the RootEvent's child list, then the evaluator 240 determines whether an exit flag has been set (step 2335). If the exit flag has been set (step 2335), then the evaluator 240 executes the PopENode for the previous parent (step 2341).

Figure 23G:
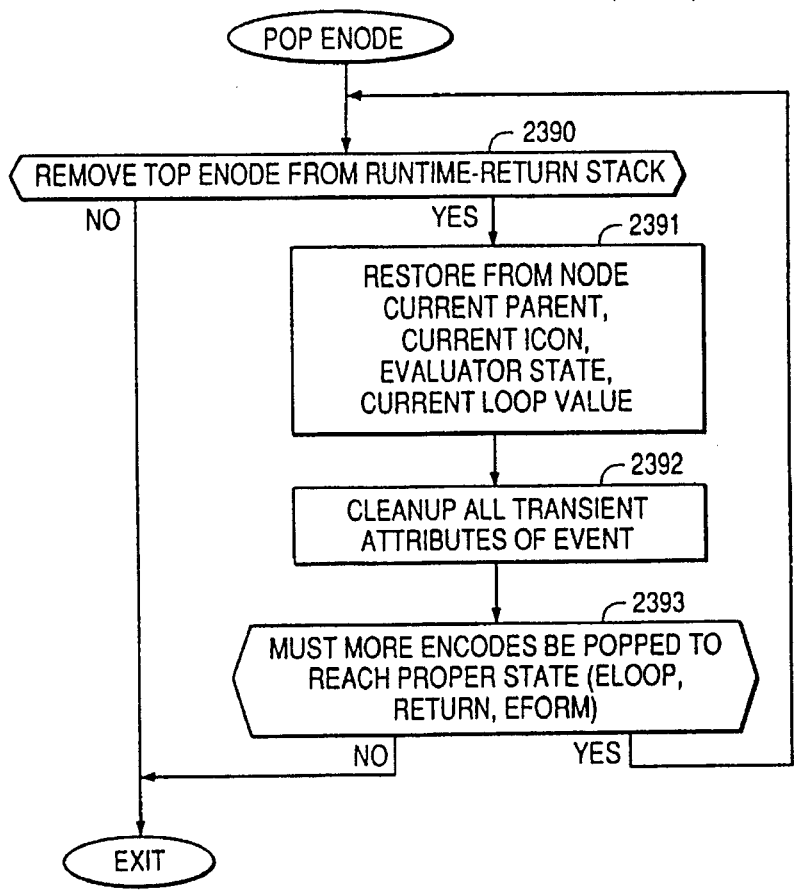

The PopENode procedure is illustrated in FIG. 23G. When the evaluator 240 begins the PopENode procedure, it first determines whether there is an ENode to be removed from the runtime return stack (step 2390). If no, then the PopENode procedure is complete and returns a false to step 2341 (FIG. 23C) of the evaluator 240 process. If however, there is an ENode to be removed from the runtime return stack (2390), then the evaluator performs several functions. First, the evaluator 240 restores the current parent, current icon, evaluator state, and current Loop Value (step 2391) from the removed ENode. After the evaluator 240 performs a cleanup of all transient attributes for the parent stored in ENode taken off of the runtime return stack (step 2392), the evaluator 240 then determines whether more ENodes need to be popped to reach a proper runtime return stack (step 2390). For example, multiple ENodes may need to be popped to exit a loop. If yes, then the processes of the evaluator 240 return to step 2390 of FIG. 23G. Otherwise, the processes of the PopENode procedure are complete.

If the PopENode for the previous parent in step 2341 evaluates as true, then the evaluator 240 determines whether an exit flag has been set (step 2342). If yes, then the step 2341 is executed again. The exit flag is set when a quit icon is found in the presentation, as described below in reference to step 2327. Otherwise, the evaluator determines whether the current icon was suspended for operation of an interrupt (step 2343). If no, then the evaluator 240 continues on FIG. 23D and first determines whether the current icon is a subroutine or an interrupt (step 2345). If yes, the evaluator 240 returns to step 2341 of FIG. 23C. If no, the evaluator 240 determines whether the last parent should be re-evaluated (i.e., loop action) (step 2346). If yes, then the processes of the evaluator 240 return to step 2304 of FIG. 23A. Otherwise, if the last parent should not be re-evaluated (step 2346) then the evaluator 240 returns to step 2340 of FIG. 23C to determine whether it is required to find the next sibling icon (step 2340). As discussed earlier, if step 2340 evaluate is true, then processes continue in step 2304 of FIG. 23A.

In FIG. 23A, if the evaluator 240 is attempting to evaluate a conditional icon (step 2308), then the evaluator 240 begins by determining whether the evaluation of the conditional icon is true (step 2309). If the condition as evaluated is true (step 2309), then the evaluator 240 determines whether the conditional icon is a conditional goto icon (step 2310). If it is a conditional goto icon, then the evaluator 240 determines whether the referenced icon (partner) is a child of any of the events on the runtime return stack (step 2313). If yes, then the evaluator then determines whether the referenced icon (partner) is a child of the current parent (step 2314). If yes, then the evaluator sets up for execution of the referenced icon (step 2316). The evaluator 240 then continues operation in step 2334 of FIG. 23C (discussed earlier). If the referenced icon is not a child of the current parent (step 2314) then the evaluator 240 performs the PopENode procedure illustrated in FIG. 23G (step 2315). This has the effect of returning to the runtime return stack state of the referenced icon. When this state is reached, the popping action of the PopENode procedure is stopped and the evaluator 240 continues with the referenced icon.

If the referenced icon is not a child of any of the events on the runtime return stack (step 2313), then the evaluator 240 determines whether an exit flag has been set (step 2335) in FIG. 23C. If yes, then the processes of the evaluator 240 continue in step 2341 (discussed above). If the exit flag has not been set (step 2335), then the evaluator 240 determines whether the current icon is an if then else icon that had its true (partner) action performed (step 2336). If no, then the evaluator 240 continues in step 2340 (discussed above). If the if-then-else icon had its true action performed (step 2336), then the evaluator 240 attempts to locate the next sibling icon to the if then else icon (step 2337). If no sibling icon is located (step 2337) then the evaluator 240 continues in step 2341 (discussed above).

If the next sibling icon is found (step 2337), then the evaluator 240 then considers whether the current icon is indeed an if-then-else icon (step 2338). If yes, then the evaluator returns to step 2337. Otherwise, the evaluator 240 attempts to find the next sibling icon to the current icon (step 2339). If the next sibling icon is located (step 2339), then the evaluator 240 continues its evaluation process in step 2341 (discussed above). If the next sibling icon is located then the processes of the evaluator 240 continue in step 2341 of FIG. 23A.

Returning FIG. 23A, if the evaluator 240 attempts to evaluate a goto icon (step 2312), then the evaluator 240 begins by determining whether the referenced icon is a child of any of the events of the runtime return stack (step 2313).

If yes, then the processes of step 2314 and all other processes associated with the conditional goto icon discussed above are performed.

In FIG. 23B, if the evaluator 240 attempts to evaluate a return icon (step 2317), then the evaluator first determines whether it is currently executing the children of a subroutine (step 2318). If no, then the evaluator continues in step 2335 of FIG. 23C. If the return icon is inside a subroutine (step 2318), then the PopENode procedure of FIG. 23G is executed (step 2319). The evaluator 240 then determines whether the ENode popped using the PopENode procedure is the subroutine (2320). If no, then the evaluator 240 returns to step 2319. Otherwise, if the PopENode is the subroutine (step 2320), then the evaluator 240 performs the PopENode procedure illustrated in FIG. 23G again to restore state before the call (step 2321). That is, the PopENode procedure is executed to return to the location in the application of following the initiation of a subroutine.

In FIG. 23B, if the evaluator 240 identifies in the application an exit loop or an exit form icon (step 2322), then the evaluator 240 determines whether the application currently running is inside the loop or a form (step 2324). If no, then the processes of step 2335 are executed. Otherwise, the PopENode procedure of FIG. 23G is executed (step 2325). If the PopNode using the PopENode procedure is the parent node for the loop or form (step 2326), then the evaluator 240 continues in step 2325 of FIG. 23C. Otherwise, the evaluator 240 returns to step 2325.

If the evaluator 240 identifies a quit icon in an application (step 2327), then the evaluator 240 sets the exit flag (step 2328) and continues in step 2325 of FIG. 23C.

Otherwise, the evaluator 240 must perform the actions associated with the icons being evaluated (step 2329). The icon processing is illustrated in FIG. 23E.

In FIG. 23E, the evaluator 240 first begins by initiating actions of an icon (step 2360). The actions of an icon depend on the type of that icon. For example, a screen icon sets the background resolution, image, etc., while a Module icon performs the evaluation of all expressions defined by it, and an Animation icon starts the playback of the specified animation (described above). The evaluator 240 then determines whether the current icon is a wait icon which requires a reaction from the user (2361). If yes, then the evaluator awaits the user action (2362). If the user action has been performed (step 2363), then the processing of the evaluator 240 continues in step 2330 of FIG. 23B. If the user action has caused an interrupt (step 2364), the processing of the evaluator 240 also continues in step 2330 of FIG. 23B. Otherwise, the evaluator 240 returns to await the user action (step 2362).

If the current icon is not one which requires reaction from the user (step 2361), the evaluator 240 determines whether the current icon may pause the evaluation until it completes (step 2365). If no, the processing of the evaluator continues in step 2330 of FIG. 23B. If a pause is applicable to the current icon (step 2365), the evaluator 240 determines whether the user has selected the pause (step 2366). If no, the evaluator 240 continues with step 2330 of FIG. 23B. If however the pause has been selected (step 2366), then the evaluator 240 awaits any user action while monitoring for the completion of the current icon action (step 2367). If the action of the current icon is completed (step 2368), the evaluator 240 continues in step 2330 of FIG. 23B. If however the action of the icon is not completed (step 2368), then the evaluator 240 determines whether the user's action caused an interrupt in the processing of the current icon (step 2369). If the user's action has not caused an interrupt (step 2369), the evaluator 240 returns to step 2367. Otherwise, the evaluator continues in step 2330 of FIG. 23B.

After the processing of FIG. 23E has been completed (step 2329), the evaluator 240 then determines whether an interrupt icon occurred (step 2330). If yes, then the evaluator executes the PushENode procedure of FIG. 23F to save the current state of the application, sets up for appropriate interrupt processing, and performs the PushENode procedure for interrupt tracking processing (step 2331). The evaluator then locates the interrupt's first child (step 2332). After the interrupt child is located (step 2332), the processing of the evaluator returns to step 2304 of FIG. 23A.

If however, an interrupt did not occur (step 2330), then the evaluator considers whether the current icon is a parent with children that should be evaluated immediately (step 2333). If the current Node is a parent node with children that should be evaluate immediately (step 2333), then the evaluator continues in step 2334 of FIG. 23C (discussed above). If however the current icon is not a parent with children that should be evaluated immediately (step 2333), then the evaluator continues the processing in step 2335 of FIG. 23C (discussed above).

Using the procedures outlined in FIGS. 23A through 23E, the evaluator of the preferred implementation traverses the application structure exemplified in FIGS. 9A–9B to present the application under evaluation.

SUMMARY

In particular, the preferred implementation of the present invention solves the problems of conventional multimedia authoring systems as well as conventional visual programming systems by providing for a graphic interface display which is implemented as a part of a flow editor and is used to create and to program interactive multimedia presentations and coursework. Additionally, the present invention also includes other editors (e.g., a database editor, an expression editor, and an object editor) used to perform other editing functions required to create presentations. Furthermore, this invention includes control systems (e.g., an applications mover, a videodisc controller, and a help system) which also enable the user to create, program and execute interactive multimedia presentations. Finally, this invention includes an evaluator which evaluates a programmed presentation (or application) and implements the presentation.

Persons of ordinary skill will recognize that modifications and variations may be made to this invention without departing from the spirit and scope of the general inventive concept. This invention in its broader aspects is therefore not limited to the specific details or representative methods shown and described.

I claim:

1. In a data processing system including a central processing unit, a memory for storing a plurality of presentations which each include operations which are represented by parent icons and child icons, each of said child icons associated with a respective one of said parent icons, and a display device having a display screen including a presentation area for displaying said parent icons and child icons representing said operations performed in each of said plurality of presentations, a method comprising the steps performed in the data processing system of:

providing, for each of said plurality of presentations, a plurality of data structures including a plurality of event structures and a plurality of command structures, each of said plurality of event structures and each of said plurality of command structures including a) a respective parent list, and b) a respective specific data member which designates respective data for a respective one of said operations, each of said plurality of event structures further including c) a respective child list;

providing a plurality of link structures, each associated with respective ones of said plurality of data structures, each of said plurality link is structures including respective link nodes each a) to couple a respective one of said plurality of event structures with a respective one of said plurality of command structures and b) associated with at least a respective one of said plurality of data structures based on contents of said respective parent list and child list for coupling to at least one of said parent icons and child icons, respectively;

receiving one of the plurality of event structures of one of said plurality of presentations:

locating, using one of said plurality of link structures associated with said received one of said plurality of event structures based on one of said respective parent list and said respective child list for said received one of said plurality of event structures, one of said plurality of command structures of the one of said plurality of presentations;

determining an action to be performed which corresponds to an action identifier which has been stored in said located one of said plurality of command structures; and performing the action corresponding to the action identifier in accordance with a plurality of attributes which have been stored in said located one of said plurality of command structures.

2. The method of claim 1, further including the steps of:

determining a further action to be performed in response to a further action identifier which has been stored in said located one of said plurality of event structures; and performing the further action in accordance with a further plurality of attributes stored in said located one of said plurality of event structures.

3. A method of claim 1 wherein the data processing system further includes a multimedia device and wherein the step of performing the action which corresponds to the action identifier includes the step of:

signaling the multimedia device to perform the action which corresponds to the action identifier.

4. The method of claim 1, wherein one of said plurality of link structures is for coupling another one of said plurality of link structures to one of said plurality of command structures for conditional execution of said action.

5. A presentation system in a data processing system including a central processing unit, a memory for storing a plurality of presentations which includes operations which are represented by parent icons and child icons, each of said child icons associated with a respective one of said parent icons, and a display device having a display screen including a presentation area for displaying said parent icons and child icons representing said operations performed in each of said plurality of presentations, the presentation system comprising:

a plurality of data structures corresponding to each of said plurality of presentations including a plurality of event structures and a plurality of command structures, each of said plurality of event structures and each of said plurality of command structures including a) a respective parent list, and b) a respective specific data member which designates respective data for a respective one of said operations, each of said plurality of event structures further including c) a respective child list;

a plurality of link structures each associated with respective ones of said plurality of data structures, each of said plurality of link structures including respective link nodes each a) to couple a respective one of said plurality of event structures with a respective one of said plurality of command structures and b) associates with at least a respective one of said plurality of data structures based on contents of said respective parent list and child list for coupling to at least one of said parent icons and child icons, respectively;

means for receiving one the plurality of event structures of one of said plurality of presentations;

means for locating, using one of the plurality of link structures associated with the received one of the plurality of event structures based on one of said respective parent list and said respective child list for said received one of said plurality of event structures, one of the plurality of command structures of the one of said plurality presentations:

means for determining an action to be performed which corresponds to an action identifier which has been stored in said located one of said plurality of command structures; and means for performing the action corresponding to the action identifier in accordance with a plurality of attributes which have been stored in said located one of said plurality command structures.

6. The presentation system of claim 5 further comprising:

means for determining a further action to be performed in response to a further action identifier stored in said located one of said plurality of event structures; and means for performing the further action in accordance with a further plurality of attributes stored in said located one of said plurality of event structures.

7. The presentation system of claim 5 wherein the data processing system further includes a multimedia device and wherein the means for performing the action corresponding to the action identifier comprises:

means for signaling the multimedia device to perform the action represented by the action identifier.

8. A presentation system according to claim 5, wherein one of said plurality of link structures is for coupling another one of said plurality of link structures to one of said plurality of command structures for conditional execution of said action.

* * * * *